(12) United States Patent
Mohapatra et al.

(10) Patent No.: US 12,147,836 B2
(45) Date of Patent: Nov. 19, 2024

(54) SCHEDULE-AWARE DYNAMICALLY RECONFIGURABLE ADDER TREE ARCHITECTURE FOR PARTIAL SUM ACCUMULATION IN MACHINE LEARNING ACCELERATORS

(71) Applicant: INTEL CORPORATION, Santa Clara, CA (US)

(72) Inventors: Debabrata Mohapatra, Santa Clara, CA (US); Arnab Raha, Santa Clara, CA (US); Deepak Mathaikutty, Chandler, AZ (US); Raymond Sung, San Francisco, CA (US); Cormac Brick, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 17/520,281

(22) Filed: Nov. 5, 2021

(65) Prior Publication Data

US 2022/0129320 A1   Apr. 28, 2022

(51) Int. Cl.
*G06F 9/50*  (2006.01)
*G06F 7/50*  (2006.01)
(Continued)

(52) U.S. Cl.
CPC .............. *G06F 9/5027* (2013.01); *G06F 7/50* (2013.01); *G06F 9/4881* (2013.01); *G06F 15/80* (2013.01); *G06F 15/825* (2013.01); *G06N 20/00* (2019.01)

(58) Field of Classification Search
CPC ........ G06F 9/5027; G06F 7/50; G06F 9/4881; G06F 15/80; G06F 15/825;
(Continued)

(56) References Cited

U.S. PATENT DOCUMENTS 8,046,564 B2   10/2011   Yang et al.
9,600,278 B1 *  3/2017   Langhammer .......... G06F 7/483
(Continued)

OTHER PUBLICATIONS

Forrest N. Iandola et al., "Squeezenet: Alexnet-Level Accuracy With 50X Fewer Parameters and <0.5MB Model Size", arXiv:1602.07360v4 [cs.CV], 13 pages (Nov. 4, 2016).
(Continued)

*Primary Examiner* — Shawn Doman
(74) *Attorney, Agent, or Firm* — Akona IP PC

(57) ABSTRACT

Techniques and configurations enhancing the performance of hardware (HW) accelerators are provided. A schedule-aware, dynamically reconfigurable, tree-based partial sum accumulator architecture for HW accelerators is provided, where the depth of an adder tree in the HW accelerator is dynamically based on a dataflow schedule generated by a compiler. The adder tree depth is adjusted on a per-layer basis at runtime. Configuration registers, programmed via software, dynamically alter the adder tree depth for partial sum accumulation based on the dataflow schedule. By facilitating a variable depth adder tree during runtime, the compiler can choose a compute optimal dataflow schedule that minimizes the number of compute cycles needed to accumulate partial sums across multiple processing elements (PEs) within a PE array of a HW accelerator.

31 Claims, 25 Drawing Sheets

(51) Int. Cl.
| | |
|---|---|
| *G06F 9/48* | (2006.01) |
| *G06F 15/80* | (2006.01) |
| *G06F 15/82* | (2006.01) |
| *G06N 20/00* | (2019.01) |

(58) Field of Classification Search
CPC .............. G06F 15/7867; G06F 7/485; G06F 2207/4824; G06N 20/00; G06N 3/045; G06N 3/063
See application file for complete search history.

(56) References Cited

U.S. PATENT DOCUMENTS

| | | | | |
|---|---|---|---|---|
| 10,455,253 | B1* | 10/2019 | Vitvitskyy | H04N 19/523 |
| 10,853,448 | B1 | 12/2020 | Shalev et al. | |
| 11,615,300 | B1* | 3/2023 | Faraone | G06N 3/08 706/19 |
| 2016/0342393 | A1* | 11/2016 | Kossel | G06F 7/57 |
| 2017/0371836 | A1 | 12/2017 | Langhammer | |
| 2018/0121166 | A1* | 5/2018 | Rose | G06F 7/535 |
| 2019/0205746 | A1* | 7/2019 | Nurvitadhi | G06N 3/044 |
| 2019/0392287 | A1* | 12/2019 | Ovsiannikov | G06N 3/04 |
| 2020/0026494 | A1* | 1/2020 | Langhammer | G06F 7/501 |
| 2020/0134417 | A1 | 4/2020 | Mohapatra et al. | |
| 2020/0226203 | A1* | 7/2020 | George | G06F 17/16 |
| 2020/0380344 | A1 | 12/2020 | Lie et al. | |
| 2020/0410327 | A1 | 12/2020 | Chinya et al. | |
| 2021/0117767 | A1 | 4/2021 | Liu et al. | |
| 2022/0083500 | A1* | 3/2022 | Tsai | G06F 15/7867 |
| 2022/0129320 | A1 | 4/2022 | Mohapatra et al. | |
| 2022/0245436 | A1* | 8/2022 | Kim | G06N 3/045 |

OTHER PUBLICATIONS

Hyoukjun Kwon et al., "Heterogeneous Dataflow Accelerators for Multi-DNN Workloads", The 27th IEEE International Symposium on High-Performance Computer Architecture (HPCA 2021), 13 pages (Mar. 2021, available online Dec. 17, 2020), https://arxiv.org/pdf/1909.07437.pdf.
Hyoukjun Kwon et al., "Herald: Optimizing Heterogeneous DNN Accelerators for Edge Devices", arXiv:1909.07437v1 [cs.DC], 12 pages (Sep. 13, 2019), https:/arxiv.org/pdf/1909.07437v1.pdf.
Hyoukjun Kwon et al., "Understanding Reuse, Performance, and Hardware Cost of DNN Dataflows: A Data-Centric Approach Using MAESTRO", arXiv:1805.02566v6 [cs.DC], 15 pages (May 11, 2020), https://arxiv.org/pdf/1805.02566.pdf.
Zihan Liu et al., "DLFusion: An Auto-Tuning Compiler for Layer Fusion on Deep Neural Network Accelerator", arXiv:2011.05630v1 [cs.DC], 10 pages (Nov. 11, 2020), https://arxiv.org/pdf/2011.05630.
Wei Liu et al., "SSD: Single Shot MultiBox Detector", arXiv:1512.02325v5 [cs.CV], 17 pages (Dec. 29, 2016), https://arxiv.org/pdf/1512.02325.pdf.
Yufei Ma, "Hardware Acceleration of Deep Convolutional Neural Networks on FPGA", Arizona State Univ., PhD Dissertation, 169 pages (Dec. 2018), https://hdl.handle.net/2286/R.I.51620.
Ruben Mayer et al., "Scalable Deep Learning on Distributed Infrastructures: Challenges, Techniques and Tools", Sep. 25, 2019, 35 pages, arXiv:1903.11314v2 [cs.DC].
Rachit Nigam et al., "Compiler Infrastructure for Accelerator Generators", arXiv:2102.09713v1 [cs.PL], 14 pages, (Feb. 19, 2021), https://arxiv.org/pdf/2102.09713.pdf.
Eri Ogawa et al., "A Compiler for Deep Neural Network Accelerators to Generate Optimized Code for a Wide Range of Data Parameters from a Hand-crafted Computation Kernel", 2019 IEEE Symposium in Low-Power and High-Speed Chips (Cool Chips), pp. 1-3 (Apr. 17, 2019), https://researcher.watson.ibm.com/researcher/files/jp-ERIO/COOLChips-camera-ready.pdf.
"Intel Vision Accelerator Design with the Intel Movidius Myriad XVPU", HAL Configuration Guide, Revision 1.3, 52 pages (Sep. 2019).
I. Arivazhagan et al., "FPGA Implementation of FIR Filter Design with Optimization of Adder Tree & Constant Multiplication", International Journal of Current Engineering and Technology, vol. 5, No. 3, pp. 2128-2137, 10 pages (Jun. 27, 2015), available at https://inpressco.com/wp-content/uploads/2015/06/Paper11 52128-2137.pdf.
Ivan Bruha et al., "Postprocessing in Machine Learning and Data Mining", ACM SIGKDD Explorations Newsletter, vol. 2, Issue 2, pp. 110-114, 5 pages (available online: Dec. 1, 2000), available at: https://doi.org/10.1145/380995.381059.
S.Romy Cathlane et al., "Efficient Fir Filter Implementation Based On Minimum Logic Depth Tree", International Journal for Research in Applied Science & Engineering Technology (IJRASET), vol. 3, Issue II, 8 pages (Feb. 2015), available at: https://1library.net/document/zxv3j1oy-efficient-filter-implementation-based-minimum-logic-depth-tree.html.
Yu-Hsin Chen et al., "Using Dataflow to Optimize Energy Efficiency of Deep Neural Network Accelerators", IEEE Micro, vol. 37, No. 3, pp. 12-21, 10 pages (2017), doi: 10.1109/MM.2017.54.
Yu-Hsin Chen et al., "Eyeriss: A Spatial Architecture for Energy-Efficient Dataflow for Convolutional Neural Networks", 43rd ACM/IEEE International Symposium on Computer Architecture (ISCA), pp. 367-379, 14 pages (Jun. 2016), available at: https://www.rle.mit.edu/eems/wp-content/uploads/2016/04/eyeriss_isca_2016.pdf.
Kaiming He et al., "Deep Residual Learning for Image Recognition", arXiv:1512.03385v1 [cs.CV], 12 pages (Dec. 10, 2015), available at: https://arxiv.org/pdf/1512.03385.pdf.
Qijing Huang et al., "CoSA: Scheduling by Constrained Optimization for Spatial Accelerators", 2021 ACM/IEEE 48th Annual International Symposium on Computer Architecture (ISCA), pp. 554-566 (Jun. 14, 2021; available online: May 5, 2021), available at: https://arxiv.org/pdf/2105.01898.pdf.
International Search Report and Written Opinion mailed Feb. 3, 2023 for International Patent Application No. PCT/US2022/045652, 15 pages.
Yu Pan et al., "Bit-Level Optimization of Adder-Trees for Multiple Constant Multiplications for Efficient FIR Filter Implementation", IEEE Transactions on Circuits and Systems-I: Regular Papers, vol. 61, No. 2, 8 pages (Feb. 2014).
Angshuman Parashar et al., "Timeloop: A Systematic Approach to DNN Accelerator Evaluation", 2019 IEEE Int'l Symposium on Performance Analysis of Systems and Software (ISPASS), pp. 304-315 (Mar. 24, 2019).
Minsoo Rhu et al., "Compressing DMA Engine: Leveraging Activation Sparsity for Training Deep Neural Networks", arXiv:1705.01626v1 [cs.LG], 14 pages (May 3, 2017).
Vivienne Sze et al., "Efficient Processing of Deep Neural Networks: A Tutorial and Survey", arXiv:1703.09039v2 [cs.CV], 32 pages (Aug. 13, 2017).
Boyue Wang et al., "Partial Sum Minimization of Singular Values Representation on Grassmann Manifolds", arXiv:1601.05613v3 [cs.CV], 15 pages (Apr. 28, 2017).
Yu Xing et al., "An In-depth Comparison of Compilers for Deep Neural Networks on Hardware", IEEE International Conference on Embedded Software and Systems (ICESS), pp. 1-8 (Jun. 2, 2019).
Xuan Yang et al., "Interstellar: Using Halide's Scheduling Language to Analyze DNN Accelerators" arXiv:1809.04070v2 [cs.DC], 15 pages (Apr. 26, 2020).

* cited by examiner

SCHEDULE-AWARE DYNAMICALLY RECONFIGURABLE ADDER TREE ARCHITECTURE FOR PARTIAL SUM ACCUMULATION IN MACHINE LEARNING ACCELERATORS

FIELD

Embodiments of the present disclosure generally relate to the field of electronics, and more particularly, to configurations, arrangements, operation, and fabrication of artificial intelligence and/or machine learning (AI/ML) hardware devices.

BACKGROUND

Machine learning (ML) architectures are typically based on artificial neural networks (NNs), which are inspired by signal processing in the biological brains. NNs have and continue to be adopted as the underlying technical solutions in a wide range of technical fields, such as computer vision, facial recognition, speech recognition, navigation, market research, robotics, among many others. As such, the field of NNs has and continues to grow rapidly, both in terms of inference algorithm development, as well as hardware platform development to implement the evolving inference algorithms. The network layers of NNs, such as deep neural networks (DNNs) and deep learning convolutional neural networks (CNNs), come in many possible tensor shapes, the dimensions of which continue to change as existing NN inference algorithms are revised and/or new NN inference algorithms are developed. The NN domain has seen unprecedented growth in terms of inference algorithms and hardware platforms upon which these algorithms are being operated.

Due to the popularity of DNNs, many recent hardware platforms have special features that target DNN processing such as special vector instructions for deep learning, 16-bit floating point (FP16) arithmetic support to perform two FP16 operations on a single precision core for faster deep learning computation, and the like. Computing systems have also been built specifically for DNN processing. Some hardware platforms built specifically for DNN processing are based on highly-parallel compute paradigms to achieve high performance. These platforms include temporal architectures and spatial architectures. The temporal architectures use vectors or parallel threads to achieve parallelism, and appear mostly in CPUs or GPUs where arithmetic logic units (ALUs) fetch data from a memory hierarchy and cannot communicate directly with each other. Spatial architectures use dataflow processing, where ALUs or processing elements (PEs) form a processing chain so that they can pass data to each other. The dataflow is an allocation of compute blocks among the PEs, and is sometimes referred to as a "schedule". Spatial architectures are commonly used for DNNs in hardware accelerator platforms that utilize field-programmable gate arrays (FPGAs), Application Specific Integrated Circuits (ASICs), and the like.

The allocation of compute blocks to PEs in spatial architectures is heavily reliant on the underlying compiler or scheduler that determines the schedule or dataflow. The optimality of the schedule is determined based on the extent of search space flexibility allowed to the scheduler, which in turn is dictated by the set of underlying hardware constraints. The greater the rigidity of the underlying hardware platform constraints, the lower the flexibility of the scheduler search space and the quality of the schedule.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure generally relate to the field of artificial intelligence (AI) and machine learning (ML) hardware elements, and more particularly, to techniques and configurations for schedule-aware, dynamically reconfigurable, adder tree architecture for partial sum accumulation that improves the compute efficiency in hardware (HW) accelerators for inference.

The present disclosure provides a schedule-aware, dynamically reconfigurable, tree-based partial sum accumulator architecture (referred to herein as "FlexTree", although other terms may also be used). FlexTree incorporates a flexible depth tree-based architecture for partial sum accumulation for flexible schedule HW accelerators. The FlexTree architecture can adjust the depth of an adder tree based on a schedule or dataflow determined and generated by a compiler or scheduler. The depth adjustment is done on a per-layer basis at runtime. Here, the "layers" of the per-layer basis refer to individual ML model layers. Configuration registers, programmed via software, dynamically alter the adder tree depth for partial sum accumulation based on the schedule or dataflow. By facilitating a variable depth adder tree during runtime, FlexTree allows the compiler to choose a compute optimal schedule/dataflow that minimizes the number of cycles needed to accumulate partial sums across multiple processing elements (PEs) within a PE array of an HW accelerator.

Simulations show that FlexTree can achieve up to 2.14× partial sum accumulation speed up when compared to existing flexible schedule HW accelerators employing adder tree architectures for partial sum accumulation without FlexTree. Simulations also show that Flex Tree can achieve between 4×-16× partial sum accumulation speed up when compared to existing fixed schedule HW accelerators employing fixed depth adder tree architectures for partial sum accumulation.

Compared to fixed schedule DNN accelerators employing fixed depth adder tree architectures for partial sum accumulation, Flex Tree's ability to dynamically reconfigure the depth of the adder tree within the partial sum accumulator hardware facilitates implementation of compute optimal schedule by the compiler, thereby achieving higher degree of compute efficiency.

Compared to existing implementations involving non tree-based architectures for partial sum accumulation in flexible schedule DNN accelerators, FlexTree enables efficient partial sum accumulation across a wide range of ML model layer dimensions, facilitating higher compute efficiency within the flexible schedule DNN accelerator.

1. Flextree Architecture Aspects

Figure 1:
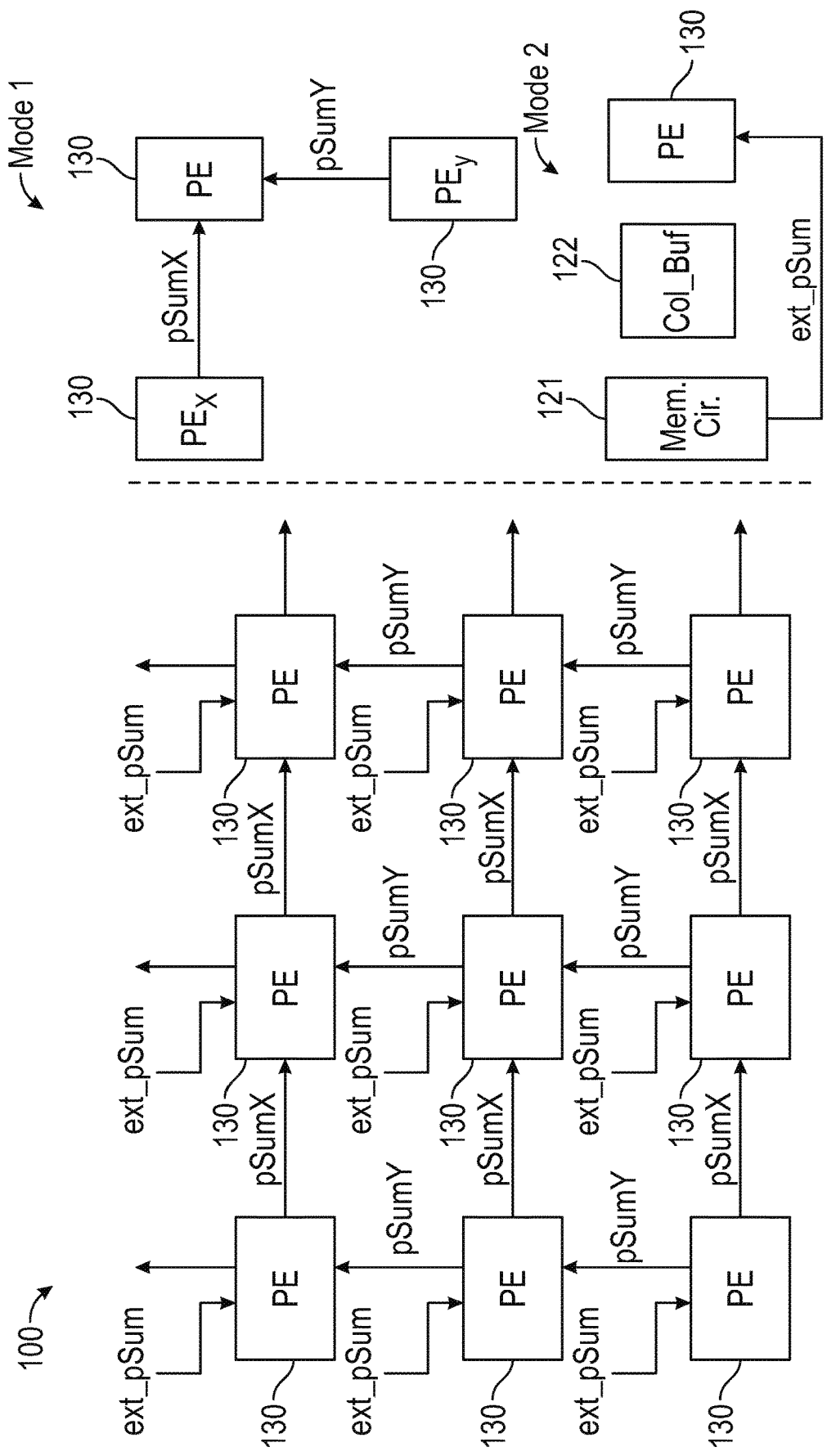
FIG. 1 depicts an example partial sum accumulation architecture in flexible schedule machine learning (ML) accelerators according to various embodiments.
Figure 2:
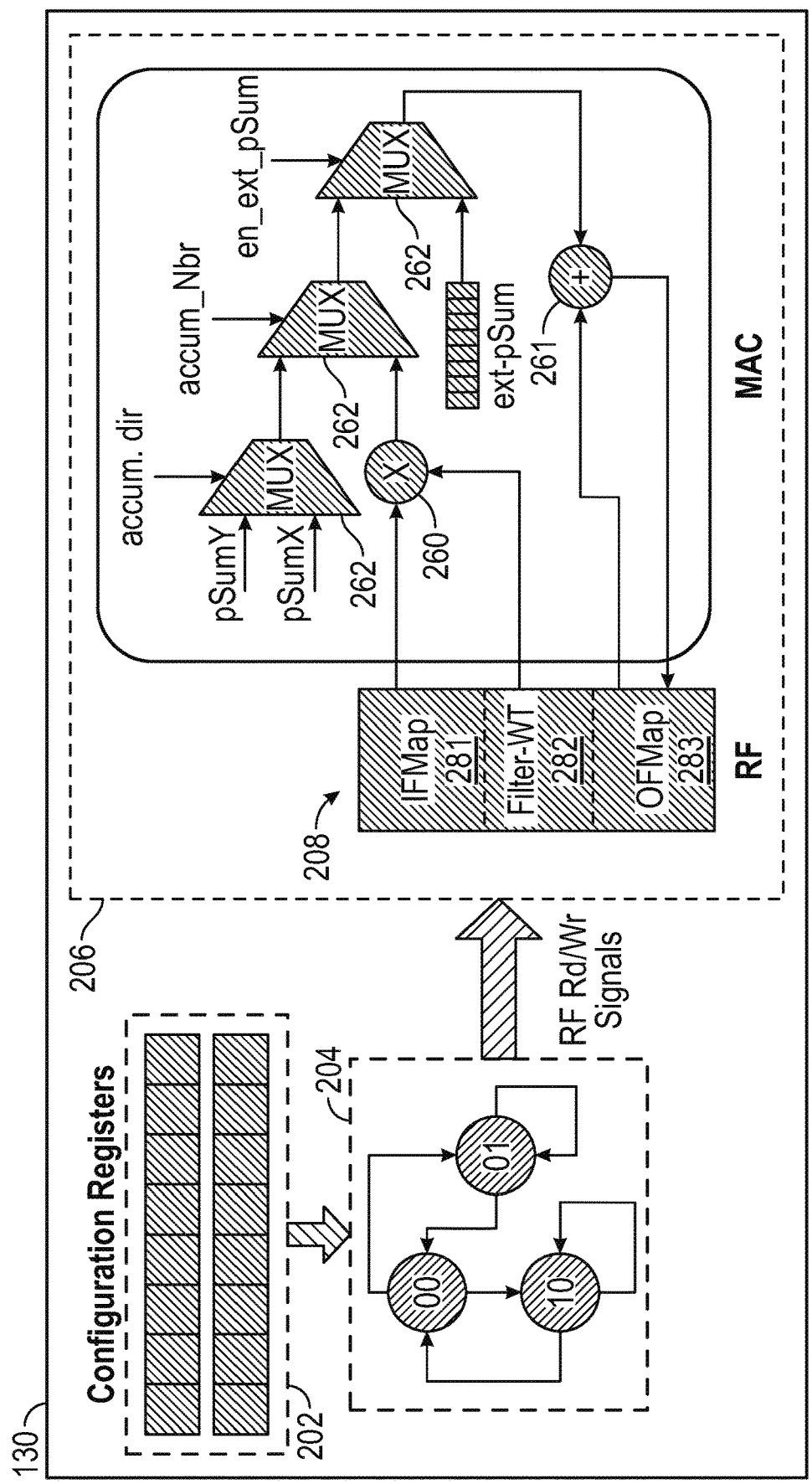
FIG. 2 depicts an example processing element (PE) microarchitecture of a flexible hardware (HW) accelerator according to various embodiments.

FIGS. 1 and 2 show an example of a HW accelerator using flexible dataflow schedules according to various embodiments. Various aspects of flexible dataflow schedule HW accelerators are discussed infra, and additional details of such HW accelerators are also discussed in co-pending U.S. application Ser. No. 16/456,707 filed on Jun. 28, 2019, U.S. application Ser. No. 16/726,709 filed on Dec. 24, 2019, U.S. application Ser. No. 16/832,804 filed on Mar. 27, 2020, and U.S. application Ser. No. 17/246,341 filed on 30 Apr. 2021, the contents of each of which are hereby incorporated by reference in their entireties.

FIG. 1 shows an example partial sum accumulation microarchitecture 100 according to various embodiments. In FIG. 1, the microarchitecture 100 includes a spatial array of processing elements (PEs) 130 (referred to herein as "spatial array 100", "PE array 100", "array 100", or "PE set 100"). The external partial sum (pSum) ("ext_pSum") signal is related to external accumulation operations, and the X pSum ("pSumX") and Y pSum ("pSumY") signals are signals related to internal accumulation operations. FIG. 1 also shows an accumulation mode 1 for internal accumulation and accumulation mode 2 for external pSum accumulation. In mode 1, pSumX signals are fed in a horizontal ("X") direction from a $PE_x$ 130 to a neighboring PE 130 and pSum Y signals are fed in a horizontal ("Y") direction from a $PE_y$ 130 to a neighboring PE 130. In mode 2, ext_pSum signals are provided to a PE 130 from memory circuitry 121 via a column buffer (col_buf) 122. In some implementations, the memory circuitry 121 may be one or more static random access memory (SRAM) devices. These modes of operation are discussed in more detail in [AC3143].

Generally, individual PEs 130 calculate pSums, which involves accumulating all of the input channels of an ML model within an individual PE 130. A pSum, at least in some embodiments, refers to the summation of one or more terms or values of a series or sequence. For example, in an infinite series $[a_1+a_2+a_3+, \ldots, \infty]$, the sum or quantity of the first n terms $s_n = a_1+a_2+a_3+, \ldots, a_n$ of the series is a pSum of the series. If the sequence of pSums converges to a definite value, the series is said to converge, whereas if the sequence of pSums does not converge to a limit (e.g., it oscillates or approaches $+\infty$), the series is said to diverge. Here, there are multiple input channels (e.g., 30, 64, 132, and for some ResNet implementations 2048 input channels). In order to compute an output point of a dot product, a generalized matrix multiplication (GEMM) operation, and/or a convolution operation, all of the input channels need to be accumulated. For example, a dot product is computed using a multiply accumulate (MAC) operation, which includes multiplication of two numbers and accumulation of the product into pSums. In some cases, the accumulation can be done within a single PE 130.

In order to speed up the operation, the computation can be divided and parallelized by dividing the number of input channels across multiple PEs 130, where each PE 130 accumulates a set of input channels assigned to them. For example, where there are 128 input channels, and a computation is divided among four PEs 130, each of the four PEs 130 will accumulate 32 input channels (e.g., 128/4=32), and therefore, each of the four PEs 130 will have one quarter of the result (or four pSums). The four pSums contained in these four PEs 130 are gathered together (accumulated) and added together to produce a final result, which is referred to as an "output point." The PE array 100 may represent a layer of a ML model such as a DNN, where individual PEs 130 perform one or more operations to compute the layer of the ML model.

As alluded to previously, HW accelerators (e.g., accelerators 2224 of FIG. 22a) exploit parallelism to improve performance by using multiple PEs 130 simultaneously, where PEs 130 communicate with one another to form a processing chain. A compiler (not shown by FIG. 1) determines an allocation of compute blocks, workloads, data accesses, and/or communication patterns across the multiple PEs 130. In the processing of ML models, these compilers (also referred to as "schedulers" or "mappers") translate the ML model shape, size, and/or other parameters into a hardware-compatible computation mapping for execution given a dataflow. The compilers may also perform mapping optimization to determine an optimal dataflow (in terms of energy consumption/usage) based on the HW platform and/ or ML model parameters and/or constraints. Examples of such compilers are discussed in Kwon et al., "Understanding Reuse, Performance, and Hardware Cost of DNN Dataflows: A Data-Centric Approach Using MAESTRO", arXiv: 1805.02566v6 [cs.DC] (11 May 2020), Xing et al., "An In-depth Comparison of Compilers for Deep Neural Networks on Hardware", 2019 IEEE International Conference on Embedded Software and Systems (ICESS), pp. 1-8 (2 Jun. 2019), Ogawa et al., "A Compiler for Deep Neural Network Accelerators to Generate Optimized Code for a Wide Range of Data Parameters from a Hand-crafted Computation Kernel", 2019 IEEE Symposium in Low-Power and High-Speed Chips (COOL CHIPS), pp. 1-3 (17 Apr. 2019), Ma, "Hardware Acceleration of Deep Convolutional Neural Networks on FPGA", Arizona State Univ., PhD Dissertation (December 2018), Sze et al., "Efficient Processing of Deep Neural Networks: A Tutorial and Survey" arXiv: 1703.09039v2 [cs.CV] (13 Aug. 2017), Chen et al., "Using Dataflow to Optimize Energy Efficiency of Deep Neural Network Accelerators," IEEE Micro's Top Picks from the Computer Architecture Conferences, vol. 37, no. 3, (May- June 2017), and Huang et al., "CoSA: Scheduling by Constrained Optimization for Spatial Accelerators", 2021 ACM/IEEE 48th Annual International Symposium on Computer Architecture (ISCA), pp. 554-566 (14 Jun. 2021), the contents of each of which are hereby incorporated by reference in their entireties.

The allocation determined by the scheduler/compiler is indicated by a dataflow (also referred to as a "layer execution schedule" or "schedule"). Dataflows/schedules are often represented in a loop-nest form using a suitable data structure (e.g., LDS 204 of FIG. 2 and/or LDS 804 of FIG. 8). The dataflow may also indicate an allocation or assignment of pSum accumulation modules to various PEs 130. The pSum accumulation modules (e.g., pSum accumulation elements 510 of FIGS. 5 and 6 discussed infra) are responsible for accumulating pSums across multiple PEs 130 to generate a final output. Typically, dataflows are carefully orchestrated and/or designed to minimize data accesses to relatively expensive (in terms of resource consumption) memory devices including storage in other PEs 130 and/or shared buffers.

Figure 3:
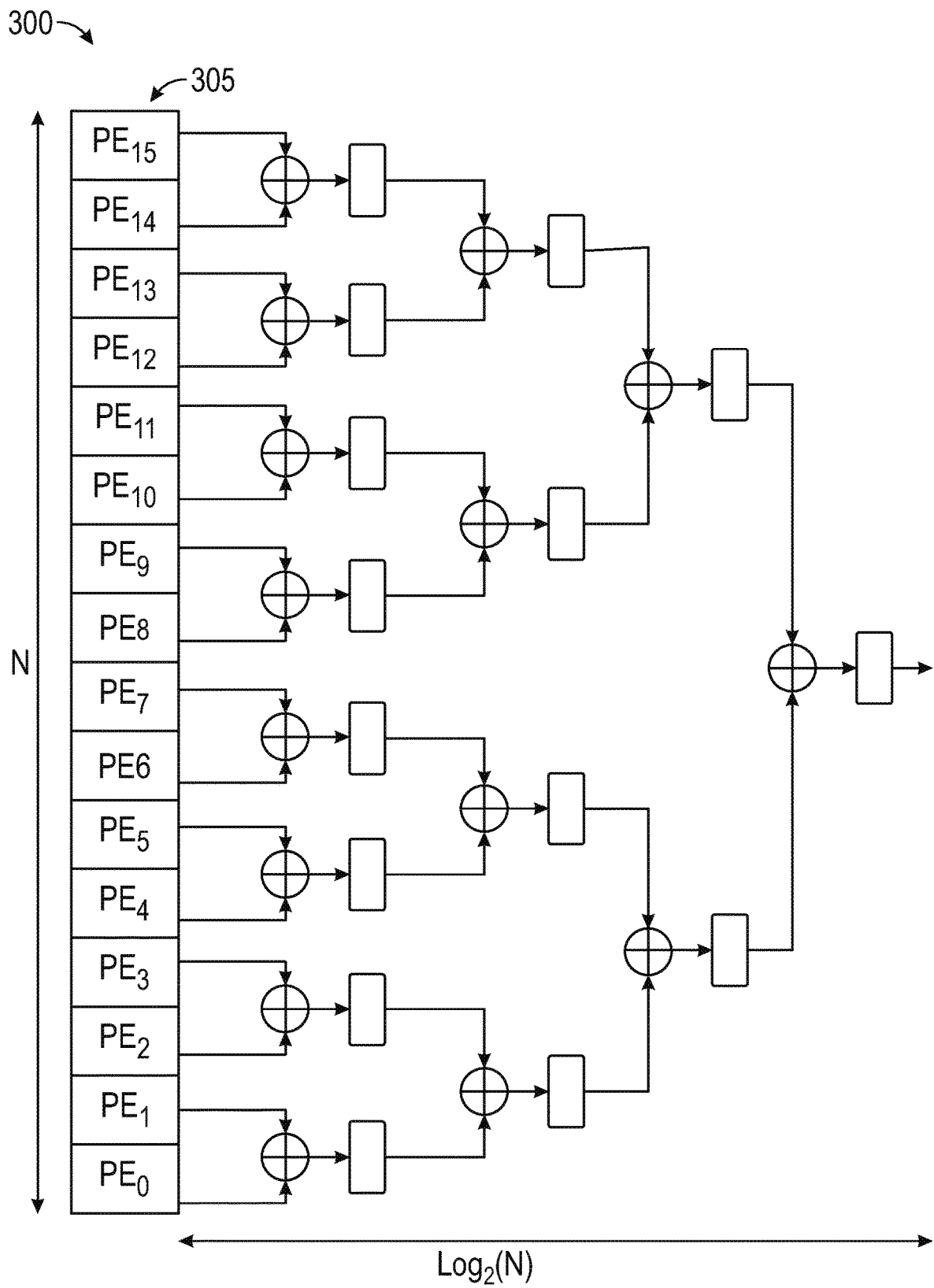
FIG. 3 depicts a tree-based partial sum accumulation architecture for fixed schedule HW accelerators according to various embodiments.

Fixed pSum accumulation schemes (or "fixed schedules") in HW accelerators are inefficient in terms of resource usage as discussed infra with respect to FIG. 3. In flexible schedule HW accelerators, the number of PEs 130 used to perform pSum accumulation can be defined using a "flexible dataflow" or a "flexible schedule" prior to operation of the PE array 100. In general, flexible schedules are used to distribute input feature (IF) and filter (FL) data to PE arrays 100 (or individual PEs 130) based on a current layer's optimal schedule/dataflow, and rearrange output feature (OF) data of the current layer according to a next layer's optimal schedule before writing the activations to memory (e.g., SRAM banks or the like). The IF and FL data may be loaded into the PE array 100 using a loading module such as the load FSM module discussed in [AB6904] and/or [AC3143]. As discussed in more detail infra, the FlexTree mechanisms discussed herein improve upon the efficiencies of flexible schedules by reducing the number of cycles (e.g., clock cycles) required to compute a layer of an ML model, thereby reducing the computational overhead incurred when operating an ML model to determine inferences or predictions.

FIG. 2 shows an example microarchitecture of an individual PE 130 in an HW accelerator 2224 according to various embodiments. As shown, the PE microarchitecture includes a set of configuration registers 202, a logical data structure (LDS) 204, and the PE 130. The PE 130 includes a single multiply-and-accumulate (MAC) computation unit 206 and a set of register files (RF) 208. The RF 208 includes an input feature map (IFMap of IF) 281, one or more filter-weights (WT) 282, and an output feature map (OFMap or OF) 283.

The PEs 130 are controlled based on a set of configuration descriptors to support a particular computation in HW, with the set of configuration descriptors being initialized at the beginning of execution of a given layer of an ML model. As such, the PEs 130 can be implemented as a purely HW solution (e.g., via FPGAs, ASIC, DSPs, SoCs, etc.) that exposes HW configuration registers 202 to software elements. The exposure of the HW configuration registers 202 to software elements enables the software to configure the dataflow for a given ML model layer during runtime. Thus, the PEs 130, and the associated arrangement of the PEs 130 into a configurable PE array 100, enable the flexible dataflows of ML model layers to execute in HW accelerators without performance penalty due to, for example, having to offload any work to an external processor or software.

The configuration registers 202 store configurable descriptors that control a dataflow based on a schedule specification for a particular inference. The set of configuration registers 202 accept values of descriptors, which are updated at the beginning of each layer of the ML model being processed by the PE 130. The descriptors include a set of the descriptor fields to support flexible dataflow schedules by controlling the appropriate sequencing of the various computation phases of input data within the PEs 130 according to one or a set of possible processing templates. Examples of such descriptors are shown in Table 1 of [AC3143] and/or Table 1 of [AB6904]. The set of descriptor fields applied to the configuration registers 202 are programmed via a configuration loader (not shown) to implement a dataflow schedule to process input data (e.g., input features and/or input channels) for a current layer of the ML model (e.g., DNN, etc.) being implemented. In some implementations, the dataflow schedule is based on a tensor processing template and the input data is tensor data for the current layer of the ML model (e.g., DNN, etc.).

The LDS 204 includes internal counters and logic (e.g., glue logic) to generate RF read and write (Rd/Wr) control signals to drive the RF 208. For example, the LDS 204 includes internal counters and logic to generate the read and write control signals into IF RF 281, FL RF 282, and OF RF 283, as well as multiplexer control signals to route data from the RFs 208 into the appropriate multiply arithmetic units 260, adder arithmetic units 261, and compare arithmetic units based on the type of operation (e.g., MAC, Eltwise, MaxPool, etc.) being performed and the dimension of the operated ML model. The LDS 204 may also generate other control signals as discussed in [AB6904], [AC3143], [AC5200], and/or [AD5164]. The LDS 204 may be any suitable may be an aggregate, tree (e.g., abstract syntax tree or the like), graph (e.g., a directed acyclic graph (DAG)), stack, queue, hash table, finite automaton, finite state machine (FSM), model of computation, logical data model, logical schema, and/or other like data structure that describes the logic, data, elements, etc. to generate control signals to drive the RF 208. The RF 208 may be implemented using, for example, SRAM device(s), DRAM device(s), scratchpad memory, and/or other suitable memory devices.

The MAC unit 206 the computational module in an HW accelerator 2224. The logic of the MAC 206 includes a multiplier 260, an adder 261, and various multiplexer (MUX) control logic 262 (collectively referred to as MUX 262) to route the appropriate data appropriately to implement the processing of the MAC 206. The PE 130 supports both internal and external pSum accumulation. The PE 130 can accept pSum from its neighboring PE 130 in either a horizontal direction (pSumX) or a vertical direction (pSumY). The programmable descriptor fields of the configuration registers 202 can be used to specify the direction of internal accumulation via the "accum_dir" control signal. The "accum_Nbr" control signal is used to identify whether the accumulation of pSums is within the PE 130 or across PEs 130 and/or a permitted neighboring PEs 130. For external pSum accumulation, one set of values is held in an "ext_pSum" register while the second set of values resides in the OFMap 283. The MUX control signal "en_ext_pSum" is used to choose between internal pSum accumulation and external pSum accumulation. Other aspects of the configuration registers 202, FSM 204, MAC 206, RF 208, and PE 130 are discussed in [AB6904], [AC3143], [AC5200], and/or [AD5164].

Although not shown by FIG. 1 or 2, a flexible schedule-aware data distribution (FSAD) module may be used to load and/or extract data from the PE array 100 (or individual PEs 130). The FSAD module includes configurable descriptors to control the dataflow based on the dataflow schedule, an address generator, which includes a load module (and/or a load LDS 204) and a drain module (and/or a drain LDS 204) for transferring data (IF and FL) to the PE array 100 during a load phase, and extract data (OF) from the PE array 100 during an extraction phase based on the descriptor fields, and other control logic to interface between the PE array 100 and memory banks (e.g., SRAM banks or the like). Other aspects of the FSAD, and operation of the FSAD module, are discussed in [AB6904], [AC3143], [AC5200], and/or [AD5164].

In flexible schedule HW accelerators, pSum accumulation is allowed between consecutive PEs 130 either in the vertical (pSumY) or in the horizontal (pSumX) direction, but not in both directions at the same time. The multiplexer control signal "accum_dir" selects one of either "pSumX" or "pSumY" inputs, while the multiplexer control signal "accum_Nbr" selects whether the adder is performing pSum accumulation of its own PE 130 or the neighboring PE 130. In certain schedules, it may be necessary to spill the pSums and fill it back into the PEs 130 at a later point in time to be accumulated to generate the final output. The "en_ext_pSum" multiplexer control signal is used to select between a pSum that is internal or external. The pSum accumulation between neighboring PEs 130 occurs via passing of pSums from bottom to top or from left to right depending on the direction of accumulation in a serial manner. For example, if four consecutive PEs 130 have to be accumulated in the vertical direction then the pSum of PE0 130 is added to PE1 130 and the result stored in PE1 130 followed by addition of pSum in PE1 130 with PE2 130 and the intermediate result stored in PE2 130, and finally the pSum of PE2 130 is added to PE3 130 and the final output is made available in PE3 130.

However, one disadvantage of the pSum accumulation for flexible schedule HW accelerators is the serialized nature of accumulation across PEs 130 in the vertical and/or horizontal direction. The serialization is due to extremely high interconnect overhead associated with an all-to-all connection among PEs 130 within a single row or single column in a 2-dimensional grid of PEs 130 within the PE array. Consider a schedule where four adjacent PEs 130 within a column (e.g., $PE_0$ 130 to $PE_3$ 130) perform pSum accumulation in the vertical direction. Such a scenario starts with the pSums within $PE_0$ 130 and $PE_1$ 130 being accumulated, and the result being stored in $PE_1$ 130. Similarly, for the $PE_1$ 130 and $PE_2$ 130 pair and the $PE_2$ 130 and $PE_3$ 130 pair, the pSum accumulation is performed in a hop-wise or serial manner, and the final output point is made available in $PE_3$ 130. In this example, the pSum within $PE_0$ 130 is passed to $PE_1$ 130, which is then accumulated with the pSum of $PE_1$ 130 and stored in $PE_1$ 130; then, the stored accumulation in $PE_1$ 130 is passed to $PE_2$ 130, which is then accumulated with the pSum of $PE_2$ 130 and stored in $PE_2$ 130; and then, the stored accumulation in $PE_2$ 130 is passed to $PE_3$ 130, which is accumulated with the pSum of $PE_3$ 130 and stored in $PE_3$ 130.

Using the flexible schedule scheme to accumulate 16 pSums within each PE 130, across $PE_0$ 130, $PE_1$ 130, $PE_2$ 130, and $PE_3$ 130 takes 48 cycles (e.g., 16×3=48), which is highly inefficient. It is possible to pipeline the accumulation across PEs 130 in a manner like systolic arrays but any possibility of work imbalance between the PEs 130 (e.g. due to sparsity in data) can easily require more sophisticated control and buffering between the PEs 130 that would likely increase latency. In addition, even with perfect pipelining, the latency for data to be accumulated from the first PE 130 to the last PE 130 can also incur considerable performance overhead. For example, if you were to accumulate across 16 PEs 130 in the vertical or horizontal direction, it would take 15 hops (cycles) before the last PE 130 even starts accumulating, in which case the total accumulation would take 31 cycles to accumulate 16 pSums.

FIG. 3 provides a tree-based pSum accumulation architecture 300 for fixed schedule HW accelerators (also referred to as a "fixed schedule architecture 300") according to various embodiments. The fixed schedule architecture 300 includes PE column 305 with a column length of N (where N is a number of PEs 130 in the PE column 305). The PE column 305 in this example includes $PE_0$ to $PE_{15}$. The fixed schedule architecture 300 also includes an adder tree depth of $\log_2(N)$, which in this example is four. The adder tree depth may refer to the number of layers or cycles of summation/accumulation until a final output point is obtained. The N number of PEs 130 and the adder tree depth are fixed prior to operation using a "fixed schedule."

In the fixed schedule architecture 300, there is no concept of weighting different PEs 130 or selecting subsets of PEs 130 to perform the pSum accumulation. In particular, the value of N, and hence $\log_2(N)$, is fixed. However, one disadvantage of the pSum accumulation scheme for fixed schedule HW accelerators is the fixed value of N. In the example of FIG. 3, the architecture 300 can only support pSum accumulation across N=16 PEs 130 with an adder tree depth of $\log_2(N)$=4, and is not capable of supporting flexibility on how many PEs 130 are used to accumulate pSums. Examples of fixed schedule implementations include weight stationary schemes (see e.g., H. Kwon et al., "An Analytic Model for Cost-Benefit Analysis of Dataflows in DNN Accelerators", arXiv: 1805.02566v2 [cs.DC] (13 Sep. 2018)), no-local reuse schemes (see e.g., Jouppi et al., "In-Datacenter Performance Analysis of a Tensor Processing Unit" Proceedings of the 44th Annual Int'l Symposium on Computer Architecture (ISCA), pgs. 1-12 (24 Jun. 2017)), output stationary schemes, and row stationary schemes (see e.g., Y. Chen et al, "Eyeriss: An Energy-Efficient Reconfigurable Accelerator for Deep Convolutional Neural Networks," 43rd ACM/IEEE ISCA (June 2016)).

The present disclosure provides techniques that use a tree-based architecture to perform pSum accumulation across multiple PEs 130 within a PE array 100 to generate a final output point. In particular, FlexTree is capable of dynamically altering the depth of the adder tree to support flexible schedules programmed by a compiler for network/ML model layers of varying dimensions. This HW enhancement empowers the compiler/scheduler to find schedules that are highly compute efficient. The dynamic reconfiguration of the adder tree depth is achieved via software programmable configuration registers (e.g., configuration registers 202 discussed previously).

Compared to existing HW accelerators supporting flexible schedules, where the pSum accumulation occurs via movement of pSums among neighboring PEs 130, the Flex Tree technique employs a tree-based architecture which improves the efficiency of pSum accumulation significantly (e.g., up to 2.14× speedup in some simulations). Moreover, existing HW accelerators, which operate on a fixed schedule and use an adder tree-based architecture to accumulate pSums, the depth of the adder tree is fixed at design time and cannot be used to accommodate flexible schedules for efficient compute schedules/dataflows derived by the compiler/scheduler. The FlexTree techniques discussed herein overcome the limitations of the fixed depth adder tree architectures owing to the dynamic reconfiguration ability of the adder tree depth, thereby achieving speedups of pSum accumulations. In these ways, the FlexTree techniques discussed herein achieve higher compute efficiency by facilitating improved pSum accumulation across a wide gamut of ML model layers of varying dimensions supported by HW accelerators. Performance optimized HW accelerators play a critical role in inference/prediction determination for various AI applications including imaging, video, and speech applications. The FlexTree techniques discussed herein enable high performance compute HW elements, when running modern AI/ML workloads, to compute inferences/predictions faster and using less compute resources than existing solutions.

In some implementations, the FlexTree scheme involves programming an adder tree depth based on a pSum accumulation partition factor indicated by an optimal schedule that is programmed by the scheduler/compiler. In some implementations, the partition factor may be an input channel inner partition (ICIP) factor (see e.g., FIG. 4 discussed infra). For different dimensions of ML model layers, certain register fields can be programmed to denote the adder tree depth of pSum accumulation. Additionally or alternatively, the programming of these register fields can include additional pins to connect with control/status registers (CSRs) of a host processor, which can be indicated in datasheets and/or other product literature of the particular host processor being used.

Figure 4:
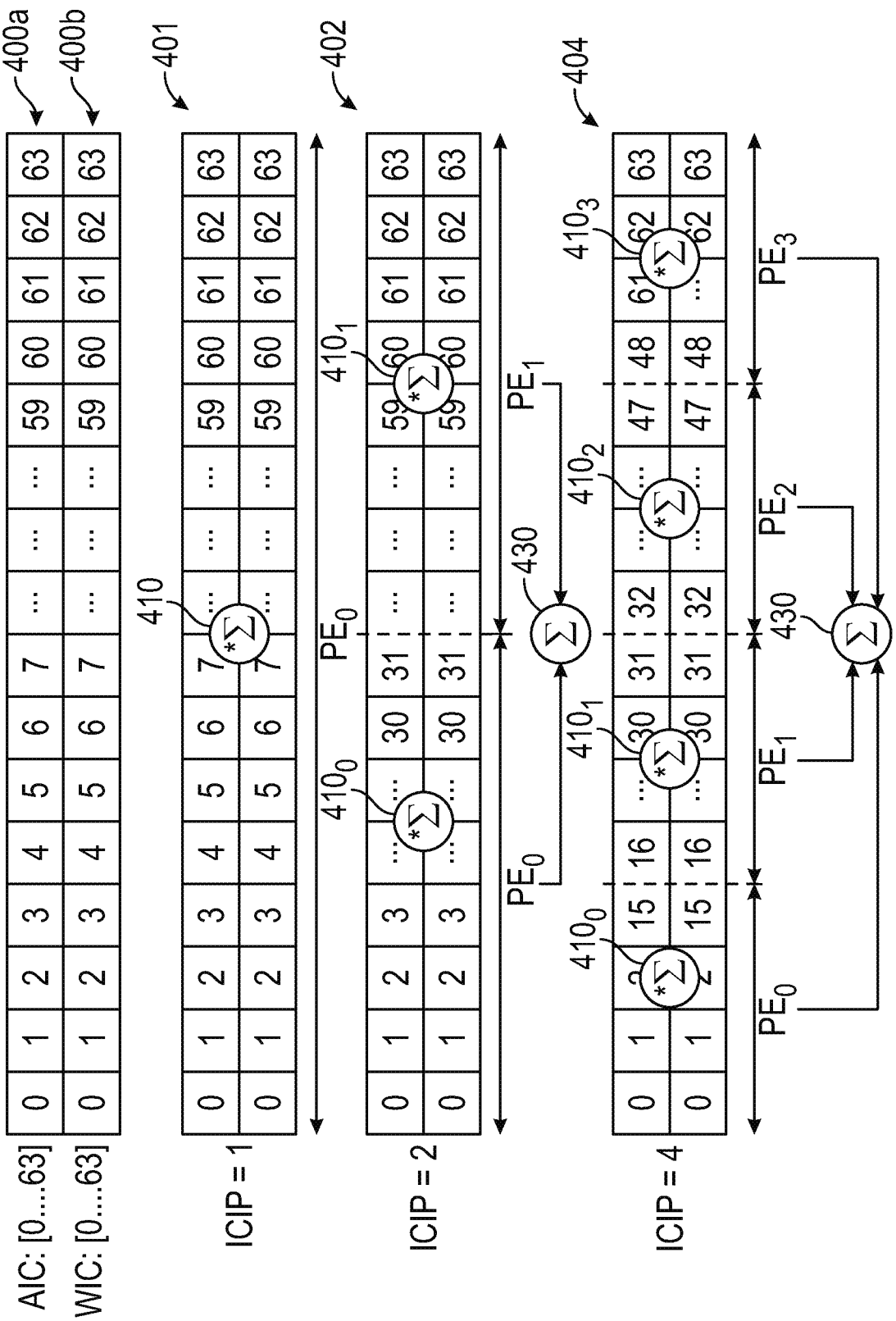
FIG. 4 depicts an example input channel inner partition (ICIP) scheme according to various embodiments.

FIG. 4 illustrates the concept of ICIP according to various embodiments. In general, the term "input channel inner partition" or "ICIP" at least in some embodiments refers to partitioning multiple input channels among one or more PEs 130 and/or MAC units 410. In the example of FIG. 4, there are 64 activation input channels (AICs) 400*a* (e.g., 0 to 63) and 64 weight input channels (WICs) 400*b* (e.g., 0 to 63); the AICs 400*a* and WICs 400*b* may be collectively referred to as input channels (ICs) 400. Although this example includes 64 ICs 400, any number of ICs 400 may be used in other implementations.

For an ICIP 401 with an ICIP factor of 1 (e.g., ICIP=1), the number of PEs 130 involved in computing the final output equals 1, which is $PE_0$ in this example. All the 64 input channels of the activations and weights are pointwise multiplied and accumulated within a single $PE_0$, and the final output is available in $PE_0$. The $PE_0$ includes a single MAC unit 410 (also referred to as "MAC operator 410", "multiply-and-accumulators 410", "multiply-accumulators 410", or "MACs 410") to accumulate the pSums of all of the ICs 400. For an ICIP 402 with an ICIP factor of 2 (e.g., ICIP=2), the 64 input channels are divided among two PEs 130, which include $PE_0$ and PE in this example. Here, each of the PEs 130 work on 32 ICs 400. In this example, $PE_0$ works on ICs 0 to 31 and $PE_1$ works on ICs 32-63 using respective MAC 4100 and 4101. The pSum of ICs 400 from 0-31 and 32-63 are available in $PE_0$ and $PE_1$, respectively. The pSums available in $PE_0$ and $PE_1$ are then accumulated by a pSum accumulation element (pSAE) 430 to form the final output point. For an ICIP 402 with an ICIP factor of 4 (e.g., ICIP=4), the ICs 400 are distributed across four PEs 130, which include $PE_0$, $PE_1$, $PE_2$, and $PE_3$ in this example. Here, each of $PE_0$, $PE_1$, $PE_2$, and $PE_3$ receive 16 ICs 400 each that need to be accumulated to form the final output. In this example, $PE_0$ works on ICs 0 to 15, $PE_1$ works on ICs 16 to 31, $PE_2$ works on ICs 32 to 47, and $PE_3$ works on ICs 48 to 63 using respective MAC 4100, 4101, 4102, and 4103.

The pSums made available in $PE_0$, $PE_1$, $PE_2$, and $PE_3$ are then accumulated by a pSAE 430 to form the final output point. According to various embodiments, the FlexTree mechanism may reside at or in the pSAE 430 to produce the final output result.

Figure 5:
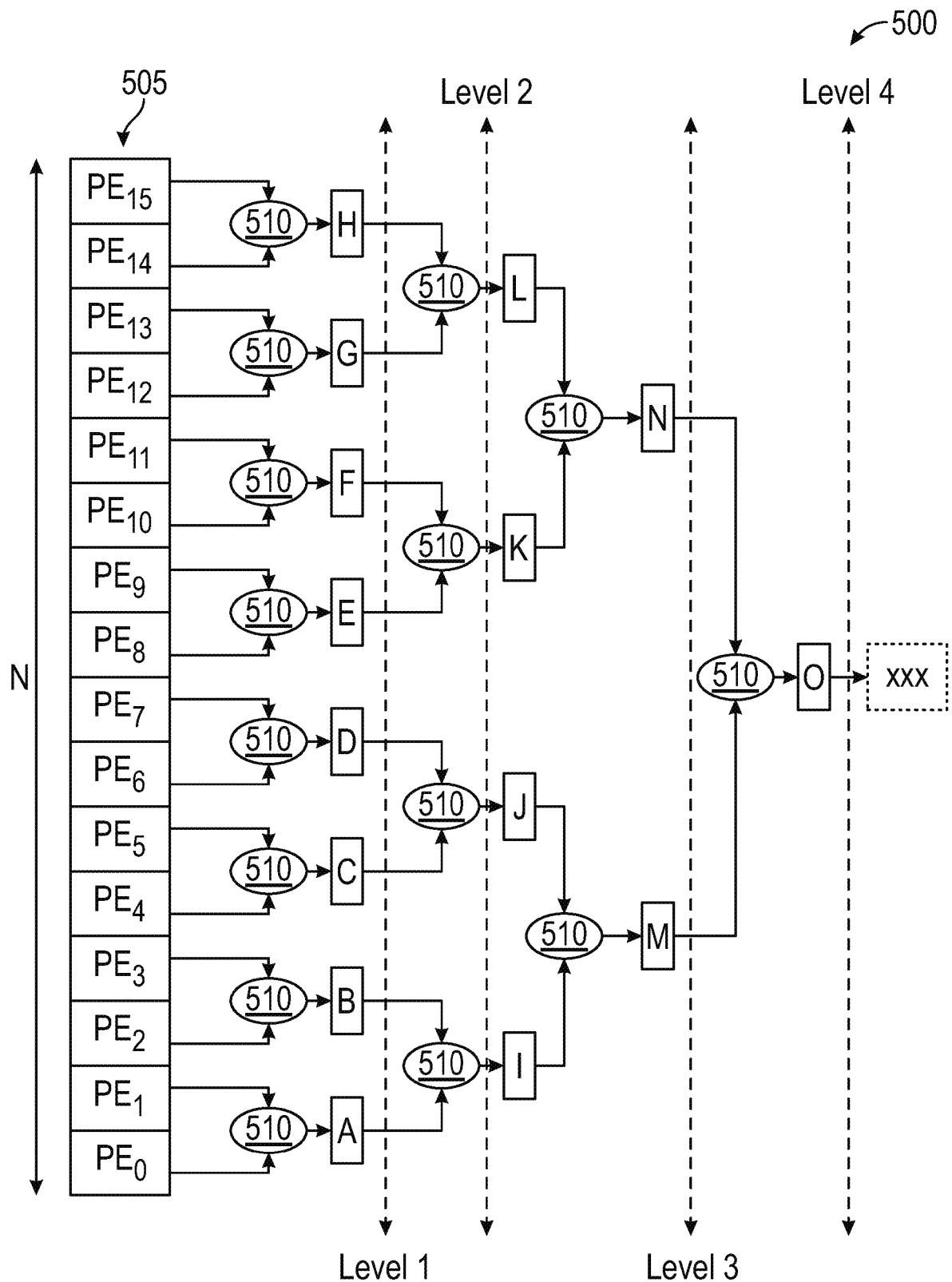
FIG. 5 depicts an example FlexTree architecture according to various embodiments.

FIG. 5 shows an example FlexTree architecture 500 according to various embodiments. The FlexTree architecture 500 (also referred to as "adder tree network 500", "FlexTree network 500", "FlexNN 500", "FlexTree 500", and/or the like), which includes a PE column 505, registers A to H, and pSum accumulation elements (pSAEs) 510 of the FlexTree 500 (which may correspond to the MAC 410 of FIG. 4). In some implementations, the registers A-H can be either integer registers and/or floating point operator (flop) registers depending on the input precision of the pSAEs 510. In this example, the PE column 505 has a column length of N, which in this example includes 16 PEs 130 (e.g., $PE_0$ to $PE_{15}$). The PE column 505 may be an individual column from the PE array 100 of FIG. 1. Although this example includes 16 PEs 130, the PE column 505 may include any number of PEs 130 in other implementations.

In the example of FIG. 5, at a first level (level 1), the pSums of the 16 PEs 130 are reduced to (or accumulated into) 8 pSums at respective registers A to H, which are then reduced to (or accumulated into) 4 pSums at respective registers I to L at a second level (level 2), then reduced to (or accumulated into) 2 pSums at respective registers M and N at a third level (level 3), and then reduced to (or accumulated into) 1 pSum at flop O at a fourth level (level 4). The ranges of ICIP factors (e.g., the number of PEs 130 that participate in pSum accumulation to generate the final output denoted by "ICIP") supported by the adder tree network 500 is 1 to 16 (both inclusive). Each level corresponds to an adder tree depth, for example, level 1 corresponds to an adder tree depth of 1, level 2 corresponds to an adder tree depth of 2, level 3 corresponds to an adder tree depth of 3, and level 4 corresponds to an adder tree depth of 4. Regardless of the ICIP factor, the output of compute passes through the adder tree network 500 before yielding the final OF output. This is done to reduce the hardware overhead via simplification of the hardware design by achieving uniformity across all values of ICIP. In some implementations, the FlexTree 500 can support values of ICIP that are not a power of 2 by feeding zeros into the Flex Tree network 500 at PEs 130 that do not align to power of 2.

Figure 6:
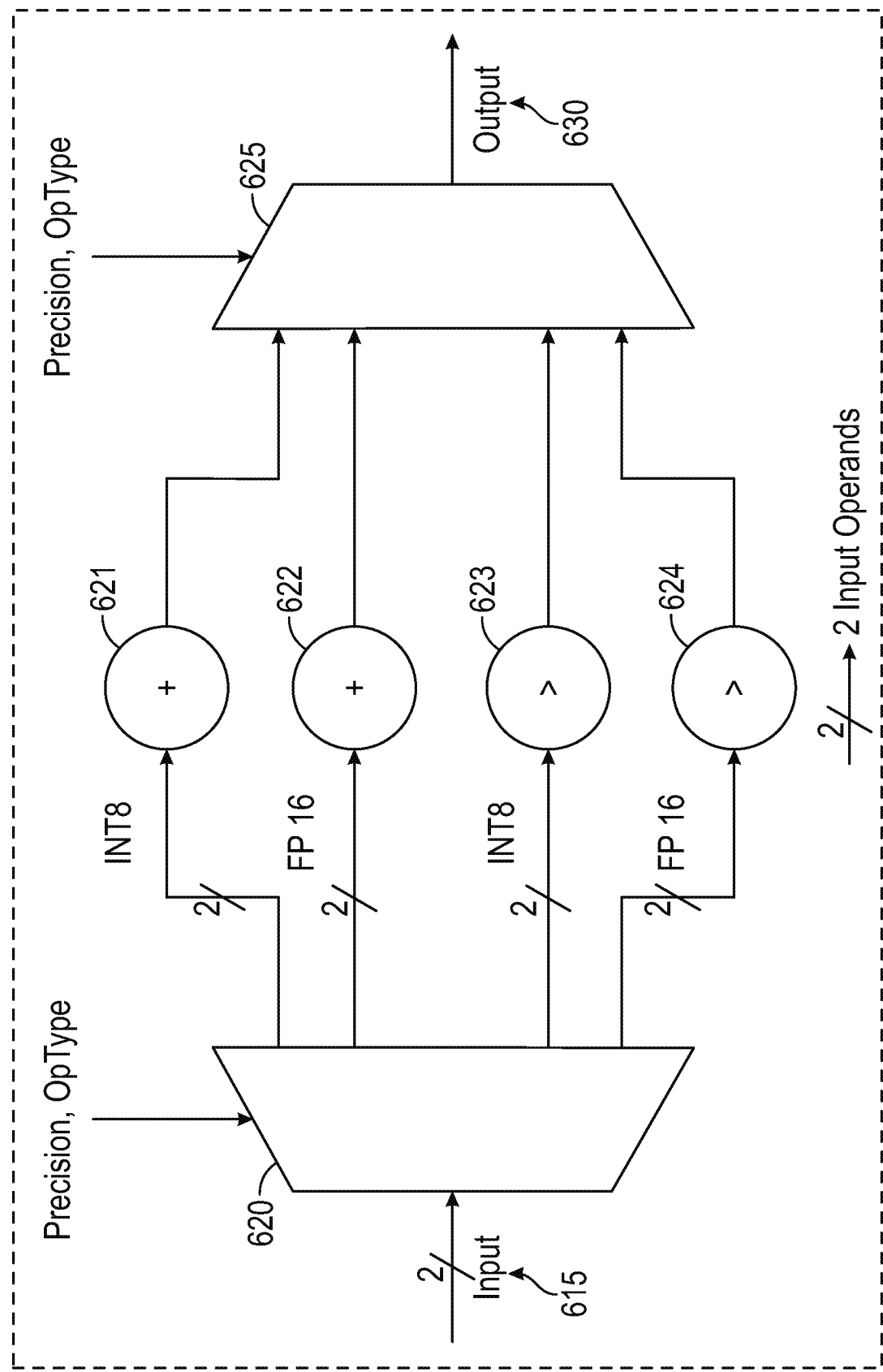
FIG. 6 shows the components of an example pSum accumulation element.

FIG. 6 shows the components of an example pSum accumulation element (pSAE) 510 of the FlexTree 500 according to various embodiments. The pSAE 510 includes a collection of components or operators 621 to 624, including integer adder 621, floating point (fp) adder 622, integer comparitor 623, and fp comparitor 624. In other implementations, additional or alternative components may be included in any suitable arrangement. In this example, the integer adder 621 and integer comparitor 623 may each obtain an 8 bit integer (INT8) value (e.g., with a signed range of −128 to 127 or an unsigned range of 0 to 255), and the fp adder 622 and fp comparitor 624 may each obtain a 16 bit fp (FP16) or half precision value (e.g., with a range of +65,504).

In FIG. 6, respective inputs 615 from two PEs 130 are fed into the input block 620, which may combine the two inputs 615. The input block 620 routes the combined inputs 620 to one or more of the components/operators 621-624 depending on the configured operation(s) to be performed. For example, the specific operators may be selected based on a configured operation type (OpType) and configured precision. The OpType and precision may be indicated by the flexible schedule discussed herein. The components/operator(s) 621-624 perform corresponding operations/transformations on the inputs 515, which is provided to the output block 625. The output block 625 feeds a single output 630 to a next element, such as a flop or the like as shown in FIG. 5.

Various combinations of components/operators can be included to support or enable calculations of various ML model layer aspects. For example, the components/operators 621-624 may support depthwise layers and pooling layers along with convolution layers of a CNN executed by an HW accelerator 2224. Based on the input precision (e.g., INT8 or FP16) and the input operation type (e.g., addition or comparison), the pSum outputs 630 from PEs 130 are routed into the appropriate HW resource within the Flex Tree 500.

Table 1 shows the FlexTree output registers, which serve as the final OF output tap points based on the ICIP factor in the adder tree network 500 of FIG. 5. Here, a "tap point" at least in some embodiments refers to one or more registers from which output point(s) is/are read or otherwise obtained. As shown in Table 1, and with reference to FIG. 5, for ICIP=[I, 2], registers [A, B, C, D, E, F, G, H] at level 1 may be tapped to obtain the final OF output; for ICIP=[4], registers [I, J, K, L] at level 2 are the final OF output tap points; for ICIP=[8], registers [M, N] at level 3 serve as the final OF output tap points; and for ICIP=[16], flop [O] at level 4 serves as the final OF output tap point.

TABLE 1

FlexTree Output Tap Points

| FlexTree Flop | ICIP = 1 Level 1 | ICIP = 2 Level 1 | ICIP = 4 Level 2 | ICIP = 8 Level 3 | ICIP = 16 Level 4 |
|---|---|---|---|---|---|
| A | 1 | 1 | 0 | 0 | 0 |
| B | 1 | 1 | 0 | 0 | 0 |
| C | 1 | 1 | 0 | 0 | 0 |
| D | 1 | 1 | 0 | 0 | 0 |
| E | 1 | 1 | 0 | 0 | 0 |
| F | 1 | 1 | 0 | 0 | 0 |
| G | 1 | 1 | 0 | 0 | 0 |
| H | 1 | 1 | 0 | 0 | 0 |
| I | 0 | 0 | 1 | 0 | 0 |
| J | 0 | 0 | 1 | 0 | 0 |
| K | 0 | 0 | 1 | 0 | 0 |
| L | 0 | 0 | 1 | 0 | 0 |
| M | 0 | 0 | 0 | 1 | 0 |
| N | 0 | 0 | 0 | 1 | 0 |
| O | 0 | 0 | 0 | 0 | 1 |

Note:
0: Flop Output Invalid
1: Flop Output Valid

In the FlexTree architecture 500, registers A,B,C,D,E,F, G,H hold a final output value for ICIP=1, 2, registers I,J,K,L hold the final output for ICIP=4, registers M,N hold the final output value for ICIP=8, and register O holds the output value for ICIP=16. The registers A-H, I-L, M-N and O can be thought of as groups of registers that are tap points for outputs depending upon the value of the ICIP factor [1,2,4,8, or 16]. There is one output extraction point otherwise referred to as a "tap point" per level of the FlexTree 500, for example for ICIP=1, 2 the output is at the first level tap point (registers A-H); for ICIP=4, the output is at the $2^{nd}$ level tap point (registers I-L); for ICIP=8, the output is at the $3^{rd}$ level tap point (registers M,N); and for ICIP=16, the output is at the $4^{th}$ level tap point (register O).

As shown in Table 1, the total number of FlexTree output tap points for different values of ICIPs is variable. For ICIP=[1,2,4,8,16], the total number of FlexTree output tap points is [8,8,4,2,1], respectively. Based on the different partitioning values, which a flexible schedule generator will generate as discussed infra, the final output point can be tapped from different tap points in the FlexTree network 500. In some implementations, to simplify the extraction of the final OF points from the FlexTree module 500 into a drain module (e.g., the same or similar to the drain FSM modules discussed in [AB6904] and/or [AC3143]) a maximum of four output feature map (OF) points can be extracted from the FlexTree output. The multiplexing of the FlexTree outputs (e.g., outputs from registers [A,B,C,D,E,F,G,H,I,J, K,L,M,N,O]) into 4 outputs in such implementations is by in FIG. 7.

Figure 7:
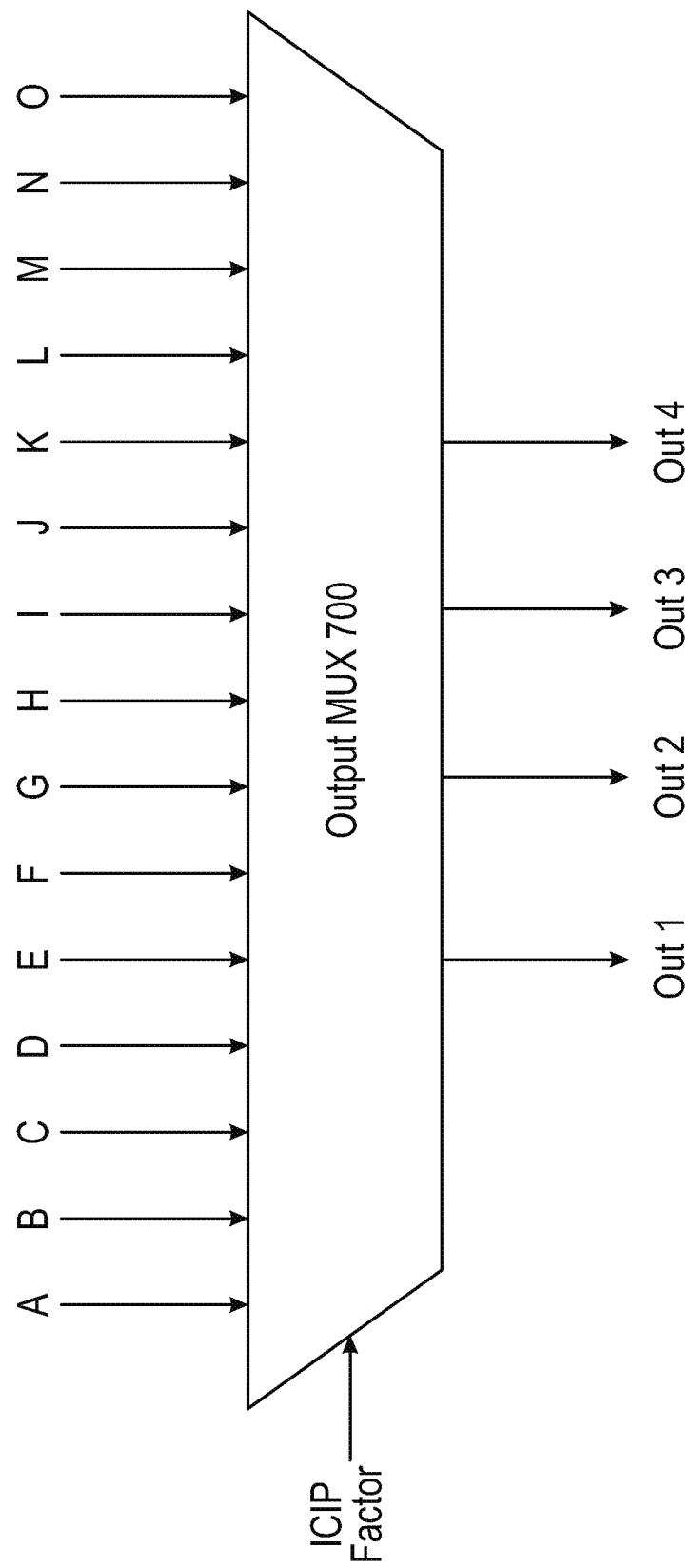
FIG. 7 depicts a FlexTree multiplexer output tap points mapping to drain according to various embodiments.

FIG. 7 shows a FlexTree output multiplexer 700 according to various embodiments. Here, the FlexTree output multiplexer 700 is provided with one or more of the outputs of the registers A to O (see e.g., FIG. 5*a*) and ICIP factor, and outputs one to four outputs (labelled Out1, Out2, Out3, and Out4 in FIG. 7). In some implementations, the FlexTree output multiplexer 700 may be used when the drain module does not have the ability to extract all the output points. In this example, the drain module may only be capable of extracting four output points (e.g., Out1, Out2, Out3, and Out4), and therefore, the drain module may obtain these output points in a serialized fashion over four or fewer cycles according to Table 2, which shows a mapping of multiplexer output tap points to drain.

TABLE 2

Multiplexer Output Tap Points to Drain Mapping

| ICIP Factor | Out1 [Cyc1, Cyc2] | Out2 [Cyc1, Cyc2] | Out3 [Cyc1, Cyc2] | Out4 [Cyc1, Cyc2] |
|---|---|---|---|---|
| 1 | [A, B] | [C, D] | [E, F] | [G, H] |
| 2 | [A, B] | [C, D] | [E, F] | [G, H] |
| 4 | [I, —] | [J, —] | [K, —] | [L, —] |
| 8 | [M, —] | [—, —] | [N, —] | [—, —] |
| 16 | [—, —] | [O, —] | [—, —] | [—, —] |

— Indicates output not applicable

In Table 2, if the ICIP factor is 1 or 2, then the drain module may extract the output points from registers A and B via Out1, registers C and D via Out2, registers E and F via Out3, and registers G and H via Out 4. Here, the output points from registers A, C, E, and G are obtained during a first cycle (Cyc1) and the output points from registers B, D, F, and H are obtained during a second cycle (Cyc2). If the ICIP factor is 4, then the drain module may extract the output points from flop I via Out1, flop J via Out2, flop K via Out, and flop L via Out 4 during Cyc1, and no output points during Cyc2. If the ICIP factor is 8, then the drain module may extract the output points from flop M via Out1 and flop N via Out 3 during Cyc1, and no output points during Cyc2. If the ICIP factor is 16, then the drain module may extract the output points from flop O via Out2 during Cyc1. In various embodiments, the final output point can be tapped from different tap points and accumulated in the drain module, and an example operations of such a drain module are shown by FIG. 8.

Figure 8:
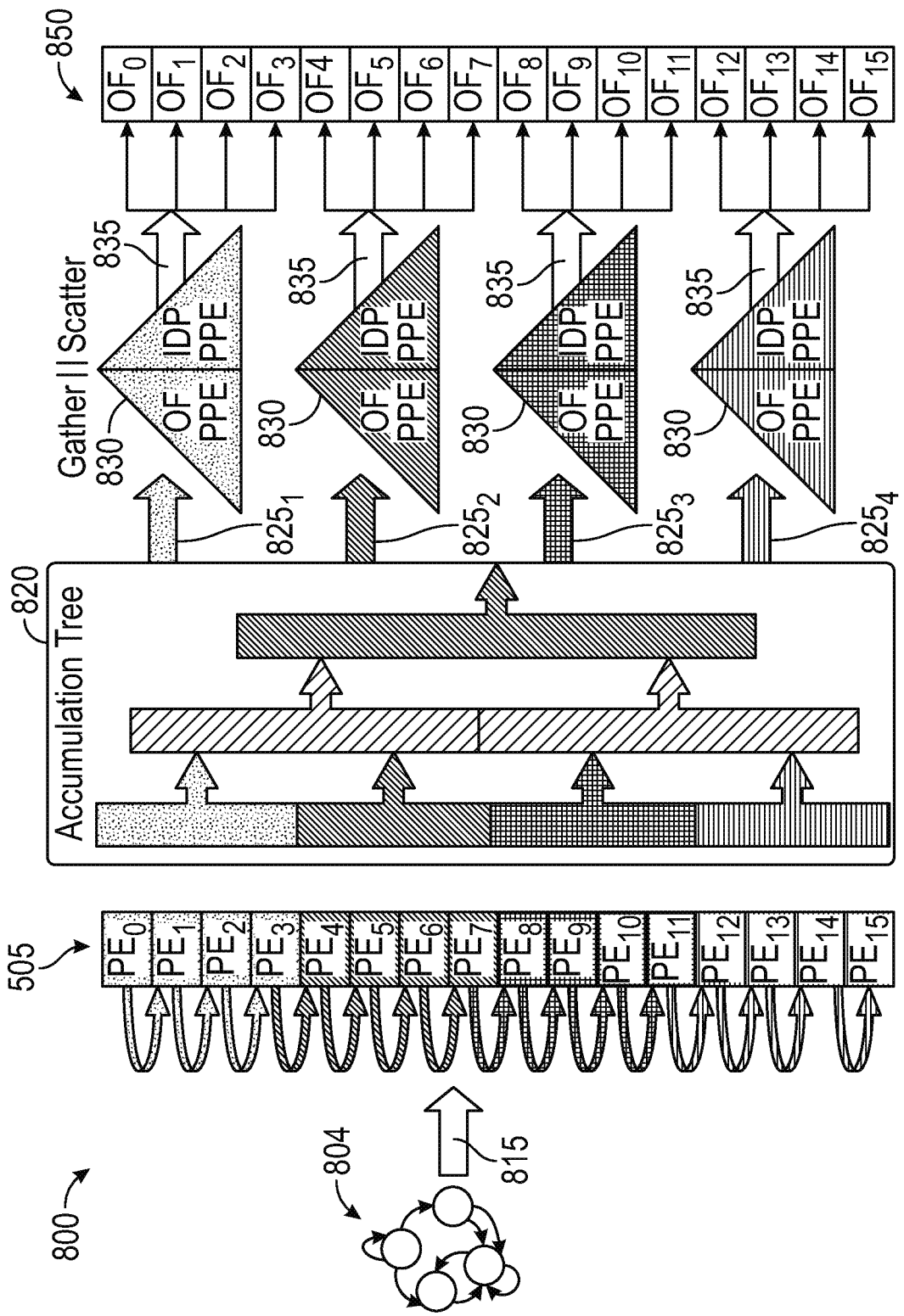
FIG. 8 depicts local drain of FlexNN PE column based on ICIP values according to various embodiments.

FIG. 8 shows the components of a local drain operation 800 according to various embodiments. The drain operation 800 may be local to an individual PE column 505 based on ICIP values of that PE column 505. The local drain operation 800 may be performed by a suitable drain module such as the drain FSM module discussed in [AB6904] and/or [AC3143]. The local drain 800 extracts the output of the FlexTree 500 on a per-column 505 basis (e.g., in this example, each column 505 has 16 PEs and 1 FlexTree 500), and outputs of a set of columns 505 are handled by the global drain (not shown by FIG. 8). In one example implementation, there may be 16 columns 505 handled by the global drain (not shown by FIG. 8). The local drain 800 includes a drain LDS 804, accumulation tree 820, one or more Post Processing Engines (PPEs) 830, and an array of N output points 850 (where N is a number).

The drain LDS 804 may be the same or similar to the LDS 204 and/or the drain FSMs discussed in [AB6904], [AC3143], [AC5200], and/or [AD5164]. The drain LDS 804 is part of the HW accelerator 2224, which is responsible for extracting the final OF points out of the PEs 130 in each PE column 505 of the PE array 100, and sending the extracted final OF points to a global drain (e.g., the global drain may be the same or similar to drain FSM modules discussed in [AB6904] and/or [AC3143]) where the OCs can be zero compressed and rearranged in a manner that can be consumed by the HW accelerator 2224 during the execution of a next layer in an ML model (e.g., DNN layer, etc.). The drain LDS 804 works based on an optimal schedule (see e.g., [AB6904], [AC3143], [AC5200], and [AD5164]) of an ML model layer, and in particular, when based on the ICIP values generated as part of the schedule 804. The LDS 804 may be in a form of any suitable data structure such as, for example, an aggregate, tree (e.g., abstract syntax tree or the like), graph (e.g., a directed acyclic graph (DAG)), stack, queue, hash table, finite automaton, FSM, model of computation, logical data model, logical schema, and/or other like data structure that describes the logic, data, elements, etc. to generate control signals to extract the final OF points out of the PEs 130. The LDS 804 generates (or is used to generate) one or more control signals 815. The signal(s) 815 may include a read address signal (rdaddr) and read-enable (rden) control signal. The rdaddr indicates an address of the OF RF 283 from which to read the output, and the rden control signal is a read enable input for the OF RF 283 address included in the rdaddr.

The one or more signals 815 cause one or more PEs 130 to provide their stored pSums to the accumulation tree 820. For example, the stored pSums may be transferred from respective RFs 208 of the PEs 130 into one or more pSAEs 430 of the accumulation tree 820. The accumulation tree 820 produces one or more signals 825 to provide the accumulation data to the PPEs 830. In some implementations, each of the one or more signals 825 may correspond to the output signals (Out1, Out2, Out3, and Out4) in FIG. 7. For example, signal 8251 may correspond to Out1, signal 8252 may correspond to Out2, signal 8253 may correspond to Out3, and signal 8254 may correspond to Out4. In some implementations, the one or more signals 825 includes an accumulation data signal (accum_data) that includes raw accumulated pSums, and a validity indicator (accum_valid) indicating whether the accum_data is valid (or not) and/or indicating a level of confidence in the validity of the accum_data.

Continuing with the example of FIG. 7, the multiplexer 700 is used to route one or all of the 4 Flex Tree outputs (e.g., a maximum of 4 from registers A-O in a single cycle, based on ICIP values it can be 4 or 2 or 1. Since the there are four FlexTree outputs, each of the draining OF points (e.g., Out1, Out2, Out3, and Out4 in FIG. 7) from a set of four PEs 130 (see e.g., Table 2), the rdaddr and rden signals of the OF RF need to be properly sequenced to extract the OF points from the PEs 130 determined by the ICIP values. The 4 outputs Out1-4 can be driven by either registers A-H for ICIP=1 or 2, by registers I-L for ICIP=4, by registers M,N for ICIP=8, or by registers O for ICIP=16. When there are 8 values in registers A-H to be driven onto a 4 output interface, the outputs can be obtained over 2 cycles and when there are 4 or less values to be driven onto the 4 outputs, as in case ICIP=4, 8, 16, the outputs can be obtained over a single cycle. For example, if the ICIP factor is 1, the LDS 804 enables the drain of the OF points in a round-robin fashion from each PE 130; if the ICIP factor is 2, the points are extracted from every alternate PE 130; and so forth (see e.g., Table 2). The drain LDS 804 (or controller operating according to the LDS 804) implements this logic in the form of one or multiple nested conditions. Since a limited number of ICIP values are used (e.g., 1, 2, 4, 8, and 16), the overhead for implementing this logic is negligible compared to the entire ML accelerator 2224 or even the drain LDS 804 logic.

After the output points are extracted from the appropriate PEs 130 and accumulated through the accumulation tree 820, the output points are sent to one or more PPEs 830 for further processing of the values such as, for example, application of per output channel bias, scale, and/or the like. Each of the one or more PPEs 830 may include an output feature map (OF) PPE to perform various post-processing tasks on the OF points (e.g., channel biasing, scale, ReLU, PreLU, hyperbolic tangent (tanh), and/or one or more other activation functions and/or the like), and an input data precision (IDP) (e.g., INT or FP) PPE to perform data post-processing tasks (e.g., scaling, channel biasing, ReLU, PreLU, hyperbolic tangent (tanh), and/or one or more other activation functions and/or the like). The one or more PPEs 830 produce one or more signals 835 for placing the OF points into corresponding output buffers in the buffer array 850 (labelled $OF_0$ to $OF_{15}$ in FIG. 8). The respective output buffers $OF_0$ to $OF_{15}$ store OF points of corresponding ones of the PEs 130 before being moved into a suitable memory and/or storage location. In some implementations, the one or more signals 835 include a PPE data signal (ppe_data) that includes the post-processed OF points to be stored in respective output buffers $OF_0$ to $OF_{15}$, and a validity indicator (ppe_valid) indicating whether the accum_data is valid (or not) and/or indicating a level of confidence in the validity of the ppe_data.

FIGS. 9-12 show the sequencing of pSum values from $PE_0$ to $PE_{15}$ in time into the FlexTree network for ICIP values equal to 1, 2, 4 and 8, respectively. The following tables show the output tap points corresponding to the sequences depicted by FIGS. 9-12. The FlexTree output tap points have been highlighted using bold text in Table 3b Table 4b, Table 5b, and Table 6b. The timing diagram of the input and output to the FlexTree module for different values of ICIP are shown in FIG. 9, FIG. 10, FIG. 11, and FIG. 12. The notation vD* (where * is a number) is used to denote valid pSum data output from an individual PE 130 at a given time instant into the FlexTree module 800/820 input.

Figure 9:
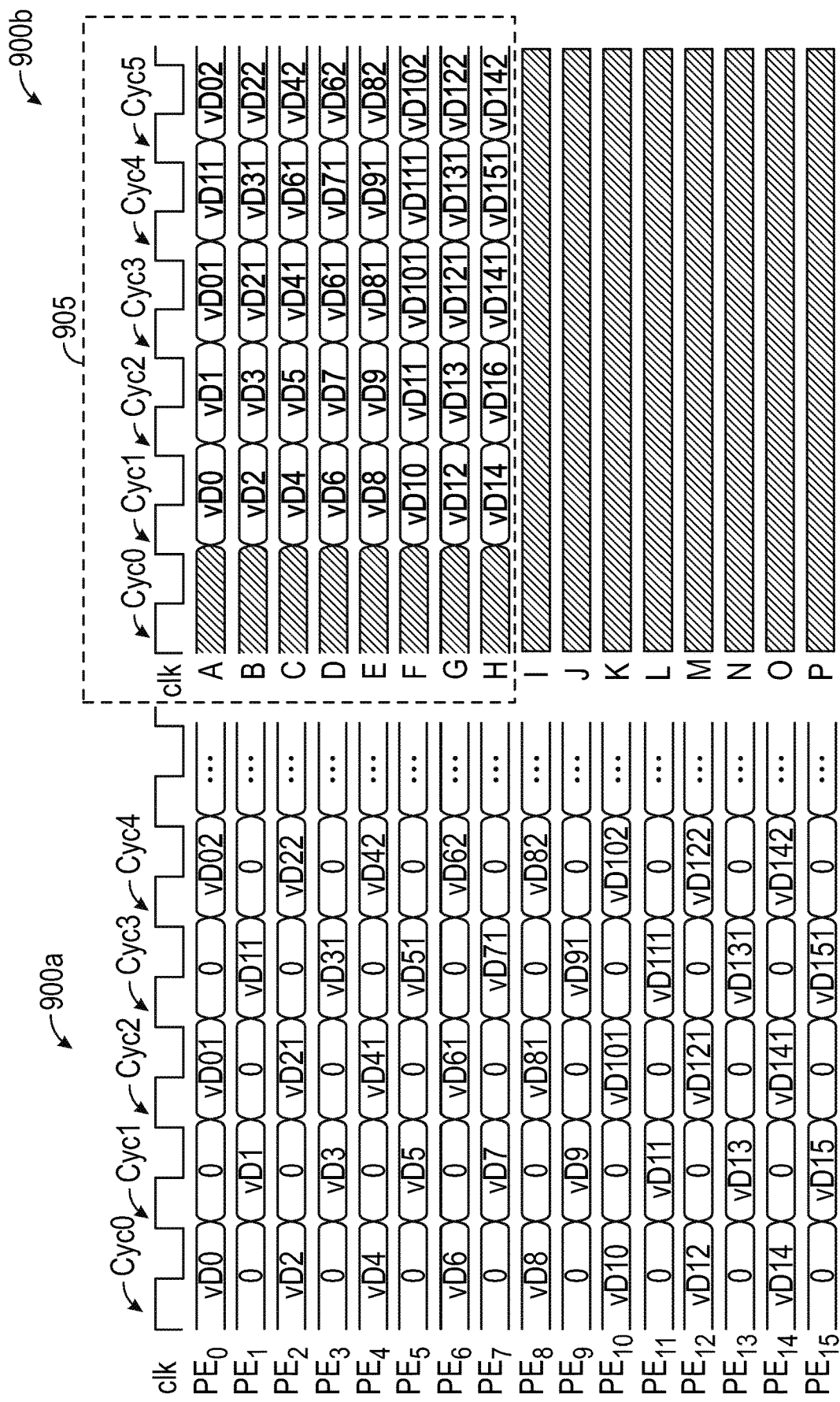
FIGS. 9, 10, 11, and 12 depict various FlexTree timing diagrams for various ICIP factors.

FIG. 9 shows FlexTree timing diagrams for an ICIP factor of 1 (e.g., ICIP=1) according to various embodiments. FIG. 9 includes input timing diagram 900a for cycle (Cyc) 0 through Cyc4 of an input clock signal (clk), and output timing diagram 900b showing outputs 905 for Cyc0 to Cyc5 of an output clk. Table 3a shows the FlexTree input sequencing for ICIP factor of 1 (e.g., corresponding to input timing diagram 900a), and Table 3b shows the FlexTree output sequencing for ICIP factor of 1 (e.g., corresponding to output timing diagram 900b).

TABLE 3a

FlexTree input and output sequencing for ICIP = 1

| ICIP = 1 | Cyc0 | Cyc1 | Cyc2 | Cyc3 | Cyc4 |
|---|---|---|---|---|---|
| PE0 | vD0 | 0 | vD01 | 0 | vD02 |
| PE1 | 0 | vD1 | 0 | vD11 | 0 |
| PE2 | vD2 | 0 | vD21 | 0 | vD22 |
| PE3 | 0 | vD3 | 0 | vD31 | 0 |
| PE4 | vD4 | 0 | vD41 | 0 | vD42 |
| PE5 | 0 | vD5 | 0 | vD51 | 0 |
| PE6 | vD6 | 0 | vD61 | 0 | vD62 |
| PE7 | 0 | vD7 | 0 | vD71 | 0 |
| PE8 | vD8 | 0 | vD81 | 0 | vD82 |
| PE9 | 0 | vD9 | 0 | vD91 | 0 |
| PE10 | vD10 | 0 | vD101 | 0 | vD102 |
| PE11 | 0 | vD11 | 0 | vD111 | 0 |
| PE12 | vD12 | 0 | vD121 | 0 | vD122 |
| PE13 | 0 | vD13 | 0 | vD131 | 0 |
| PE14 | vD14 | 0 | vD141 | 0 | vD142 |
| PE15 | 0 | vD15 | 0 | vD151 | 0 |

TABLE 3B

FlexTree input and output sequencing for ICIP = 1

| ICIP = 1 | Cyc0 | Cyc1 | Cyc2 | Cyc3 | Cyc4 | Cyc5 |
|---|---|---|---|---|---|---|
| A | X | vD0 | vD1 | vD01 | vD11 | vD02 |
| B | X | vD2 | vD3 | vD21 | vD31 | vD22 |
| C | X | vD4 | vD5 | vD41 | vD51 | vD42 |
| D | X | vD6 | vD7 | vD61 | vD71 | vD62 |
| E | X | vD8 | vD9 | vD81 | vD91 | vD82 |
| F | X | vD10 | vD11 | vD101 | vD111 | vD102 |
| G | X | vD12 | vD13 | vD121 | vD131 | vD122 |
| H | X | vD14 | vD15 | vD141 | vD151 | vD142 |
| I | X | X | X | X | X | X |
| J | X | X | X | X | X | X |
| K | X | X | X | X | X | X |
| L | X | X | X | X | X | X |
| M | X | X | X | X | X | X |
| N | X | X | X | X | X | X |
| O | X | X | X | X | X | X |
| P | X | X | X | X | X | X |

As shown by timing diagram 900b, when the ICIP factor is 1, the final output is available after 1 cycle from the input. Additionally, as shown by Table 3b, the FlexTree output tap points for ICIP=1 are registers A, B, C, D, E, F, G, and H. For an ICIP factor of 1, no adder tree is required as the pSum output of the individual PEs 130 is the final OF output itself. However, in some implementations, the final OF output values are still passed through the adder tree network 800/820 to simplify the HW design and achieve uniformity across multiple ICIP values. In other implementations, a suitable bypass mechanism may be used to bypass the adder tree network 800/820 when the ICIP factor is 1.

Figure 10:
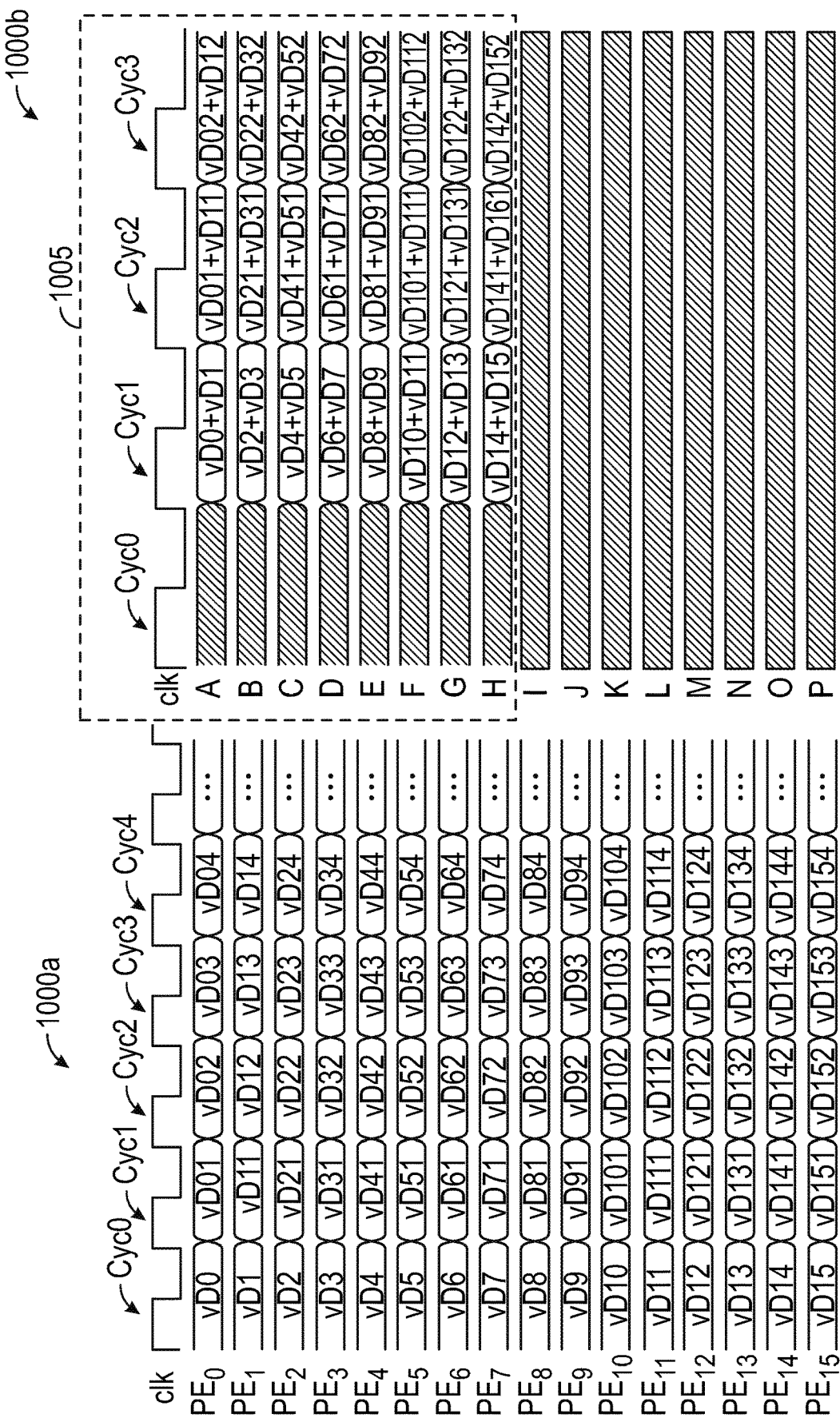

FIG. 10 shows FlexTree timing diagrams for an ICIP factor of 2 (e.g., ICIP=2) according to various embodiments. FIG. 10 includes input timing diagram 1000a for Cyc0 to Cyc4 of an input clk, and output timing diagram 1000b showing outputs 1005 for Cyc0 to Cyc3 of an output clk. Table 4a shows the FlexTree input sequencing for ICIP factor of 2 (e.g., corresponding to input timing diagram 1000a), and Table 4b shows the FlexTree output sequencing for ICIP factor of 2 (e.g., corresponding to output timing diagram 1000b).

TABLE 4a

FlexTree input and output sequencing for ICIP = 2

| ICIP = 2 | Cyc0 | Cyc1 | Cyc2 | Cyc3 | Cyc4 |
|---|---|---|---|---|---|
| PE0 | vD0 | vD01 | vD02 | vD03 | vD04 |
| PE1 | vD1 | vD11 | vD12 | vD13 | vD14 |
| PE2 | vD2 | vD21 | vD22 | vD23 | vD24 |
| PE3 | vD3 | vD31 | vD32 | vD33 | vD34 |
| PE4 | vD4 | vD41 | vD42 | vD43 | vD44 |
| PE5 | vD5 | vD51 | vD52 | vD53 | vD54 |
| PE6 | vD6 | vD61 | vD62 | vD63 | vD64 |
| PE7 | vD7 | vD71 | vD72 | vD73 | vD74 |
| PE8 | vD8 | vD81 | vD82 | vD83 | vD84 |
| PE9 | vD9 | vD91 | vD92 | vD93 | vD94 |
| PE10 | vD10 | vD101 | vD102 | vD103 | vD104 |
| PE11 | vD11 | vD111 | vD112 | vD113 | vD114 |
| PE12 | vD12 | vD121 | vD122 | vD123 | vD124 |
| PE13 | vD13 | vD131 | vD132 | vD133 | vD134 |
| PE14 | vD14 | vD141 | vD142 | vD143 | vD144 |
| PE15 | vD15 | vD151 | vD152 | vD153 | vD154 |

TABLE 4b

| ICIP = 2 | Cyc0 | Cyc1 | Cyc2 | Cyc3 |
|---|---|---|---|---|
| A | X | vD0 + vD1 | vD01 + vD11 | vD02 + vD12 |
| B | X | vD2 + vD3 | vD21 + vD31 | vD22 + vD32 |
| C | X | vD4 + vD5 | vD41 + vD51 | vD42 + vD52 |
| D | X | vD6 + vD7 | vD61 + vD71 | vD62 + vD72 |
| E | X | vD8 + vD9 | vD81 + vD91 | vD82 + vD92 |
| F | X | vD10 + vD11 | vD101 + vD111 | vD102 + vD112 |
| G | X | vD12 + vD13 | vD121 + vD131 | vD122 + vD132 |
| H | X | vD14 + vD15 | vD141 + vD151 | vD142 + vD152 |
| I | X | X | X | X |
| J | X | X | X | X |
| K | X | X | X | X |
| L | X | X | X | X |
| M | X | X | X | X |
| N | X | X | X | X |
| O | X | X | X | X |
| P | X | X | X | X |

As shown by timing diagram 1000b, when the ICIP factor is 2, the final output is available after 1 cycle from the input since the FlexTree adder tree depth is $\log_2(2)=1$. As shown by Table 4b, when the ICIP factor is 2, the FlexTree output tap points are registers A, B, C, D, E, F, G, and H.

Figure 11:
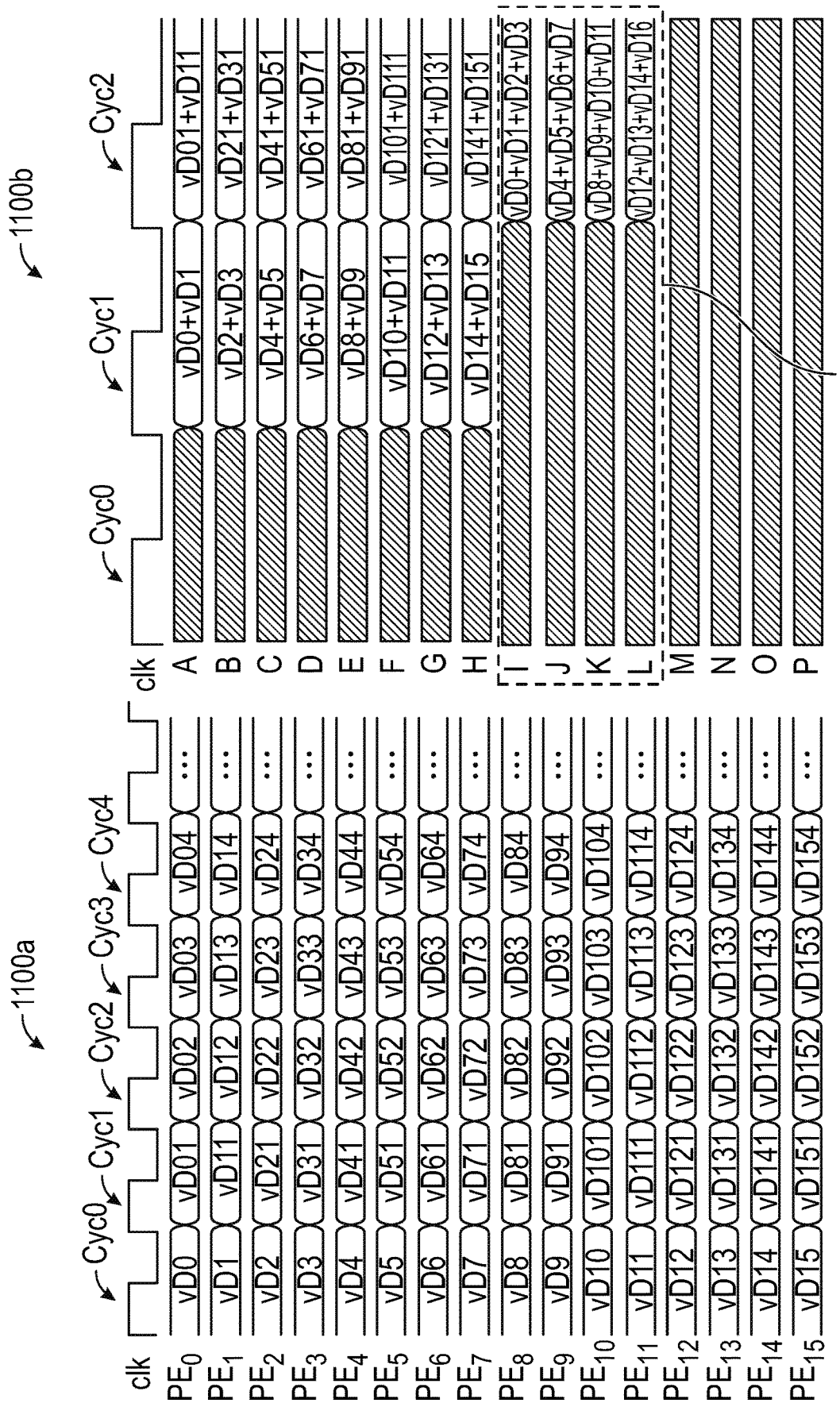

FIG. 11 shows FlexTree timing diagrams for ICIP factor of 4 (e.g., ICIP=4) according to various embodiments. FIG. 11 includes input timing diagram 1100a for Cyc0 to Cyc4 of an input clk, and output timing diagram 1100b showing outputs 1105 for Cyc0 to Cyc2 of an output clk. Table 5a shows the FlexTree input sequencing for ICIP factor of 4 (e.g., corresponding to input timing diagram 1100a), and Table 5b shows the FlexTree output sequencing for ICIP factor of 4 (e.g., corresponding to output timing diagram 1100b).

TABLE 5a

FlexTree input and output sequencing for ICIP = 4

| ICIP = 4 | Cyc0 | Cyc1 | Cyc2 | Cyc3 | Cyc4 |
|---|---|---|---|---|---|
| PE0 | vD0 | vD01 | vD02 | vD03 | vD04 |
| PE1 | vD1 | vD11 | vD12 | vD13 | vD14 |
| PE2 | vD2 | vD21 | vD22 | vD23 | vD24 |
| PE3 | vD3 | vD31 | vD32 | vD33 | vD34 |
| PE4 | vD4 | vD41 | vD42 | vD43 | vD44 |
| PE5 | vD5 | vD51 | vD52 | vD53 | vD54 |
| PE6 | vD6 | vD61 | vD62 | vD63 | vD64 |
| PE7 | vD7 | vD71 | vD72 | vD73 | vD74 |

TABLE 5a-continued

FlexTree input and output sequencing for ICIP = 4

| ICIP = 4 | Cyc0 | Cyc1 | Cyc2 | Cyc3 | Cyc4 |
|---|---|---|---|---|---|
| PE8 | vD8 | vD81 | vD82 | vD83 | vD84 |
| PE9 | vD9 | vD91 | vD92 | vD93 | vD94 |
| PE10 | vD10 | vD101 | vD102 | vD103 | vD104 |
| PE11 | vD11 | vD111 | vD112 | vD113 | vD114 |
| PE12 | vD12 | vD121 | vD122 | vD123 | vD124 |
| PE13 | vD13 | vD131 | vD132 | vD133 | vD134 |
| PE14 | vD14 | vD141 | vD142 | vD143 | vD144 |
| PE15 | vD15 | vD151 | vD152 | vD153 | vD154 |

TABLE 5b

| ICIP = 4 | Cyc0 | Cyc1 | Cyc2 |
|---|---|---|---|
| A | X | vD0 + vD1 | vD01 + vD11 |
| B | X | vD2 + vD3 | vD21 + vD31 |
| C | X | vD4 + vD5 | vD41 + vD51 |
| D | X | vD6 + vD7 | vD61 + vD71 |
| E | X | vD8 + vD9 | vD81 + vD91 |
| F | X | vD10 + vD11 | vD101 + vD111 |
| G | X | vD12 + vD13 | vD121 + vD131 |
| H | X | vD14 + vD15 | vD141 + vD151 |
| I | X | X | vD0 + vD1 + vD2 + vD3 |
| J | X | X | vD4 + vD5 + vD6 + vD7 |
| K | X | X | vD8 + vD9 + vD10 + vD11 |
| L | X | X | vD12 + vD13 + vD14 + vD15 |
| M | X | X | X |
| N | X | X | X |
| O | X | X | X |

As shown by timing diagram 1100b, when the ICIP factor is 2, the final output is available after 2 cycles from the input since the FlexTree adder tree depth is $\log_2(4)=2$. As shown by Table 5b, when the ICIP factor is 4, the FlexTree output tap points are registers I, J, K, and L.

Figure 12A:
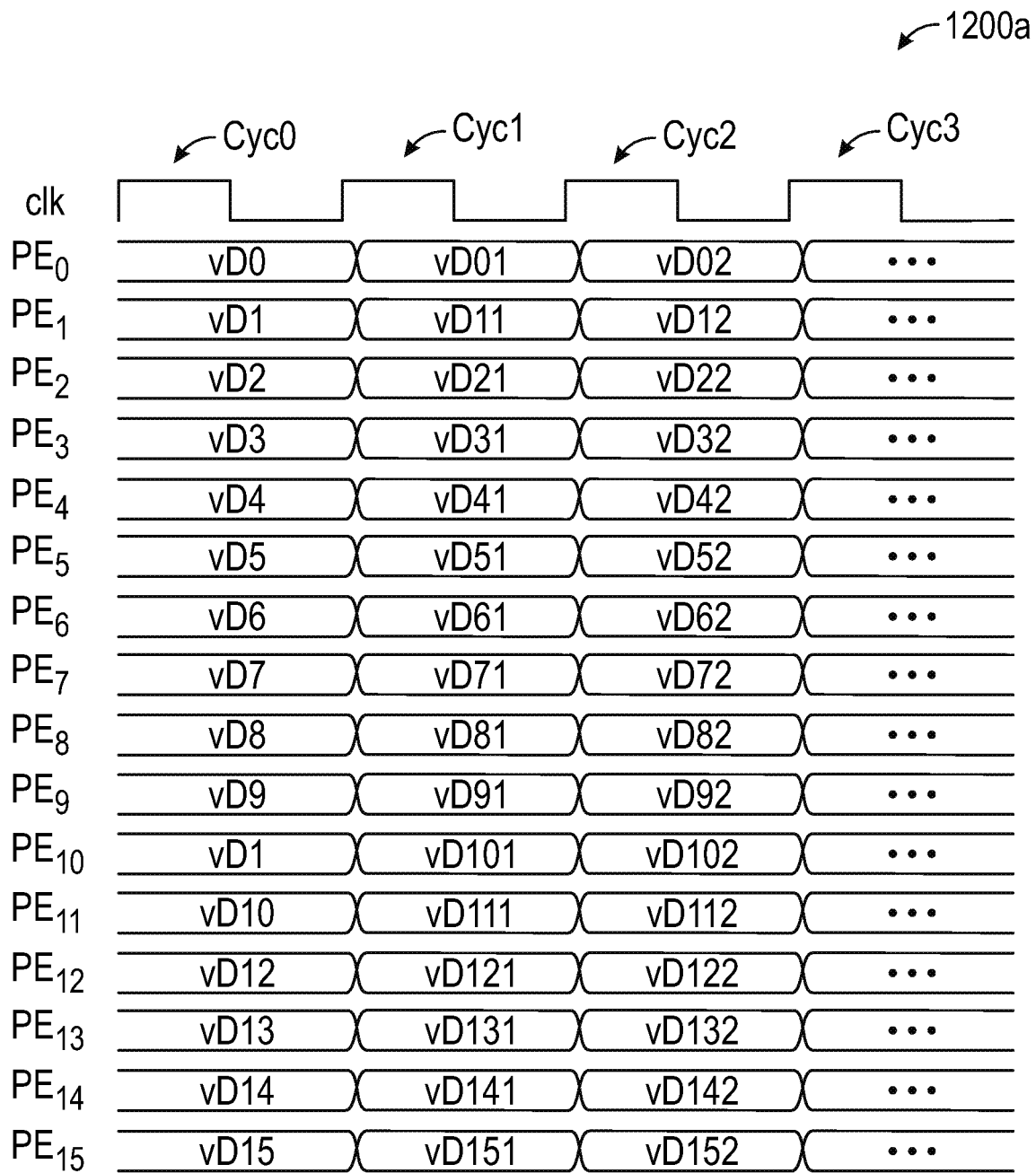
Figure 12B:
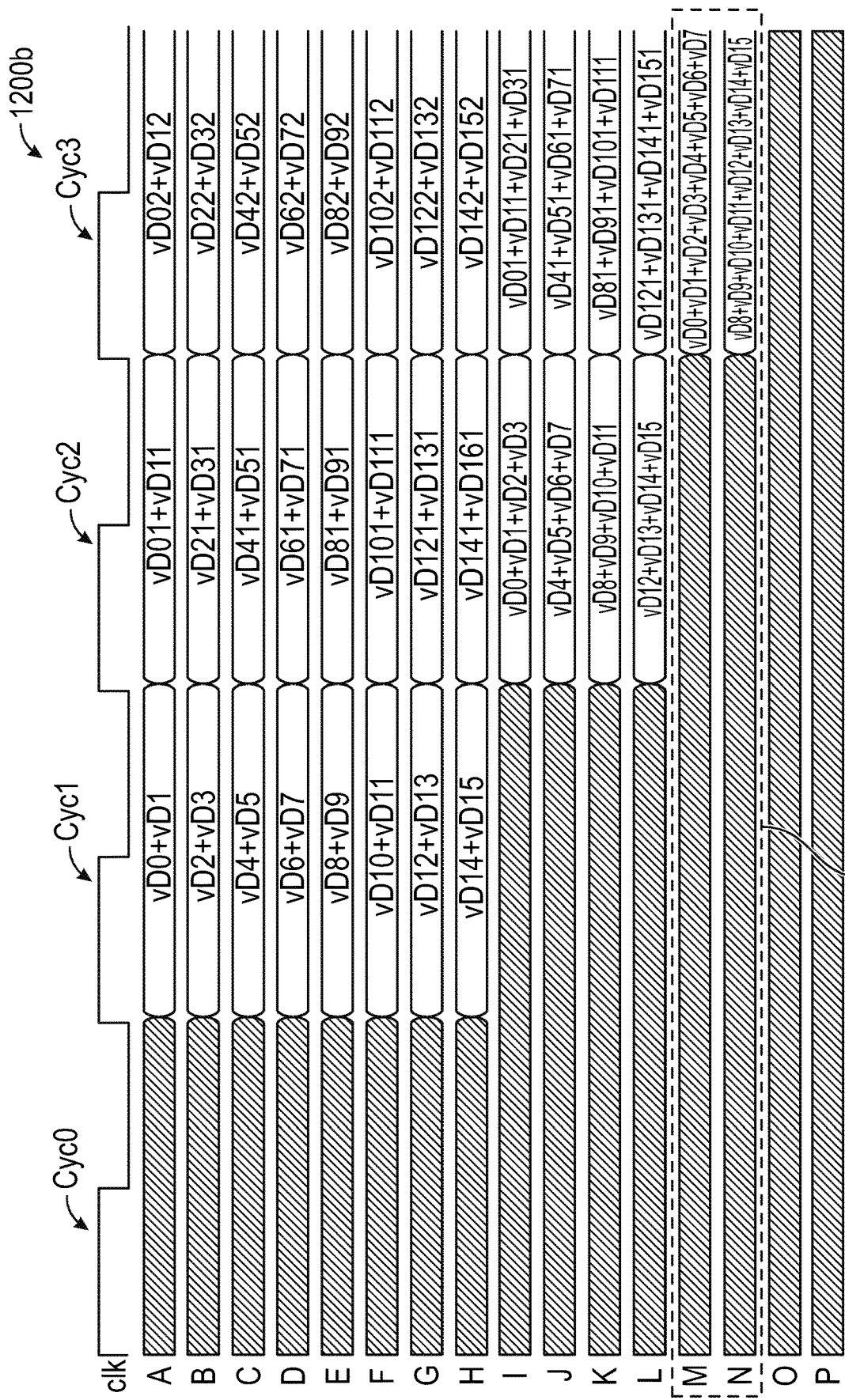

FIGS. 12a and 12b show FlexTree timing diagrams for ICIP factor of 8 (e.g., ICIP=8) according to various embodiments. FIG. 12a includes input timing diagram 1200a for Cyc0 to Cyc3 of an input clk, and FIG. 12b includes output timing diagram 1200b showing outputs 1205 for Cyc0 to Cyc3 of an output clk. Table 6a shows the FlexTree input sequencing for ICIP factor of 8 (e.g., corresponding to input timing diagram 1200a), and Table 6b shows the Flex Tree output sequencing for ICIP factor of 8 (e.g., corresponding to output timing diagram 1200b).

TABLE 6a

FlexTree input and output sequencing for ICIP = 8

| ICIP = 8 | Cyc0 | Cyc1 |
|---|---|---|
| PE0 | vD0 | vD01 |
| PE1 | vD1 | vD11 |
| PE2 | vD2 | vD21 |
| PE3 | vD3 | vD31 |
| PE4 | vD4 | vD41 |
| PE5 | vD5 | vD51 |
| PE6 | vD6 | vD61 |
| PE7 | vD7 | vD71 |
| PE8 | vD8 | vD81 |
| PE9 | vD9 | vD91 |
| PE10 | vD10 | vD101 |
| PE11 | vD11 | vD111 |
| PE12 | vD12 | vD121 |
| PE13 | vD13 | vD131 |
| PE14 | vD14 | vD141 |
| PE15 | vD15 | vD151 |

TABLE 6b

| ICIP = 8 | Cyc0 | Cyc1 | Cyc2 | Cyc3 |
|---|---|---|---|---|
| A | X | vD0 + vD1 | vD01 + vD11 | vD02 + vD12 |
| B | X | vD2 + vD3 | vD21 + vD31 | vD22 + vD32 |
| C | X | vD4 + vD5 | vD41 + vD51 | vD42 + vD52 |
| D | X | vD6 + vD7 | vD61 + vD71 | vD62 + vD72 |
| E | X | vD8 + vD9 | vD81 + vD91 | vD82 + vD92 |
| F | X | vD10 + vD11 | vD101 + vD111 | vD102 + vD112 |
| G | X | vD12 + vD13 | vD121 + vD131 | vD122 + vD132 |
| H | X | vD14 + vD15 | vD141 + vD151 | vD142 + vD152 |
| I | X | X | vD0 + vD1 + vD2 + vD3 | vD01 + vD11 + vD21 + vD31 |
| J | X | X | vD4 + vD5 + vD6 + vD7 | vD41 + vD51 + vD61 + vD71 |
| K | X | X | vD8 + vD9 + vD10 + vD11 | vD81 + vD91 + vD101 + vD111 |
| L | X | X | vD12 + vD13 + vD14 + vD15 | vD121 + vD131 + vD141 + vD151 |
| M | X | X | X | vD0 + vD1 + vD2 + vD3 + vD4 + vD5 + vD6 + vD7 |
| N | X | X | X | vD8 + vD9 + vD10 + vD11 + vD12 + vD13 + vD14 + vD15 |
| O | X | X | X | |
| P | X | X | X | |

As shown by timing diagram 1200b, when the ICIP factor is 8, the final output is available after 3 cycles from the input since the FlexTree adder tree depth is $\log_2(8)=3$. As shown by Table 5b, when the ICIP factor is 8, the FlexTree output tap points are registers M and N. For an ICIP factor of 16 (e.g., ICIP=16), the final output is available after 4 cycles from the input as the FlexTree adder tree depth is $\log_2(16)=4$. The FlexTree output tap points for ICIP=16 is flop O.

Figure 13:
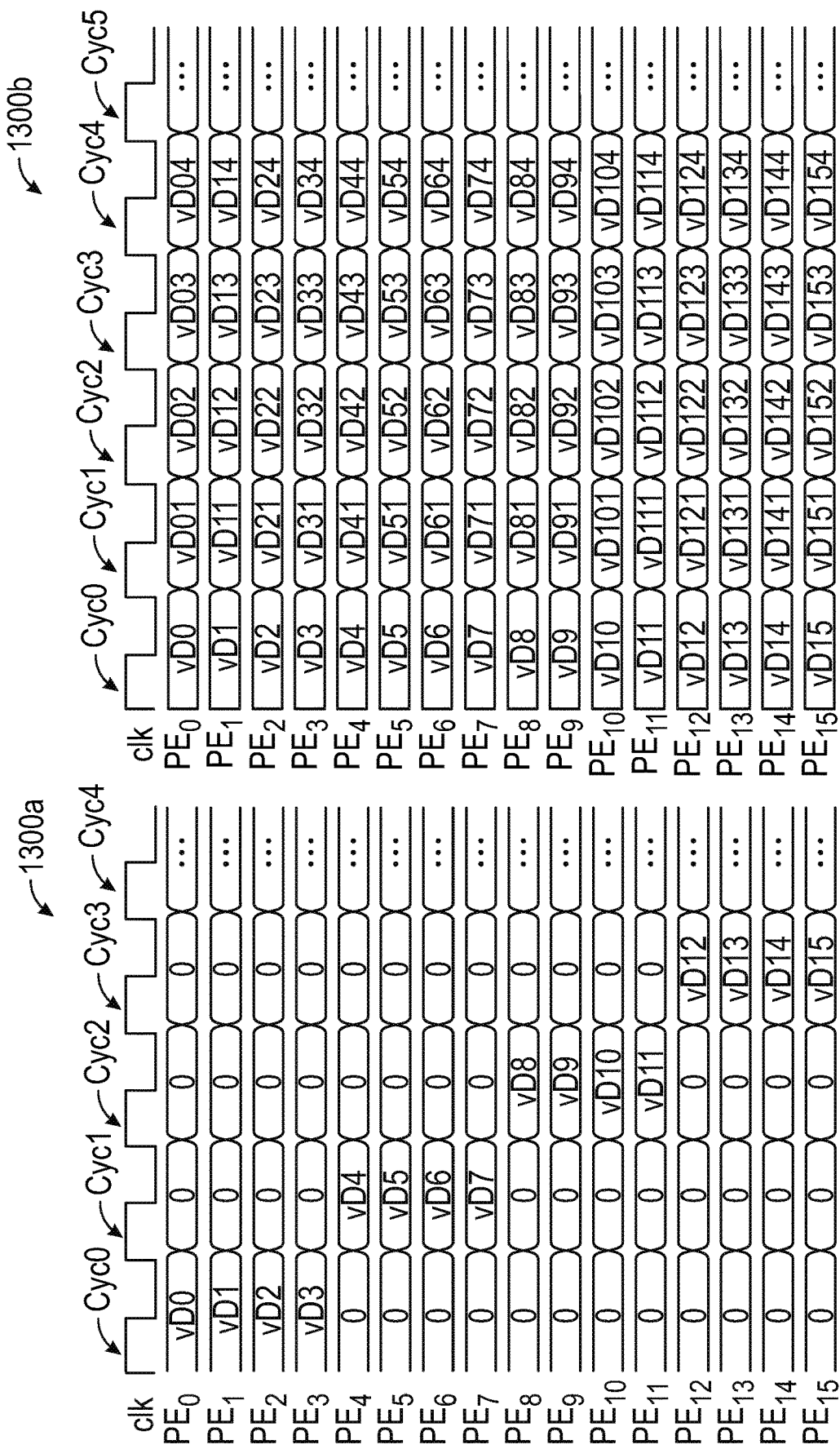
FIGS. 13, 14, and 15 depict an input timing diagrams of fixed depth adder tree schemes and FlexTree schemes.
Figure 14:
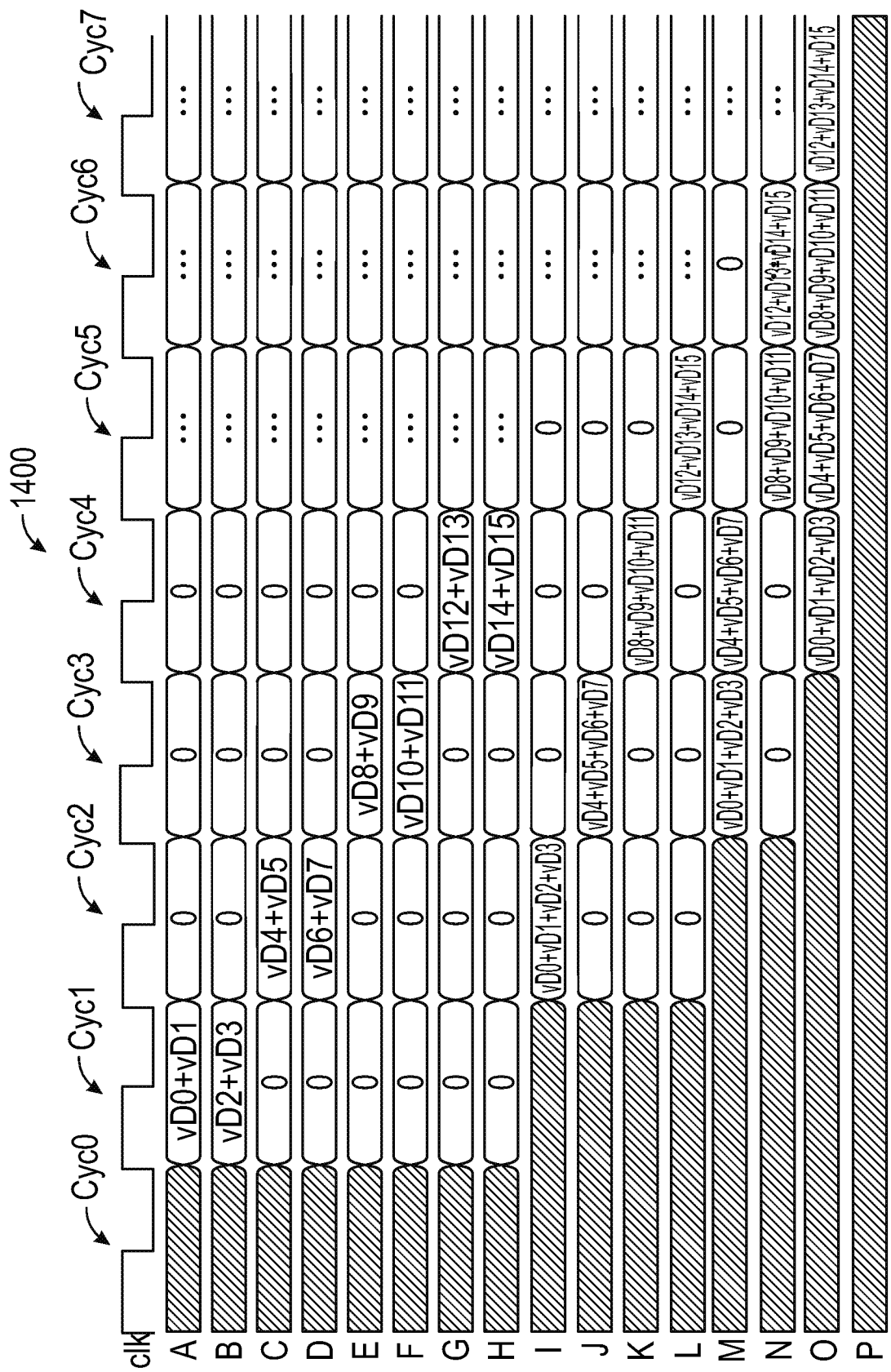
Figure 15:
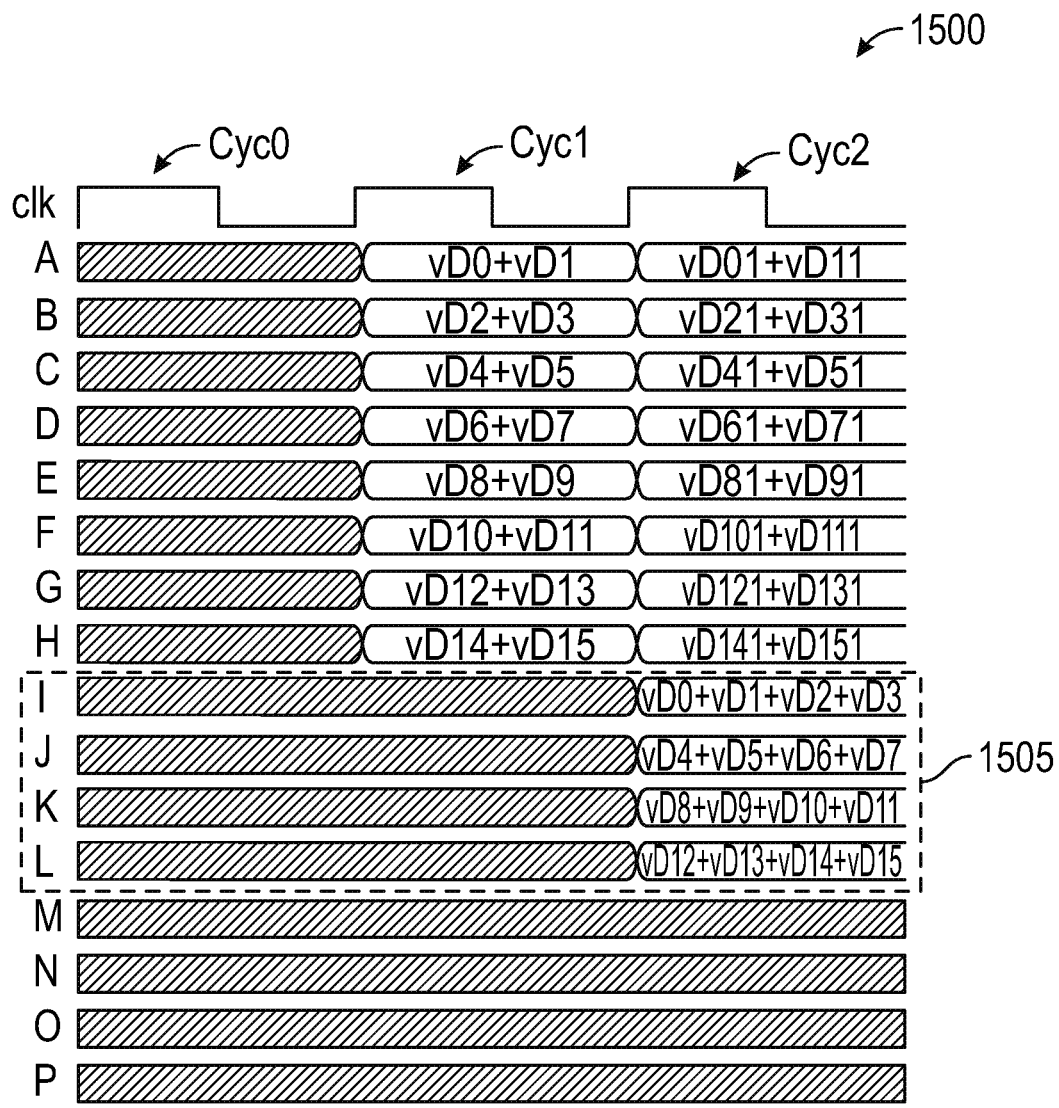

FIGS. 13-15 show timing diagrams for a fixed depth adder tree and FlexTree having ICIP factor of 4. FIG. 13 includes an input timing diagram 1300a for a fixed depth adder tree with a PE column length of N=16 and an ICIP factor of 4 (e.g., depth of adder tree fixed to a value of ceil $(\log_2(16))=4$) for Cyc0 to Cyc4 for an input clk. FIG. 13 also includes an input timing diagram 1300b for FlexTree with a PE column length of N=16 and an ICIP factor of 4 and for Cyc0 to Cyc5 for an input clk. FIG. 14 includes an output timing diagram 1400 for the fixed depth adder tree with ICIP=4 (e.g., corresponding to input timing diagram 1300a) for Cyc0 to Cyc7 of an output clk. FIG. 15 includes an output timing diagram 1500 for the FlexTree with ICIP=4 (e.g., corresponding to input timing diagram 1300b) for Cyc0 to Cyc2 of an output clk.

As can be seen in FIGS. 13-14 for ICIP=4, the fixed depth adder tree must feed in zeros for PEs 130 that are not being accumulated (e.g., PE4 to PE15 in input timing diagram 1300a) and the final output is only available after four cycles from the input cycle. However, as shown by output timing diagram 1500 for the FlexTree architecture 500, the output is available after two cycles from the input cycle. To sum four sets of ICIP=4 pSum values spread across 16 PEs 130, the fixed depth adder tree architecture takes seven cycles whereas the FlexTree architecture 500 takes only two cycles.

Performance analysis was performed on different pSum accumulation configurations where a baseline flexible schedule NN (FlexNN) for each of variety of convolutional neural networks (CNNs). The CNNs include a 50 layer residual network (ResNet50) model (see e.g., He et al., "Deep Residual Learning for Image Recognition", arXiv: 1512.03385v1 [cs.CV] (10 Dec. 2015); an Inception version 2 (v2) model (see e.g., Ioffe, "Batch Normalization: Accelerating Deep Network Training by Reducing Internal Covariate Shift", arXiv: 1502.03167v3 [cs.LG] (2 Mar. 2015)), Squeezenet v1.1 (see e.g., Iandola et al., "SqueezeNet: AlexNet-level accuracy with 50× fewer parameters and <0.5 MB model size", arXiv: 1602.07360 [cs.CV] (4 Nov. 2016), and "What's new in SqueezeNet v1.1?", GitHub.com (accessed on 26 Oct. 2021), https://github.com/forresti/SqueezeNet/blob/master/SqueezeNet_v1.1/README.md), and MobileNet Single-Shot multibox Detection (SSD) (see e.g., Liu et al., "SSD: Single Shot MultiBox Detector", arXiv: 1512.02325v5 [cs.CV] (29 Dec. 2016), and Howard et al., "MobileNets: Efficient Convolutional Neural Networks for Mobile Vision Applications, arXiv: 1704.04861v1 [cs.CV] (17 Apr. 2017)). For the simulation, the FlexNN included 256 PEs 130 laid out as a 16×16 grid (including 16 rows and 16 PE columns 505). Each PE 130 included eight MACs 410, with a total number MACs 410 in the FlexTree 500 of 2048. The clock frequency targeted in the simulation is 1.8 gigahertz (GHz), which gives a theoretical performance upper bound of 7.37 tera-operations per second (TOPS). Table 7a and Table 7b show a layer-by-layer performance comparison for different pSum accumulation approaches. In particular, Table 7a provides layer information for the layer-by-layer performance comparison, and Table 7b provides for the layer-by-layer performance comparison.

The ResNet50 yielded the best performance when there was no pSum accumulation across PEs 130 (e.g., the No Tree configuration). Since the No Tree configuration has no performance overhead for an ICIP factor of 1, both the No Tree configuration and the FlexTree 500 achieve equivalent performance. The fixed tree approaches require adjusting the schedules such that the ICIP aligns with the number of inputs to the adder tree, and in the ResNet50 simulation, both fixed tree approaches yielded schedules worse performance than the No Tree configuration and the FlexTree 500. The Inception v2 had the best performance when used with a 4-input fixed tree, and the SqueezeNet v1.1 had the best performance when used with a 16-input fixed tree. The MobileNet SSD with an ICIP factor of 8 (e.g., fourth row of Table 7b) was shown to be the optimal schedule, and none of the other three configurations were able to match the FlexTree 500 performance.

Figure 20A:
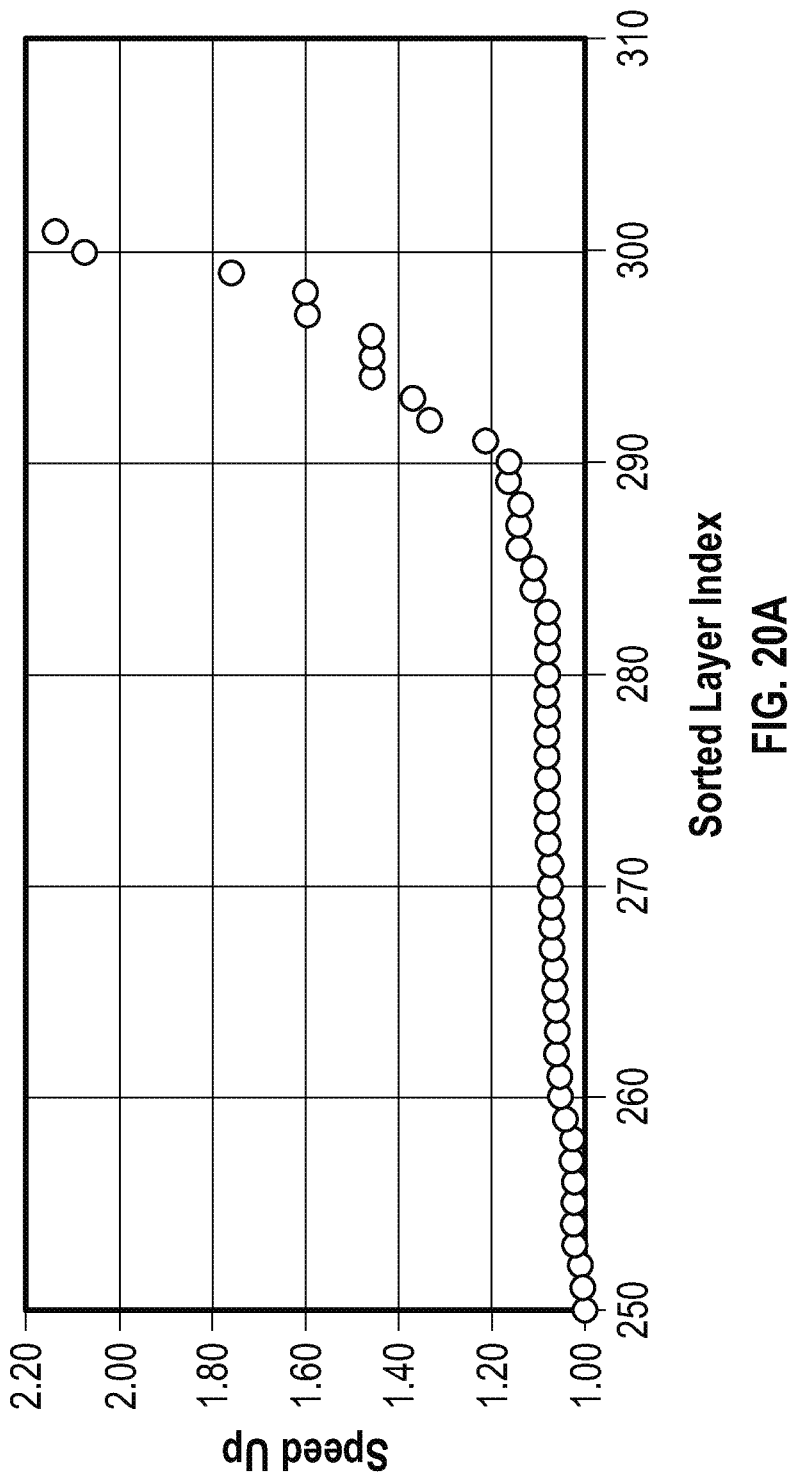
FIGS. 20a, 20b, and 20c depict simulation results of FlexTree speedup in comparison to other configurations.
Figure 20B:
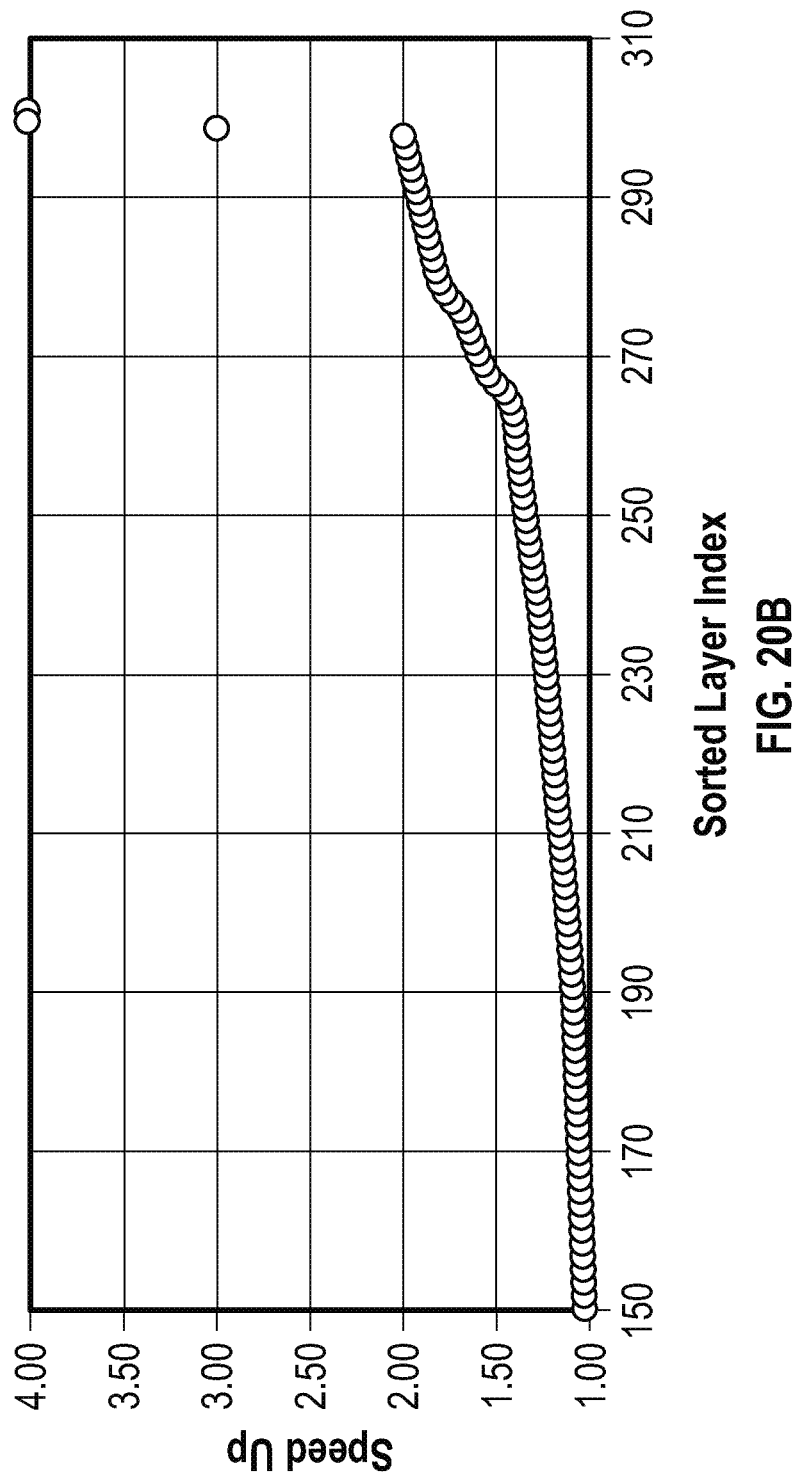
Figure 20C:
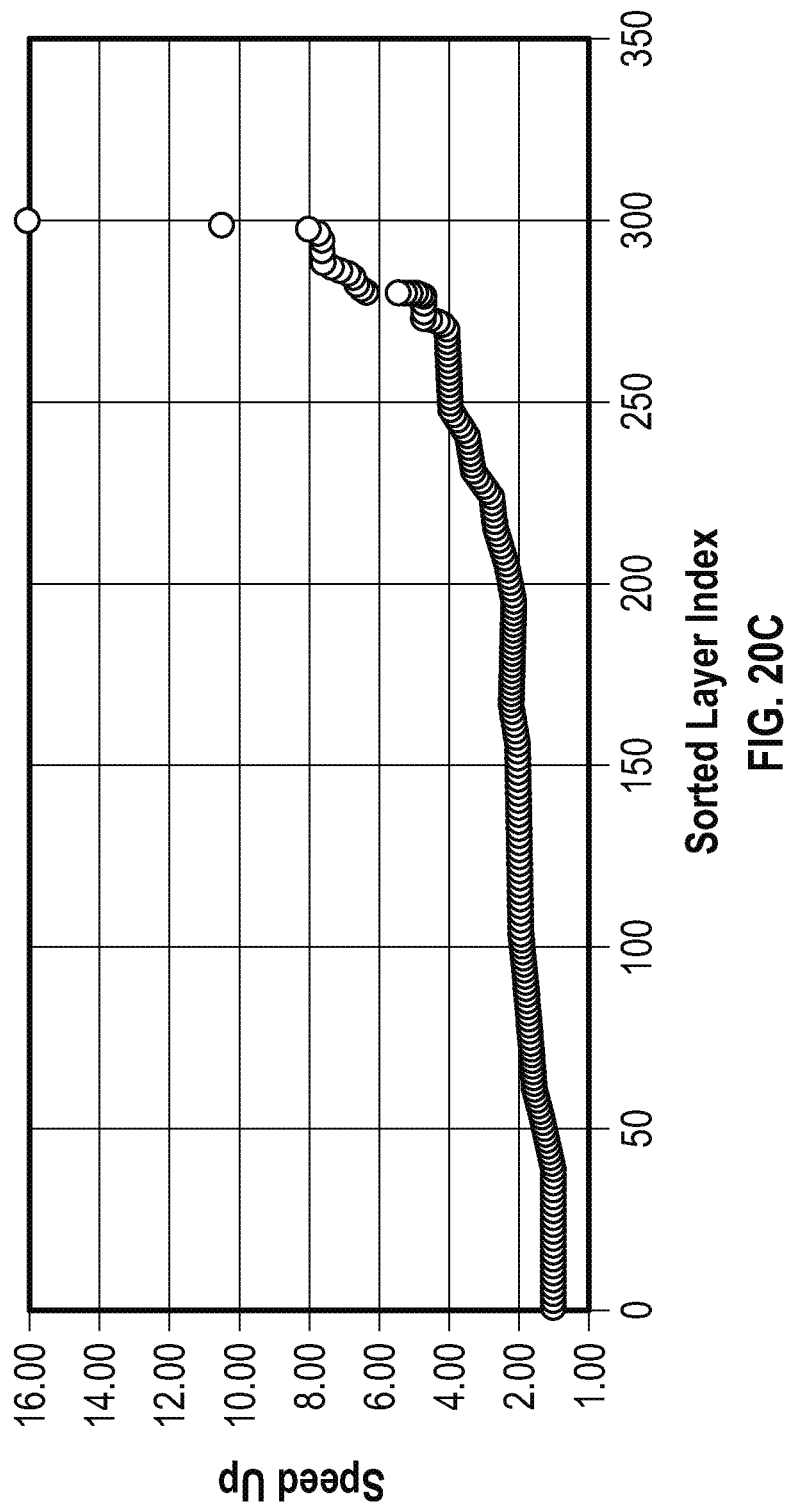

FIGS. 20*a*, 20*b*, and 20*c* depict simulation results of FlexTree speedup in comparison to other configurations, such as those shown and described previously with respect to Table 7a and Table 7b. FIGS. 20*a*, 20*b*, and 20*c* summarize the overall speedup of FlexTree 500 over other pSum accumulation configurations. FIG. 20*a* includes a graph of speedup of the FlexTree 500 over the No Tree configuration. The graph in FIG. 20*a* shows that FlexTree 500 performs TABLE 7b FlexNN Layer Information for Layer-by-Layer Performance Comparison

| NN Name | Layer Name | IF dimension (W × H × C) | FL dimension (Fw × Fh × C × K) | OF dimension (W × H × K) |
|---|---|---|---|---|
| ResNet50 | res3a_branch2c | 28 × 28 × 128 | 1 × 1 × 128 × 512 | 28 × 28 × 512 |
| Inception v2 | Inception_4a/ 1 × 1 | 14 × 14 × 576 | 1 × 1 × 576 × 224 | 14 × 14 × 224 |
| Squeezenet v1.1 | fire5/ squeeze1 × 1 | 28 × 28 × 256 | 1 × 1 × 256 × 32 | 28 × 28 × 32 |
| MobileNet SSD | conv3 | 75 × 75 × 128 | 1 × 1 × 128 × 128 | 75 × 75 × 128 |

TABLE 7b

FlexNN Layer-by-Layer Performance Comparison (TOPS @ 1.8 GHz)

| NN Name | Layer Name | No Tree | Fixed Tree (4-input) | Fixed Tree (16-input) | FlexTree |
|---|---|---|---|---|---|
| ResNet50 | res3a_branch2c | 6.45 | 5.16 | 3.28 | 6.45 |
| Inception v2 | Inception_4a/1 × 1 | 5.64 | 6.11 | 2.83 | 6.11 |
| Squeezenet v1.1 | fire5/squeeze1 × 1 | 6.45 | 5.73 | 7.37 | 7.37 |
| MobileNet SSD | conv3 | 6.82 | 5.46 | 3.41 | 7.28 |

Table 7a and Table 7b show how different pSum accumulation methodologies can result in different performance. The No Tree approach in Table 7b represents an existing FlexNN pSum accumulation mechanism where pSums of one PE 130 are passed to an adjacent PE 130. The Fixed Tree approach in Table 7b represents a fixed adder tree. Two Fixed Tree variants were explored including a first Fixed Tree approach (4-input) with an adder tree that accumulates pSums from four adjacent PEs 130 (total 64 adder trees) and a second Fixed Tree approach (16-input) with an adder tree that accumulates pSums from 16 PEs 130. The cells in bold text in Table 7b are the maximum performance measures among the four configurations. As shown by Table 7b, the FlexTree 500 is shown to have the best performance in comparison to the other FlexNN approaches. At least in this simulation, the FlexTree 500 can be seen as the superset of the other configurations.

better than No Tree configurations in the least number layers compared to other configurations. Most of such cases are when the layer dimensions other than IC are large enough such that the workload can be evenly distributed among the PEs 130 without the need to accumulate across PEs 130. However, roughly 17% of the layers saw performance benefits from having a flexible adder tree.

FIG. 20*b* shows a speedup distribution of the FlexTree 500 when compared to 4-input fixed adder trees, and FIG. 20*c* shows a speedup distribution of the FlexTree 500 when compared to 16-input fixed adder trees. A few layers that have small ICs were shown to suffer most when using a fixed adder tree as the schedules in such cases can only result in ICIP=1 but as the PEs 130 are forced to use the adder tree only a subset of PEs 130 are enabled in order to produce the correct output values.

As shown by Table 7b, and FIGS. 20a-20c, the FlexTree 500 achieves performance speedup up to 2.14× when compared to state-of-the-art flexible schedule HW accelerators, which do not have an adder tree to perform pSum accumulation. Additionally, Table 7b, and FIGS. 20a-20c show that the Flex Tree 500 achieves performance speedup ranging from 4×-16× when compared with fixed adder tree architectures. In the simulation setup, 301 convolution layers from 7 networks listed Table 8 were examined. Since not all layers show speedup, the layers are sorted by speedup and Table 8 only plot the layers with speedup.

TABLE 8

Speedup Distribution Across NNs and Adder Tree Configurations

| NN Name | No Tree Speedup Range | No Tree % layers speedup | Fixed Tree (4-input) Speedup Range | Fixed Tree (4-input) % layers speedup | Fixed Tree (16-input) Speedup Range | Fixed Tree (16-input) % layers speedup |
|---|---|---|---|---|---|---|
| GoogLeNet v1 | 1.02x-2.14x | 20% | 1.02x-1.40x | 59% | 1.03x-1.40x | 30% |
| Inception v2 | 1.01x-1.60x | 13% | 1.03x-1.93x | 46% | 1.44x-1.97x | 100% |
| MobileNet SSD | 1.11x-1.60x | 16% | 1.01x-2.00x | 61% | 1.97x-2.03x | 100% |
| MobileNet v2 | 1.02x-1.08x | 42% | 1.03x-1.53x | 36% | 2.06x-2.19x | 100% |
| MobileNet v3 | 1.03x-1.46x | 24% | 1.07x-4.00x | 100% | 4.04x-16.00x | 100% |
| ResNet 50 | 1x | 0% | 1.02x-1.75x | 85% | 2.19x-3.50x | 100% |
| SqueezeNet v1.1 | 1.05x-1.08x | 8% | 1.06x-2.00x | 40% | 3.50x-4.00x | 100% |
| Total | 1.01x-2.14x | 17% | 1.01x-4.00x | 60% | 1.01x-16.00x | 87% |

Table 8 shows the FlexTree Speedup Ranges over different FlexNN configurations. Table 8 lists seven NNs, the range of speedup for each NN, and baseline adder tree configuration. The percentage ("% layers speedup") indicates a percentage of layers in the NN benefiting from having a FlexTree compared to the baseline adder tree configurations. Here, the 301 convolution layers do not include the first convolution layer of each network and depthwise-convolution layers. Although these layer types are not discussed in the present disclosure, similar or better performance enhancements should be realized by having a FlexTree configuration. This is because these layer types have limited flexibilities in the schedules, which heavily relies on pSum accumulations across PEs 130 and the number of PEs 130 to accumulate may vary depending on the filter size, stride, and input dimensions.

2. Artificial Intelligence and Machine Learning Aspects

Machine learning (ML) involves programming computing systems to optimize a performance criterion using example (training) data and/or past experience. ML refers to the use and development of computer systems that are able to learn and adapt without following explicit instructions, by using algorithms and/or statistical models to analyze and draw inferences from patterns in data. ML involves using algorithms to perform specific task(s) without using explicit instructions to perform the specific task(s), but instead relying on learnt patterns and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions).

ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "MI, algorithm" refers to different concepts than the term "ML model," these terms may be used interchangeably for the purposes of the present disclosure. Any of the ML techniques discussed herein may be utilized, in whole or in part, and variants and/or combinations thereof, for any of the example embodiments discussed herein.

ML may require, among other things, obtaining and cleaning a dataset, performing feature selection, selecting an ML algorithm, dividing the dataset into training data and testing data, training a model (e.g., using the selected ML algorithm), testing the model, optimizing or tuning the model, and determining metrics for the model. Some of these tasks may be optional or omitted depending on the use case and/or the implementation used.

ML algorithms accept model parameters (or simply "parameters") and/or hyperparameters that can be used to control certain properties of the training process and the resulting model. Model parameters are parameters, values, characteristics, configuration variables, and/or properties that are learnt during training. Model parameters are usually required by a model when making predictions, and their values define the skill of the model on a particular problem. Hyperparameters at least in some embodiments are characteristics, properties, and/or parameters for an ML process that cannot be learnt during a training process. Hyperparameter are usually set before training takes place, and may be used in processes to help estimate model parameters.

ML techniques generally fall into the following main types of learning problem categories: supervised learning, unsupervised learning, and reinforcement learning. Supervised learning involves building models from a set of data that contains both the inputs and the desired outputs. Unsupervised learning is an ML task that aims to learn a function to describe a hidden structure from unlabeled data. Unsupervised learning involves building models from a set of data that contains only inputs and no desired output labels.

Reinforcement learning (RL) is a goal-oriented learning technique where an RL agent aims to optimize a long-term objective by interacting with an environment. Some implementations of AI and ML use data and neural networks (NNs) in a way that mimics the working of a biological brain. An example of such an implementation is shown by FIG. 21.

Figure 21:
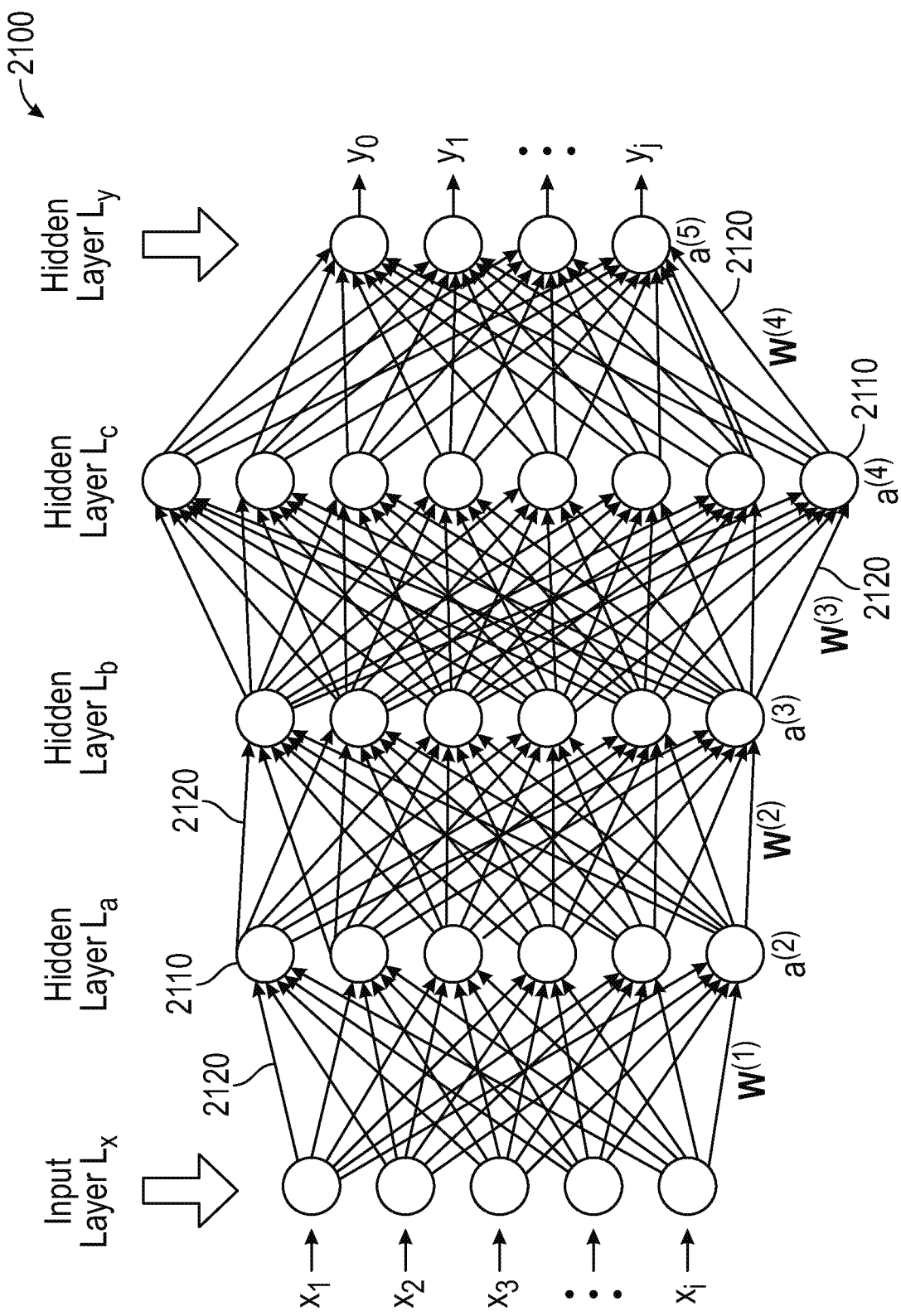
FIG. 21 depicts an example neural network (NN) according to various embodiments.

FIG. 21 illustrates an example NN 2100, which may be suitable for use by one or more of the computing systems (or subsystems) of the various implementations discussed herein, implemented in part by a HW accelerator, and/or the like. The NN 2100 may be deep neural network (DNN) used as an artificial brain of a compute node or network of compute nodes to handle very large and complicated observation spaces. Additionally or alternatively, the NN 2100 can be some other type of topology (or combination of topologies), such as a feed forward NN (FFN), a deep FNN (DFF), recurrent NN (RNN), deep belief NN, stochastic NNs (e.g., Bayesian Network (BN), Bayesian belief network (BBN), a Bayesian NN (BNN), Deep BNN (DBNN), Dynamic BN (DBN), probabilistic graphical model (PGM), Boltzmann machine, restricted Boltzmann machine (RBM), Hopfield network or Hopfield NN, convolutional deep belief network (CDBN), etc.), and/or some other type of ML architecture such as those discussed herein.

The NN 2100 may encompass a variety of ML techniques where a collection of connected artificial neurons 2110 that (loosely) model neurons in a biological brain that transmit signals to other neurons/nodes 2110. The neurons 2110 may also be referred to as nodes 2110, processing elements (PEs) 2110, or the like. The connections 2120 (or edges 2120) between the nodes 2110 are (loosely) modeled on synapses of a biological brain and convey the signals between nodes 2110. Note that not all neurons 2110 and edges 2120 are labeled in FIG. 21 for the sake of clarity.

Each neuron 2110 has one or more inputs and produces an output, which can be sent to one or more other neurons 2110 (the inputs and outputs may be referred to as "signals"). Inputs to the neurons 2110 of the input layer $L_x$ can be feature values of a sample of external data (e.g., input variables $x_i$). The input variables $x_i$ can be set as a vector containing relevant data (e.g., observations, ML features, etc.). The inputs to hidden units 2110 of the hidden layers $L_a$, $L_b$, and $L_c$ may be based on the outputs of other neurons 2110. The outputs of the final output neurons 2110 of the output layer $L_y$ (e.g., output variables $y_j$) include predictions, inferences, and/or accomplish a desired/configured task. The output variables $y_j$ may be in the form of determinations, inferences, predictions, and/or assessments. Additionally or alternatively, the output variables $y_j$ can be set as a vector containing the relevant data (e.g., determinations, inferences, predictions, assessments, and/or the like).

In the context of ML, an "ML feature" (or simply "feature") is an individual measurable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features.

Neurons 2110 may have a threshold such that a signal is sent only if the aggregate signal crosses that threshold. A node 2110 may include an activation function, which defines the output of that node 2110 given an input or set of inputs.

Additionally or alternatively, a node 2110 may include a propagation function that computes the input to a neuron 2110 from the outputs of its predecessor neurons 2110 and their connections 2120 as a weighted sum. A bias term can also be added to the result of the propagation function. In some implementations, the NN 2100 may be a stochastic NN built by introducing random variations into the NN, either by giving the neurons 2110 stochastic transfer functions, or by giving them stochastic weights 2120.

The NN 2100 also includes connections 2120, some of which provide the output of at least one neuron 2110 as an input to at least another neuron 2110. Each connection 2120 may be assigned a weight (also referred to as "weight 2120") that represents its relative importance. The weights 2120 may be adjusted as learning proceeds. Individual weights 2120 increase or decrease the strength of the signal at a connection 2120. Some or all of the weights 2120 may be matrices of multiple weight values, which are labelled $W^{(1)}$ to $W^{(4)}$ in this example (note that not all weights 2120 are labelled with their respective weight matrices). In some implementations, the weights 2120 (or weight matrices) may represent one or more probability distributions such as when the NN 2100 is a stochastic NNs (e.g., BNNs, DBNNs, etc.) or other like NN architecture/topology that utilizes probability distributions.

The neurons 2110 can be aggregated or grouped into one or more layers L where different layers L may perform different transformations on their inputs. In FIG. 21, the NN 2100 comprises an input layer $L_x$, one or more hidden layers $L_a$, $L_b$, and $L_c$, and an output layer $L_y$ (where a, b, c, x, and y may be numbers), where each layer L comprises one or more neurons 2110. Signals travel from the first layer (e.g., the input layer $L_1$), to the last layer (e.g., the output layer $L_y$), possibly after traversing the hidden layers $L_a$, $L_b$, and $L_c$ multiple times. In FIG. 21, the input layer La receives data of input variables $x_i$ (where i=1, ..., p, where p is a number). Hidden layers $L_a$, $L_b$, and $L_c$ processes the inputs xi, and eventually, output layer $L_y$ provides output variables $y_j$ (where j=1, ..., p', where p' is a number that is the same or different than p). In the example of FIG. 21, for simplicity of illustration, there are only three hidden layers $L_a$, $L_b$, and $L_c$ in the ANN 2100, however, the NN 2100 may include many more (or fewer) hidden layers $L_a$, $L_b$, and $L_c$ than are shown.

3. Example Hardware and Software Configurations and Arrangements

Figure 22A:
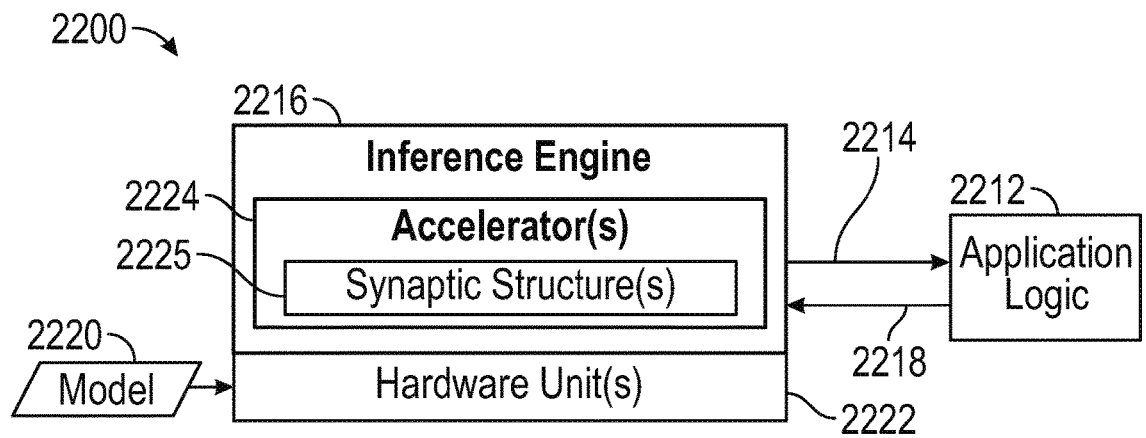
FIG. 22a illustrates an example accelerator architecture.

FIG. 22a is an example accelerator architecture 2200 for according to various embodiments. The accelerator architecture 2200 provides neural network (NN) functionality to application logic 2212, and as such, may be referred to as a NN accelerator architecture 2200, DNN accelerator architecture 2200, and/or the like.

The application logic 2212 may include application SW and/or HW components used to perform specification functions. The application logic 2212 forwards data 2214 to an inference engine 2216. The inference engine 2216 is a runtime element that delivers a unified application programming interface (API) that integrates a ANN (e.g., DNN(s) such as NN 2100 and/or the like) inference with the application logic 2212 to provide a result 2218 (or output) to the application logic 2212.

To provide the inference, the inference engine 2216 uses a model 2220 that controls how the AI/ML inference is made on the data 2214 to generate the result 2218. Specifically, the model 2220 includes a topology of layers of a NN. The topology includes an input layer that receives the data 2214, an output layer that outputs the result 2218, and one or more hidden layers between the input and output layers that provide processing between the data 14 and the result 2218. The topology may be stored in a suitable information object, such as an extensible markup language (XML), JavaScript Object Notation (JSON), and/or other suitable data structure, file, and/or the like. The model 2220 may also include weights and/or biases for results for any of the layers while processing the data 2214 in the inference using the DNN.

The inference engine 2216 may be implemented using and/or connected to HW unit(s) 2222. The inference engine 2216 at least in some embodiments is an element that applies logical rules to a knowledge base to deduce new information. The knowledge base at least in some embodiments is any technology used to store complex structured and/or unstructured information used by a computing system (e.g., compute node 2250 of FIG. 22). The knowledge base may include storage devices, repositories, database management systems, and/or other like elements.

Furthermore, the inference engine 2216 includes one or more accelerators 2224 that provide HW acceleration for the ML model inference/prediction using one or more HW units 2222. The accelerator(s) 2224 are SW and/or HW element(s) specifically tailored/designed as HW acceleration for AI/ML applications and/or AI/ML tasks. In some implementations, the accelerator(s) 2224 may include processing elements such as any of those discussed infra with respect to the HW unit(s) 2222. Additionally or alternatively, the accelerator(s) 2224 may be HW elements specialized for DNN forward and/or both of forward/backward pass of one or more DNN model types.

The one or more accelerators 2224 may include one or more processing element (PE) arrays and/or a multiply-and-accumulate (MAC) architecture in the form of a plurality of synaptic structures 2225 such as those discussed herein. Each of the one or more PE arrays of each accelerator 2224 may be the same or similar as the PE array 100 of FIGS. 1-15 and/or the spatial array architecture 2300 discussed infra. In some implementations, there may be hundreds of PEs to handle billions of MAC operations in one or more DNN models, as well as scratchpad memory and inter-PE interconnection network to maximize data reuse to deal with massive energy cost for fetching data from memory (e.g., SRAM, DRAM, etc.). The accelerator(s) 2224 may correspond to the acceleration circuitry 2264 of FIG. 22b described infra.

The HW unit(s) 2222 may include one or more processors and/or one or more programmable devices. As examples, the processors may include central processing units (CPUs), graphics processing units (GPUs), dedicated AI accelerator Application Specific Integrated Circuits (ASICs), vision processing units (VPUs), tensor processing units (TPUs) and/or Edge TPUs, Neural Compute Engine (NCE), Pixel Visual Core (PVC), photonic integrated circuit (PIC) or optical/photonic computing device, and/or the like. The programmable devices may include, for example, logic arrays, programmable logic devices (PLDs) such as complex PLDs (CPLDs), field-programmable gate arrays (FPGAs), programmable ASICs, programmable System-on-Chip (SoC), and the like. The processor(s) and/or programmable devices may correspond to processor circuitry 2252 and/or acceleration circuitry 2264 of FIG. 22. In particular, the one or more accelerators 2224 and/or HW unit(s) 2222 may include a plurality of synaptic structures 2225, which may be configured or arranged according to the various embodiments shown and described with respect to FIGS. 1-15.

Figure 22B:
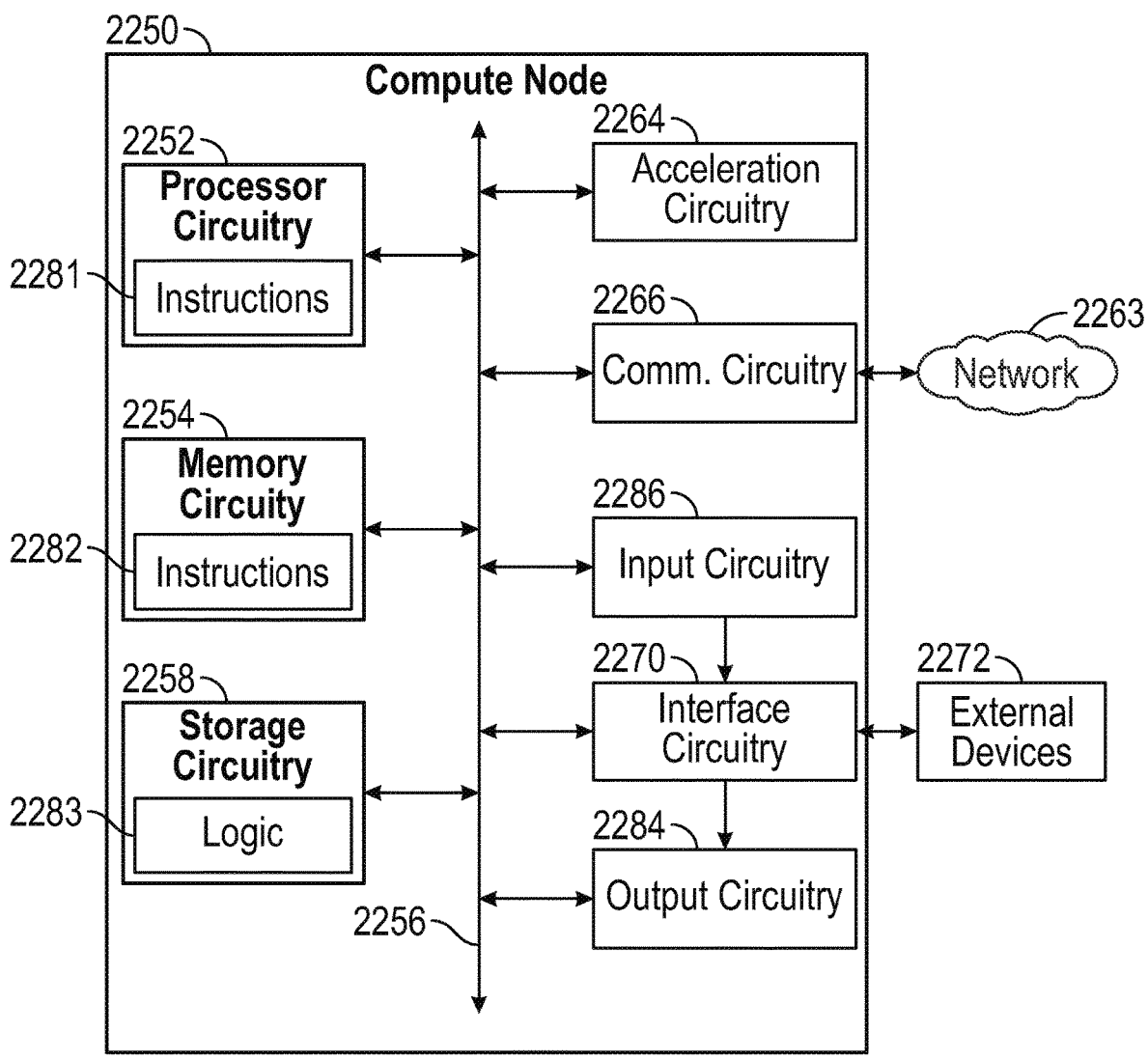
FIG. 22b illustrates example components of a computing system.

FIG. 22b illustrates an example of components that may be present in a compute node 2250 for implementing the techniques (e.g., operations, processes, methods, and methodologies) described herein. FIG. 22b provides a view of the components of node 2250 when implemented as part of a computing device (e.g., as a mobile device, a base station, server computer, gateway, appliance, etc.). The compute node 2250 may include any combinations of the HW or logical components referenced herein, and it may include or couple with any device usable with an edge communication network or a combination of such networks. The components may be implemented as ICs, portions thereof, discrete electronic devices, or other modules, instruction sets, programmable logic or algorithms, HW, HW accelerators, software (SW), firmware, or a combination thereof adapted in the compute node 2250, or as components otherwise incorporated within a chassis of a larger system. For one embodiment, at least one processor 2252 may be packaged together with computational logic 2282 and configured to practice aspects of various example embodiments described herein to form a System in Package (SiP) or a System on Chip (SoC).

The node 2250 includes processor circuitry in the form of one or more processors 2252. The processor circuitry 2252 includes circuitry such as, but not limited to one or more processor cores and one or more of cache memory, low drop-out voltage regulators (LDOs), interrupt controllers, serial interfaces such as SPI, I$^2$C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 2252 may include one or more HW accelerators (e.g., same or similar to acceleration circuitry 2264), which may be microprocessors, programmable processing devices (e.g., FPGA, ASIC, etc.), or the like. The one or more accelerators may include, for example, computer vision and/or deep learning accelerators. In some implementations, the processor circuitry 2252 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 2252 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 2252 may be coupled with or may include memory/storage and may be configured to execute instructions 2281 stored in the memory/storage to enable various applications or operating systems to run on the platform 2250. The processors (or cores) 2252 is configured to operate application SW to provide a specific service to a user of the platform 2250. In some embodiments, the processor(s) 2252 may be a special-purpose processor(s)/controller(s) configured (or configurable) to operate according to the various embodiments herein.

As examples, the processor(s) 2252 may include an Intel® Architecture Core™ based processor such as an i3, an i5, an i7, an i9 based processor; an Intel® microcontrollerbased processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 2252 may be a part of a system on a chip (SoC), System-in-Package (SiP), a multi-chip package (MCP), and/or the like, in which the processor(s) 2252 and other components are formed into a single integrated circuit, or a single package, such as the Edison™ or Galileo™ SoC boards from Intel® Corporation. Other examples of the processor(s) 2252 are mentioned elsewhere in the present disclosure.

The node 2250 may include or be coupled to acceleration circuitry 2264, which may be embodied by one or more AI/ML accelerators, a neural compute stick, neuromorphic HW, an FPGA, an arrangement of GPUs, one or more SoCs (including programmable SoCs), one or more CPUs, one or more digital signal processors, dedicated ASICs (including programmable ASICs), PLDs such as complex (CPLDs) or high complexity PLDs (HCPLDs), and/or other forms of specialized processors or circuitry designed to accomplish one or more specialized tasks. These tasks may include AI/ML processing (e.g., including training, inferencing, and classification operations), visual data processing, network data processing, object detection, rule analysis, or the like. In FPGA-based implementations, the acceleration circuitry 2264 may comprise logic blocks or logic fabric and other interconnected resources that may be programmed (configured) to perform various functions, such as the procedures, methods, functions, etc. of the various embodiments discussed herein. In such implementations, the acceleration circuitry 2264 may also include memory cells (e.g., EPROM, EEPROM, flash memory, static memory (e.g., SRAM, anti-fuses, etc.) used to store logic blocks, logic fabric, data, etc. in LUTs and the like.

In some implementations, the processor circuitry 2252 and/or acceleration circuitry 2264 may include HW elements specifically tailored for machine learning functionality, such as for operating performing ANN operations such as those discussed herein. In these implementations, the processor circuitry 2252 and/or acceleration circuitry 2264 may be, or may include, an AI engine chip that can run many different kinds of AI instruction sets once loaded with the appropriate weightings and training code. Additionally or alternatively, the processor circuitry 2252 and/or acceleration circuitry 2264 may be, or may include, AI accelerator(s), which may be one or more of the aforementioned HW accelerators designed for HW acceleration of AI applications. As examples, these processor(s) or accelerators may be a cluster of artificial intelligence (AI) GPUs, tensor processing units (TPUs) developed by Google® Inc., Real AI Processors (RAPS™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, HW 3 provided by Tesla®, Inc., an Epiphany™ based processor provided by Adapteva®, or the like. In some embodiments, the processor circuitry 2252 and/or acceleration circuitry 2264 and/or HW accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like. In some HW-based implementations, individual subsystems of node 2250 may be operated by the respective AI accelerating co-processor(s), AI GPUs, TPUs, or HW accelerators (e.g., FPGAs, ASICs, DSPs, SoCs, etc.), etc., that are configured with appropriate logic blocks, bit stream(s), etc. to perform their respective functions.

The node 2250 also includes system memory 2254. Any number of memory devices may be used to provide for a given amount of system memory. As examples, the memory 2254 may be, or include, volatile memory such as random access memory (RAM), static RAM (SRAM), dynamic RAM (DRAM), synchronous DRAM (SDRAM), RAMBUS® Dynamic Random Access Memory (RDRAM®), and/or any other desired type of volatile memory device. Additionally or alternatively, the memory 2254 may be, or include, non-volatile memory such as read-only memory (ROM), erasable programmable ROM (EPROM), electrically erasable programmable (EEPROM), flash memory, non-volatile RAM, ferroelectric RAM, phase-change memory (PCM), flash memory, and/or any other desired type of non-volatile memory device. Access to the memory 2254 is controlled by a memory controller. The individual memory devices may be of any number of different package types such as single die package (SDP), dual die package (DDP) or quad die package (Q17P). Any number of other memory implementations may be used, such as dual inline memory modules (DIMMs) of different varieties including but not limited to microDIMMs or MiniDIMMs.

Storage circuitry 2258 provides persistent storage of information such as data, applications, operating systems and so forth. In an example, the storage 2258 may be implemented via a solid-state disk drive (SSDD) and/or high-speed electrically erasable memory (commonly referred to as "flash memory"). Other devices that may be used for the storage 2258 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, a hard disk drive (HDD), micro HDD, of a combination thereof, and/or any other memory. The memory circuitry 2254 and/or storage circuitry 2258 may also incorporate three-dimensional (3D) cross-point (XPOINT) memories from Intel® and Micron®.

The memory circuitry 2254 and/or storage circuitry 2258 is/are configured to store computational logic 2283 in the form of SW, firmware, microcode, or HW-level instructions to implement the techniques described herein. The computational logic 2283 may be employed to store working copies and/or permanent copies of programming instructions, or data to create the programming instructions, for the operation of various components of system 2200 (e.g., drivers, libraries, application programming interfaces (APIs), etc.), an operating system of system 2200, one or more applications, and/or for carrying out the embodiments discussed herein. The computational logic 2283 may be stored or loaded into memory circuitry 2254 as instructions 2282, or data to create the instructions 2282, which are then accessed for execution by the processor circuitry 2252 to carry out the functions described herein. The processor circuitry 2252 and/or the acceleration circuitry 2264 accesses the memory circuitry 2254 and/or the storage circuitry 2258 over the IX 2256. The instructions 2282 direct the processor circuitry 2252 to perform a specific sequence or flow of actions, for example, as described with respect to flowchart(s) and block diagram(s) of operations and functionality depicted previously. The various elements may be implemented by assembler instructions supported by processor circuitry 2252 or high-level languages that may be compiled into instructions 2281, or data to create the instructions 2281, to be executed by the processor circuitry 2252. The permanent copy of the programming instructions may be placed into persistent storage devices of storage circuitry 2258 in the factory or in the field through, for example, a distribution medium (not shown), through a communication interface (e.g., from a distribution server (not shown)), over-the-air (OTA), or any combination thereof.

The IX 2256 couples the processor 2252 to communication circuitry 2266 for communications with other devices, such as a remote server (not shown) and the like. The communication circuitry 2266 is a HW element, or collection of HW elements, used to communicate over one or more networks 2263 and/or with other devices. In one example, communication circuitry 2266 is, or includes, transceiver circuitry configured to enable wireless communications using any number of frequencies and protocols such as, for example, the Institute of Electrical and Electronics Engineers (IEEE) 802.11 (and/or variants thereof), IEEE 802.15.4, Bluetooth® and/or Bluetooth® low energy (BLE), ZigBee®, LoRaWAN™ (Long Range Wide Area Network), a cellular protocol such as 3GPP LTE and/or Fifth Generation (5G)/New Radio (NR), and/or the like. Additionally or alternatively, communication circuitry 2266 is, or includes, one or more network interface controllers (NICs) to enable wired communication using, for example, an Ethernet connection, Controller Area Network (CAN), Local Interconnect Network (LIN), DeviceNet, ControlNet, Data Highway+, or PROFINET, among many others. In some embodiments, the communication circuitry 2266 may include or otherwise be coupled with the an accelerator 2224 including one or more synaptic devices/structures 2225, etc., as described previously, in accordance with various embodiments.

The IX 2256 also couples the processor 2252 to interface circuitry 2270 that is used to connect node 2250 with one or more external devices 2272. The external devices 2272 may include, for example, sensors, actuators, positioning circuitry (e.g., global navigation satellite system (GNSS)/ Global Positioning System (GPS) circuitry), client devices, servers, network elements and/or network appliances (e.g., switches, hubs, routers, etc.), HW accelerator(s) 2200, integrated photonics devices (e.g., optical neural network (ONN) integrated circuit (IC) and/or the like), and/or other like devices.

The sensors includes devices, modules, or subsystems whose purpose is to detect events or changes in its environment and send the information (sensor data) about the detected events to some other a device, module, subsystem, etc. Examples of such sensors include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 2250); pressure sensors; barometric pressure sensors; gravimeters; altimeters; image capture devices (e.g., cameras); light detection and ranging (LiDAR) sensors; proximity sensors (e.g., infrared radiation detector and the like); depth sensors; ambient light sensors; optical light sensors; ultrasonic transceivers; microphones; and the like.

The actuators, allow the compute node 2250 to change its state, position, and/or orientation, or move or control a mechanism or system. The actuators comprise electrical and/or mechanical devices for moving or controlling a mechanism or system, and converts energy (e.g., electric current or moving air and/or liquid) into some kind of motion. The actuators may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The compute node 2250 may be configured to operate one or more actuators based on one or more captured events and/or instructions or control signals received from a service provider and/or various client systems.

In some optional examples, various input/output (I/O) devices may be present within or connected to, the node 2250, which are referred to as input circuitry 2286 and output circuitry 2284 in FIG. 22. The input circuitry 2286 and output circuitry 2284 include one or more user interfaces designed to enable user interaction with the platform 2250 and/or peripheral component interfaces designed to enable peripheral component interaction with the platform 2250. Input circuitry 2286 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 2284 may be included to show information or otherwise convey information, such as sensor readings, actuator position(s), or other like information. Data and/or graphics may be displayed on one or more user interface components of the output circuitry 2284. Output circuitry 2284 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 2250. The output circuitry 2284 may also include speakers and/or other audio emitting devices, printer(s), and/or the like. Additionally or alternatively, sensor(s) may be used as the input circuitry 2284 (e.g., an image capture device, motion capture device, or the like) and one or more actuators may be used as the output device circuitry 2284 (e.g., an actuator to provide haptic feedback or the like). Peripheral component interfaces may include, but are not limited to, a non-volatile memory port, a USB port, an audio jack, a power supply interface, etc. A display or console HW, in the context of the present system, may be used to provide output and receive input of an edge computing system; to manage components or services of an edge computing system; identify a state of an edge computing component or service; or to conduct any other number of management or administration functions or service use cases.

The components of the node 2250 may communicate over the interconnect (IX) 2256. The IX 2256 may include any number of technologies, including Industry Standard Architecture (ISA) and/or extended ISA (EISA), FASTBUS, Low Pin Count (LPC) bus, Inter-Integrated Circuit (I²C), Serial Peripheral Interface (SPI), power management bus (PM-Bus), peripheral component IX (PCI), PCI express (PCIe), PCI extended (PCIx), Intel® QuickPath IX (QPI), Intel® Ultra Path IX (UPI), Intel® Accelerator Link, Compute Express Link (CXL), Coherent Accelerator Processor Interface (CAPI) and/or OpenCAPI, Intel® Omni-Path Architecture (OPA), RapidIO™, cache coherent interconnect for accelerators (CCIX), Gen-Z Consortium, HyperTransport and/or Lightning Data Transport (LDT), NVLink provided by NVIDIA®, InfiniBand (IB), Time-Trigger Protocol (TTP), FlexRay, PROFIBUS, Ethernet, Universal Serial Bus (USB), point-to-point interfaces, and/or any number of other IX technologies. The IX 2256 may be a proprietary bus, for example, used in a SoC based system.

The number, capability, and/or capacity of the elements of the compute node 2250 may vary, depending on whether compute node 2250 is used as a stationary computing device (e.g., a server computer in a data center, a workstation, a desktop computer, etc.) or a mobile computing device (e.g., a smartphone, tablet computing device, laptop computer, game console, IoT device, etc.). In various implementations, the compute node 2250 may comprise one or more components of a data center such as one or more servers and/or switches (or switch fabric), a desktop computer, a workstation, a laptop, a smartphone, a tablet, a digital camera, a smart appliance, a smart home hub, a network appliance, a drone or robot, an autonomous vehicle, and/or any other device/system that processes data.

In one example implementation, the compute node 2250 may be, or may be part of an appliance computing device that is a self-contained electronic device including a housing, a chassis, a case or a shell. In some circumstances, the housing may be dimensioned for portability such that it can be carried by a human and/or shipped. Additionally or alternatively, the housing may be a smaller module suitable for installation in a vehicle or in an outdoors location (e.g., a utility pole, side of a building, on a tree or rock, and/or the like). Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting HW to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion HW (e.g., wheels, propellers, etc.) and/or articulating HW (e.g., robot arms, pivotable appendages, etc.). In some circumstances, the sensors may include any type of input devices such as user interface HW (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB, Lightning, Ethernet, etc.), etc. In some circumstances, the compute node 2250 may be deployed in a network for a specific purpose (e.g., a traffic light, road side unit, surveillance camera, IoT device and/or autonomous sensors, etc.), but may have processing and/or other capacities that may be utilized for other purposes. Such compute nodes 2250 may be independent from other networked devices and may be provided with a housing having a form factor suitable for its primary purpose; yet be available for other compute tasks that do not interfere with its primary task. The compute node 2250 may include HW and SW components to manage local issues such as device temperature, vibration, resource utilization, updates, power issues, physical and network security, etc. These HW and SW components to manage local issues may be used to adapt an ML model being operated by the compute node 2250 according to the various embodiments discussed herein.

In another example implementation, the compute node 2250 may be, or may be included in one or more servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other SW, code or scripts may execute while being isolated from one or more other applications, SW, code or scripts.

Figure 23:
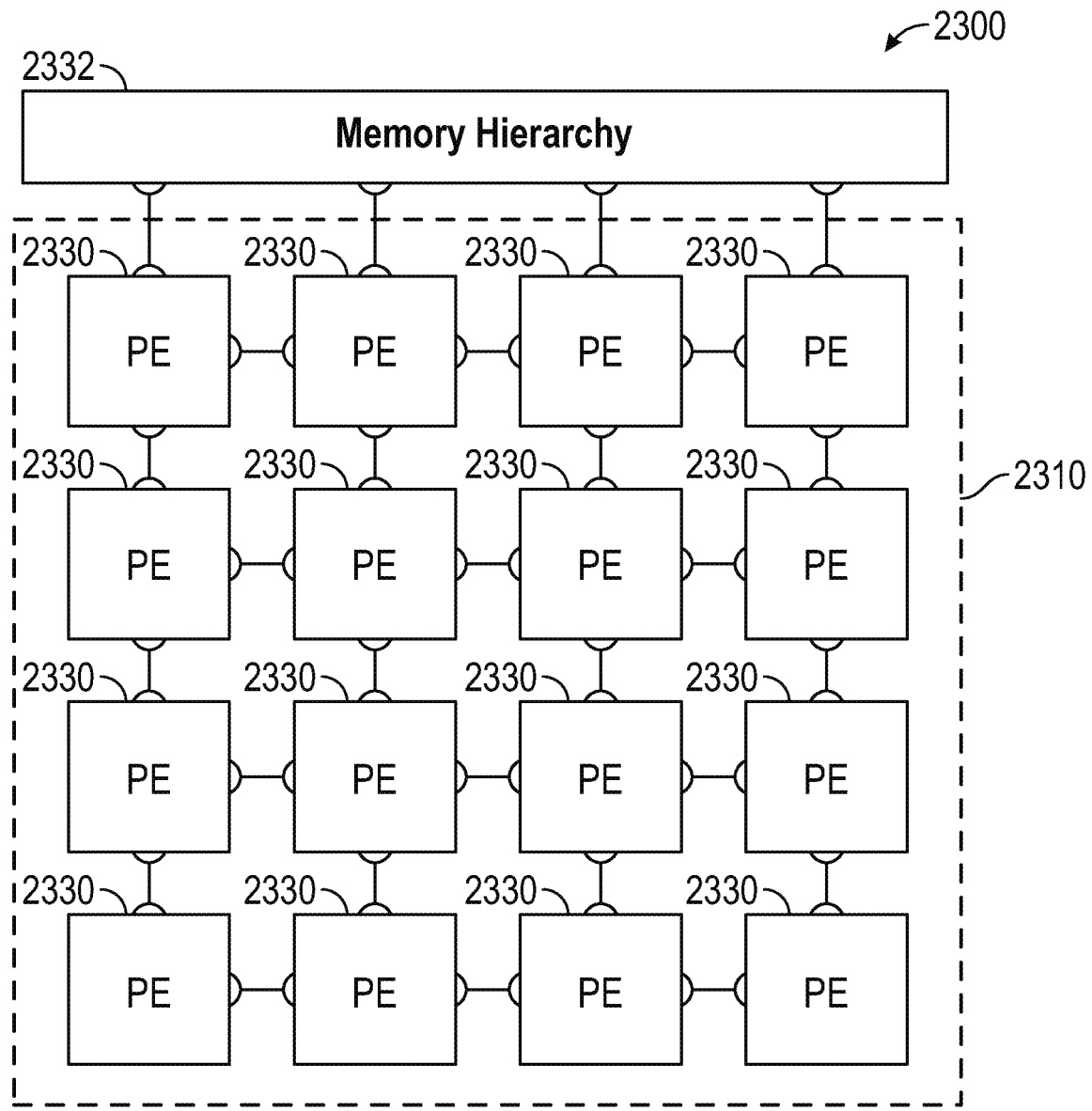
FIGS. 23 and 24 illustrate an example accelerator with a spatial array architecture according to various embodiments.
Figure 24:
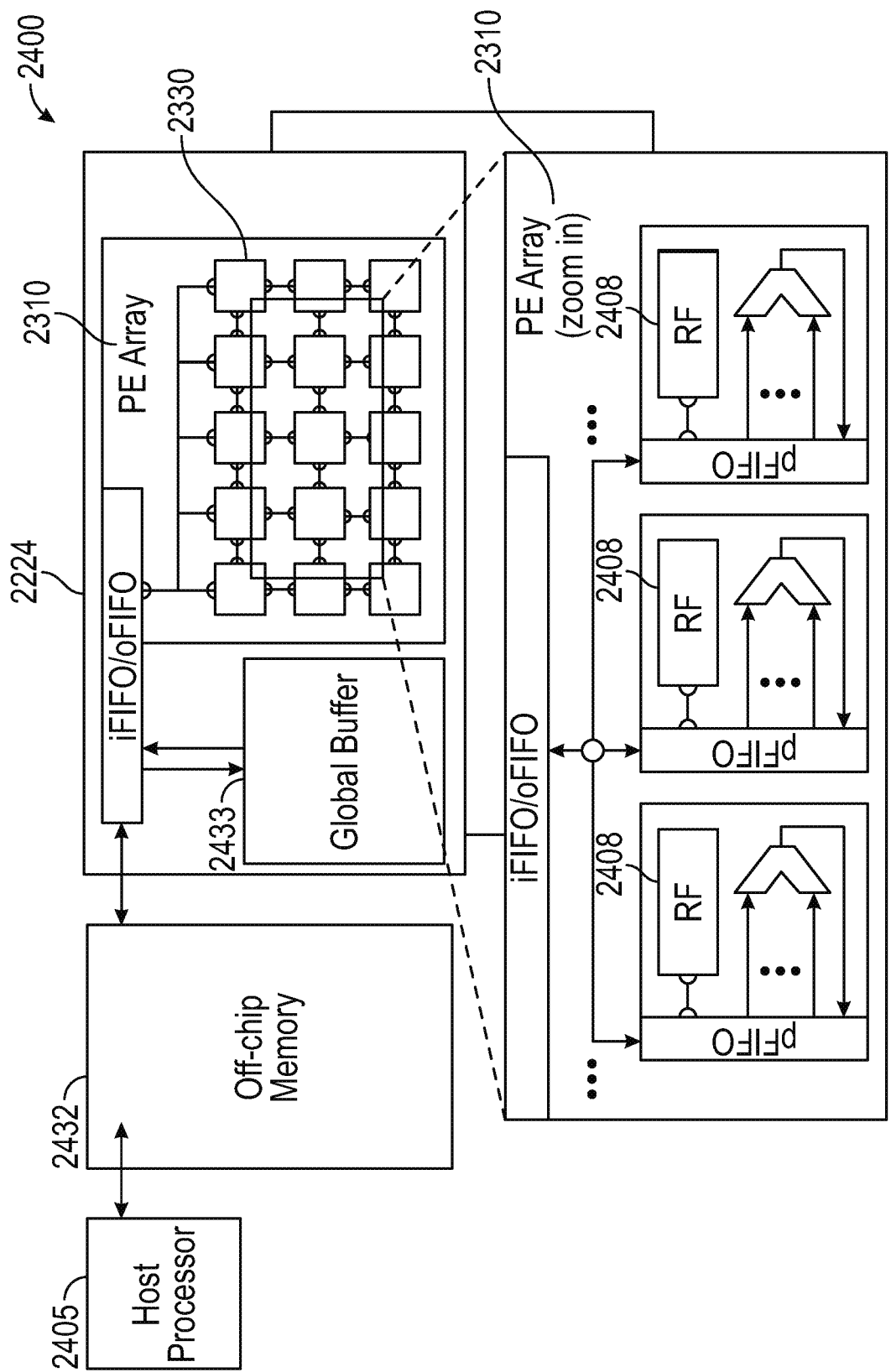

FIGS. 23 and 24 illustrate an example spatial array architecture 2300 and 2400 according to various embodiments. The spatial array architecture 2300 and 2400 (collectively referred to as "architecture 2300" or the like) may be implemented in or by the acceleration circuitry 2264 of FIG. 22*b* and/or accelerator(s) 2224 of FIG. 22*a*. The architecture 2300 may correspond to, or include, the PE array 100. As illustrated by both FIGS. 23 and 24, the architecture 2300 includes a spatial array 2310 (also be referred to as "PE array 2310" or the like) of PEs 2330 and a memory hierarchy 2332. The PEs 2330 may be the same or similar to the PEs 130 of FIG. 1.

The memory hierarchy 2332 may be a local memory 2332. The memory hierarchy 2332 may include RFs (e.g., RFs 208 of FIG. 2) and/or one or more memory banks (or memory buffers). The RF of each PE 2330 may be split into a plurality of RF instances. The one or more memory banks may include dynamic random-access memory (DRAM), static random access memory (SRAM) banks, and/or some other suitable memory device(s). For predictions/inference tasks, the weights or filters may be pre-trained and layer-specific, and loaded to the PE array 2310 from the memory 2332 (e.g., DRAM and/or SRAM banks). Input data, known as input activations or feature maps, are also brought in to the PE array(s) 2310. Inside the PEs 2330, multiply-and-accumulate (MAC) operations are performed in respective MAC operators through multiple input channels ($I_C$) to generate output activations ($O_c$). Multiple sets of weight tensors may be used against a given set of activations to produce an output tensor volume. Non-linear functions may be applied to the output activations that, in turn, become input activations for a next layer. In some implementations, there may be multiple PE array 2310 stacked on top of one another, creating a three dimensional PE array 2310 (or multi-layer arrays of PEs 2330).

As examples, the non-linear functions may be Rectified Linear Units ("ReLUs" or "rectifiers") or Parametric ReLUs ("PreLUs"). ReLUs are activation functions that compute the function ƒ(x)=max(0, x), where the activation of a ReLU is zero when x<0 and linear with slope 1 when x>0 (e.g., the activation is thresholded at zero). PRELUs, are activation functions that compute the function $$f(y_i) = \begin{cases} y_i, & \text{if } y_i > 0 \\ a_i y_i, & \text{if } y_i \leq 0 \end{cases}$$

where $y_i$ is the input of the nonlinear activation function ƒ on the i-th channel, and $\alpha_i$ is a coefficient (a "leak parameter") controlling the negative slope such that when $\alpha_i$=0, the PRELU becomes an ReLU and when $\alpha_i$ is a relatively small number (e.g., $\alpha_i$=0.01), the PRELU becomes a leaky ReLU. In this way, PRELUs make the coefficient of leakage into a parameter that is learned along with other neural network parameters. In other words, PRELUs learn a leak parameter a in order to find a proper positive slope for negative inputs, which prevents negative neurons from dying (i.e., neurons that are always equal to zero) due to null derivatives that block back-propagated error signals.

Referring now to FIG. 24, the multilevel storage hierarchy 2332 is communicatively coupled with a host processor 2405, which may be the same or similar to the processor circuitry 2252 of FIG. 22. The multilevel storage hierarchy 2332 may include off-chip memory 2432 (e.g., DRAM), (on-chip) global buffer 2433, a network-on-chip (NoC) (not shown by FIG. 23b), and/or register files (RFs) 2408 in respective PEs 2330 (e.g., the RF may be the same or similar as RF 208 of FIG. 2). The off-chip memory 2432, global buffer 2433, and PEs 2330 in the array 2310 can communicate with each other directly via a first-in-first-out (FIFO) buffer including an input FIFO (iFIFO) and output FIFO (oFIFO). The storage hierarchy 2332 can be used to exploit data reuse in a four-level setup (in decreasing energy-cost order): memory 2432, global buffer 2433, NoC for inter-PE 2330 communication, and RF in the PE 2330 as local scratchpads. In some implementations, the global buffer 2433 is implemented as a set of on-chip SRAM banks. Additionally or alternatively, the global buffer 2433 can be replaced with and/or arranged into a set of column buffers, each of which is associated with corresponding columns of PEs 2330 in the PE array 2310. The column buffers may include respective output data processors capable of performing truncation and/or ReLU operations on data being output from the PEs 2330 for storage in the memory 2332. The PE array 2310 provides high parallelism for high throughput. Within each PE 2330, a PE FIFO (pFIFO) controls traffic going in and out of an arithmetic logic unit (ALU) including from the RF and/or other storage levels.

In this architecture, all data types may be stored and accessed at any level of the storage hierarchy 2332. Input data for the MAC operations (e.g., filter weights and IFMap) can be moved from the most expensive level (e.g., DRAM) to the lower-cost levels. Ultimately, they are usually delivered from the least expensive level (e.g., RF 208) to the ALU for computation. The results from the ALU (e.g., pSums) generally move in the opposite direction. The orchestration of this movement is determined by the mappings for a specific DNN shape and size under mapping rule constraints of a specific dataflow architecture.

Figure 25:
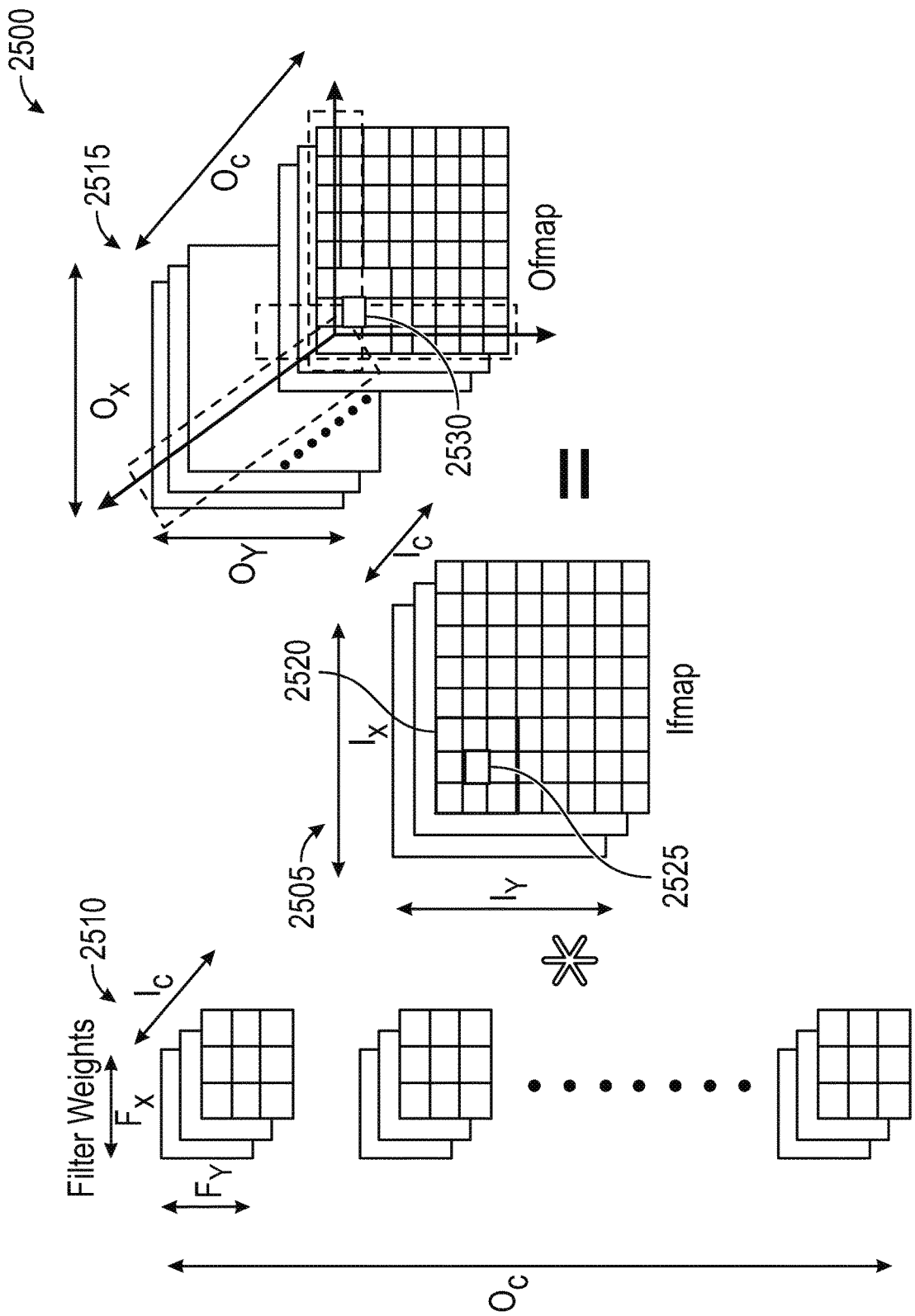
FIG. 25 illustrates an example tensor operation performed by a configurable processor element array according to various embodiments.

The PE array 2310 can be configured based on a plurality of descriptors to implement a layer of an ML model (e.g., DNN, and/or the like) based on a dataflow schedule (also referred to as a "layer execution schedule") corresponding to one of a plurality of tensor processing templates. The PEs 2330 operate, based on the configured tensor processing template, on input activation data and filter data associated with a layer of the ML model to produce output activation data associated with the layer of the ML model. In embodiments, a compiler may convert a description of a layer of an ML model into a dataflow schedule corresponding to a selected one of a set of possible tensor processing templates. The possible tensor processing templates provide different ways to decompose an overall tensor operation to be performed by the configurable PE array 2310 to implement a given DNN layer such that the overall tensor operation can be achieved by the combination of PEs 2330 included in the configurable PE array 2310. An example of the overall tensor operation to be performed by the configurable PE array 2310 to implement a given DNN layer is illustrated by FIG. 25. The example of FIG. 25 also introduces notation to be used throughout the present disclosure.

FIG. 25 shows an example tensor operation 2500 corresponds to a DNN layer in which a set of input data 2505 (also referred to as input activation data 2505 or input activations 2505) is to be processed (e.g., convolved) with a set of filter kernels 2510 (also referred to as filter weights 2510 or weights 2510) to produce a set of output data 2515 (also referred to as output activation data 2515 or output activations 2515). The input activations 2505 are arranged in arrays having $I_x$ elements in the x-dimension, $I_y$ elements in the y-dimension, and $I_c$ channels of input activation data. The dimensions $I_x$, $I_y$ and $I_c$ may be the same or different, and may be any value(s).

The input activation data 2505 having dimensions $I_x$ by $I_y$ by $I_c$ is processed by a set of filters 2510. The filters 2510 are arranged in arrays having $F_x$ elements (e.g., weights) in the x-dimension, $F_y$ elements (e.g., weights) in the y-dimension, and $I_c$ elements in the channel dimension, the latter being the same as the number of channels $I_c$ of the input activation data. For example, the $F_x$ and $F_y$ dimensions may each correspond to 3 and 3 such that a 3 by 3 filter 2510 is processed (e.g., convolved) with each input activation data element and its adjacent neighbors. The filters 2510 may have other values for the $F_x$ and $F_y$ dimensions in other examples, and the $F_x$ and $F_y$ dimensions may be the same or different from each other.

The example tensor operation 2500 of FIG. 25 involves convolving each of the filters 2510 with the input activation data 2505, and summing (accumulating) the resulting data over the channel dimension ($I_c$) to produce the output activation data 2515. For example, a given filter 2510a of the filters is convolved with a given portion 2520 of the input activation data 2505 centered at a given input activation data element 2525. The result for each of the channel dimensions is summed (e.g., corresponding to accumulation over the $I_c$ dimensions) to produce an output activate data element 2530 at an array position corresponding to the array position of the input activation data element 2525, as shown. The convolving of each one of the filters 2510 with the input activation data 2505 produces the output activation data 2515, which is arranged in arrays having Ox elements in the x-dimension, Oy elements in the y-dimension, and $O_c$ different channels of output activation data. The Ox and Oy dimensions may have the same value or different values, and may be the same or different from the $I_x$ and $I_y$ dimensions. The $O_c$ dimension may correspond to the number of different filters 2510 convolved with the input activation data 2505.

Other terminology used in the instant disclosure is as follows: "On" refers to a batch size (e.g., the number of images to be processed in parallel for the DNN to process images). The term "IF" refers to input activation data, the term "FL" refers to filter data (e.g., weights), and the term "OF" refers to output activation data. Furthermore, the term "Psum" or "pSum" refers to a partial result in a DNN operation, such as a convolution operation.

4. Example Implementations

Figure 26:
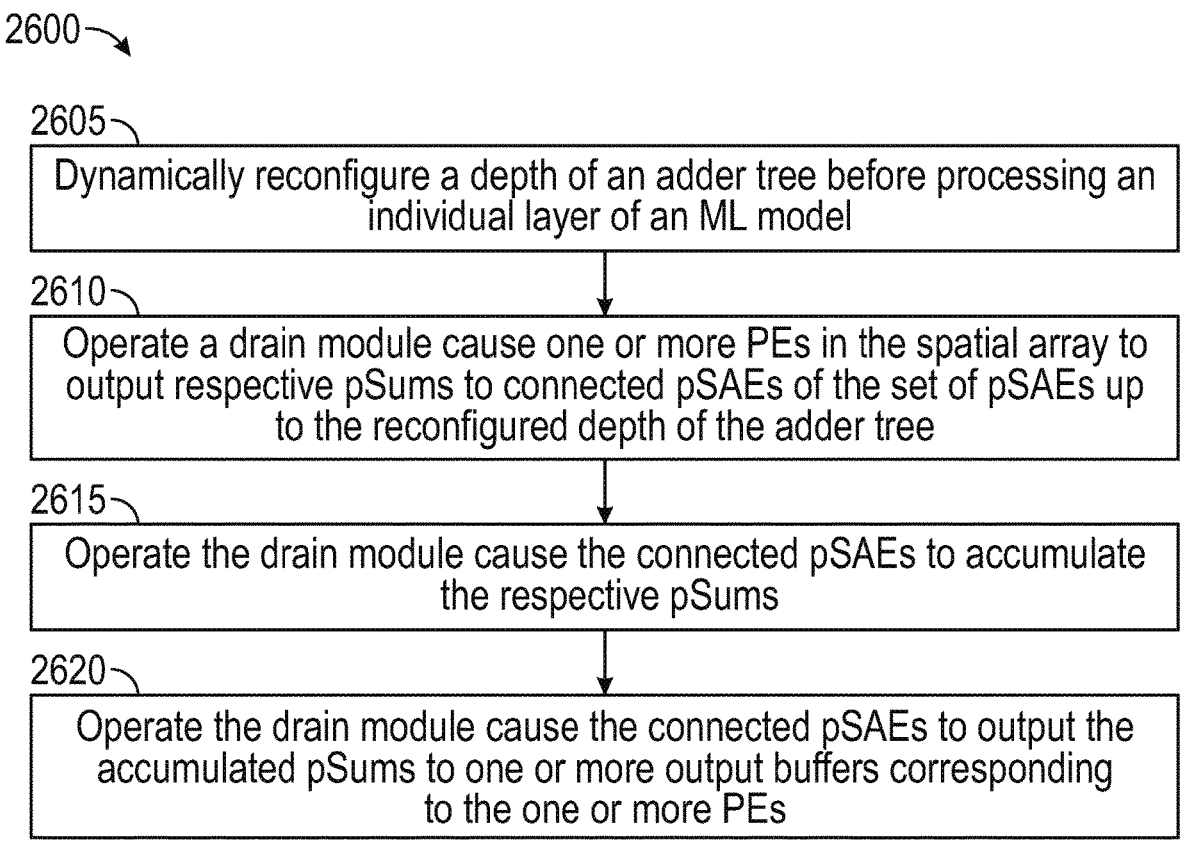
FIG. 26 depict example procedures that may be used to practice the various embodiments discussed herein.

FIG. 26 shows an example process 2600 for operating a flexible adder tree for a HW accelerator 2224. The hardware accelerator 2224 comprises a spatial array 100 of PEs 130, and a set of pSAEs 430 arranged into an adder tree 500/820 and connected to individual PEs 130 in the spatial array 100. Process 2600 begins at operation 2605 where a compute node (or the HW accelerator 2224) dynamically reconfigures a depth of the adder tree 500 before processing an individual layer of an ML model (e.g., a layer of a DNN or the like). At operation 2610, the compute node (or the HW accelerator 2224) operates a drain module to causes one or more PEs 130 in the spatial array 100 to output respective pSums to connected pSAEs of the set of pSAEs 430 up to the reconfigured depth of the adder tree 500/820. At operation 2615, the compute node (or the HW accelerator 2224) operates the drain module to cause the connected pSAEs 430 to accumulate the respective pSums, and at operation 2620, the compute node (or the HW accelerator 2224) operates the drain module to cause the connected pSAEs 430 to output the accumulated pSums to one or more output buffers. After operation 2620, process 2600 may end or repeat as necessary.

Additional examples of the presently described embodiments include the following, non-limiting example implementations. Each of the following non-limiting examples may stand on its own or may be combined in any permutation or combination with any one or more of the other examples provided below or throughout the present disclosure.

Example A01 includes accelerator circuitry for processing a machine learning (ML) model, the accelerator circuitry comprising: a spatial array of processing elements (PEs), wherein individual PEs in the spatial array are configured to accumulate signals from at least one adjacent PE in the spatial array; a set of partial sum accumulation elements (pSAEs), wherein individual pSAEs of the set of pSAEs are connected to one or more PEs in the spatial array, and the individual pSAEs are configured to generate respective output signals based on the accumulated signals provided by the one or more PEs to which the individual pSAEs are connected; and a set of registers, wherein individual registers of the set of registers are connected to one or more pSAEs of the set of pSAEs, and the individual registers are configured to store the respective output signals provided by the one or more pSAEs to which the individual registers are connected, and wherein a subset of registers from among the set of registers are to serve as tap points from which output points are to be extracted, and registers belonging to the subset of registers are dynamically reconfigured according to an input channel inner partition (ICIP) factor indicated by a dataflow schedule.

Example A02 includes the accelerator circuitry of example A01 and/or some other example(s) herein, further comprising: a compiler communicatively coupled with the spatial array of PEs, wherein the compiler is configured to generate the dataflow schedule.

Example A03 includes the accelerator circuitry of example A02 and/or some other example(s) herein, wherein the dataflow schedule indicates individual registers in the subset of registers from which the output points are to be extracted.

Example A04 includes the accelerator circuitry of examples A01-A03 and/or some other example(s) herein, wherein the ICIP factor is a number of PEs in the spatial array to be used for partitioning a set of input channels.

Example A05 includes the accelerator circuitry of example A04 and/or some other example(s) herein, wherein: when the ICIP factor is one, the dataflow schedule indicates to extract output points from each PE in the spatial array in a round-robin fashion; when the ICIP factor is two, the dataflow schedule indicates to extract output points from each alternate PE in the spatial array, or indicates that the subset of registers includes an entirety of the set of registers; when the ICIP factor is four, the dataflow schedule indicates to extract output points from every fourth PE in the spatial array, or indicates that the subset of registers includes half of the set of registers; when the ICIP factor is eight, the dataflow schedule indicates to extract output points from every eighth PE in the spatial array, or indicates that the subset of registers includes a quarter of the set of registers; and when the ICIP factor is sixteen, the dataflow schedule indicates to extract output points from every sixteenth PE in the spatial array, or indicates that the subset of registers includes an eighth of the set of registers.

Example A06 includes the accelerator circuitry of examples A03-A05 and/or some other example(s) herein, wherein each PE in the spatial array includes a corresponding set of configuration registers to store respective descriptors, the respective descriptors are to configure the PEs in the spatial array to output accumulated partial sums (pSums) to their connected pSAEs based on the dataflow schedule.

Example A07 includes the accelerator circuitry of examples A03-A06 and/or some other example(s) herein, wherein the dataflow schedule comprises a drain finite state machine (FSM), and wherein the drain FSM includes multiple nested conditions for extracting the output points from the subset of registers.

Example A08 includes the accelerator circuitry of example A07 and/or some other example(s) herein, wherein execution of the drain FSM is to cause selected ones of the PEs in the spatial array to output respective accumulated partial sums (pSums) to their connected pSAEs based on the dataflow schedule.

Example A09 includes the accelerator circuitry of example A08 and/or some other example(s) herein, further comprising: a Post Processing Engine configured to perform one or more post-processing operations on the values extracted from the subset of registers.

Example A10 includes the accelerator circuitry of examples A01-A09 and/or some other example(s) herein, wherein each PE of the array of PEs includes a corresponding set of multiply-and-accumulators (MACs) and a corresponding set of register files (RFs), wherein each RF of the corresponding set of RFs includes a respective input feature map (IF) and respective filters (FL), wherein the respective IF and the respective FL are to be fed into a corresponding MAC of the corresponding set of MACs, and the corresponding MAC generates a respective output feature map (OF) based on the IF and the FL.

Example A11 includes the accelerator circuitry of examples A01-A10 and/or some other example(s) herein, further comprising a set of output buffers configured to store the extracted output points.

Example A12 includes the accelerator circuitry of examples A01-A11 and/or some other example(s) herein, further comprising: memory circuitry and processor circuitry coupled to the memory circuitry, wherein the processor circuitry includes the spatial array of PEs.

Example A13 includes the accelerator circuitry of example A12 and/or some other example(s) herein, wherein the ICIP factor is indicated by the dataflow schedule.

Example A14 includes the accelerator circuitry of example A13 and/or some other example(s) herein, wherein the dataflow schedule indicates individual PEs in the spatial array from which respective pSums are to be extracted and individual pSAEs from which accumulated pSums are to be extracted.

Example A15 includes the accelerator circuitry of examples A13-A14, wherein: the dataflow schedule indicates to extract pSums from each PE in the spatial array in a round-robin fashion when the ICIP factor is one; the dataflow schedule indicates to extract pSums from each alternate PE in the spatial array when the ICIP factor is two; the dataflow schedule indicates to extract output points from every fourth PE in the spatial array when the ICIP factor is four; the dataflow schedule indicates to extract output points from every eighth PE in the spatial array when the ICIP factor is eight; and the dataflow schedule indicates to extract output points from every sixteenth PE in the spatial array when the ICIP factor is sixteen.

Example B01 includes a method for operating a flexible adder tree for a hardware accelerator, wherein the hardware accelerator comprises a spatial array of processing elements (PEs) and a set of partial sum accumulation elements (pSAEs) arranged into an adder tree and connected to individual PEs in the spatial array, and wherein the method comprises: dynamically reconfiguring a depth of the adder tree before processing an individual layer of a machine learning (ML) model; causing, by a drain module, one or more PEs in the spatial array to output respective partial sums (pSums) to connected pSAEs of the set of pSAEs up to the reconfigured depth of the adder tree; causing, by the drain module, the connected pSAEs to accumulate the respective pSums; and causing, by the drain module, the connected pSAEs to output the accumulated pSums to one or more output buffers.

Example B02 includes the method of example B01 and/or some other example(s) herein, further comprising: dynamically reconfiguring the depth of the adder tree according to an input channel inner partition (ICIP) factor indicated by a dataflow schedule.

Example B03 includes the method of example B02 and/or some other example(s) herein, wherein the ICIP factor is a number of PEs in the spatial array, among which a set of input channels are to be partitioned.

Example B04 includes the method of examples B02-B03 and/or some other example(s) herein, further comprising: operating a compiler to generate the dataflow schedule.

Example B05 includes the method of examples B01-B04 and/or some other example(s) herein, further comprising: generating one or more control signals cause the one or more PEs to output their respective pSums.

Example B06 includes the method of example B05 and/or some other example(s) herein, wherein each PE in the spatial array includes a corresponding set of configuration registers to store respective descriptors, the respective descriptors are to configure the PEs in the spatial array to output the respective pSums to their connected pSAEs based on the dataflow schedule.

Example B07 includes the method of examples B01-B06 and/or some other example(s) herein, wherein the drain module comprises a finite state machine (FSM), and the FSM includes multiple nested conditions for extracting the respective pSums from the one or more PEs.

Example B08 includes the method of examples B01-B07 and/or some other example(s) herein, wherein the drain module comprises a finite state machine (FSM), and the FSM includes multiple nested conditions for extracting the accumulated pSums from the connected pSAEs.

Example B09 includes the method of examples B01-B08 and/or some other example(s) herein, wherein execution of the instructions is to further cause the one or more processors to: perform one or more post-processing operations on the accumulated pSums.

Example B10 includes the method of examples B01-B09 and/or some other example(s) herein, wherein the hardware accelerator further comprises flexible adder tree circuitry that includes the set of pSAEs arranged into the adder tree architecture, wherein the flexible adder tree circuitry is configured to dynamically reconfigure the depth of the adder tree architecture based on an ICIP factor indicated by a dataflow schedule.

Example B11 includes the method of example B10 and/or some other example(s) herein, wherein the dataflow schedule indicates individual PEs in the spatial array from which respective pSums are to be extracted and individual pSAEs from which accumulated pSums are to be extracted.

Example B12 includes the method of example B11 and/or some other example(s) herein, wherein: the dataflow schedule indicates to extract pSums from each PE in the spatial array in a round-robin fashion when the ICIP factor is one; the dataflow schedule indicates to extract pSums from each alternate PE in the spatial array when the ICIP factor is two; the dataflow schedule indicates to extract output points from every fourth PE in the spatial array when the ICIP factor is four; the dataflow schedule indicates to extract output points from every eighth PE in the spatial array when the ICIP factor is eight; and the dataflow schedule indicates to extract output points from every sixteenth PE in the spatial array when the ICIP factor is sixteen.

Example C01 includes accelerator circuitry for machine learning, the accelerator circuitry comprising: memory circuitry; and processor circuitry coupled to the memory circuitry, wherein the processor circuitry comprises a spatial array of processing elements (PEs), wherein individual PEs in the spatial array are configured to generate partial sums (pSums) based on signals obtained from one or more other PEs in the spatial array; and flexible adder tree circuitry communicatively coupled to the processor circuitry, the flexible adder tree circuitry including a set of partial sum accumulation elements (pSAEs) arranged into an adder tree architecture, wherein individual pSAEs in the set of pSAEs are configured to accumulate pSums from one or more PEs in the spatial array to which they are connected, and wherein the flexible adder tree circuitry is configured to dynamically reconfigure a depth of the adder tree architecture based on a configured input channel inner partition (ICIP) factor, the ICIP factor being a number of PEs among which a set of input channels are to be partitioned.

Example C02 includes the accelerator circuitry of example C01 and/or some other example(s) herein, wherein the ICIP factor is indicated by a dataflow schedule generated by a compiler.

Example C03 includes the accelerator circuitry of example C02 and/or some other example(s) herein, wherein the dataflow schedule indicates individual PEs in spatial array from which the respective pSums are to be extracted and the individual pSAEs from which the accumulated pSums are to be extracted.

Example C04 includes the accelerator circuitry of example C02 and/or some other example(s) herein, wherein: the dataflow schedule indicates to extract pSums from each PE in the spatial array in a round-robin fashion when the ICIP factor is one; the dataflow schedule indicates to extract pSums from each alternate PE in the spatial array when the ICIP factor is two; the dataflow schedule indicates to extract output points from every fourth PE in the spatial array when the ICIP factor is four; the dataflow schedule indicates to extract output points from every eighth PE in the spatial array when the ICIP factor is eight; and the dataflow schedule indicates to extract output points from every sixteenth PE in the spatial array when the ICIP factor is sixteen.

Example C05 includes the accelerator circuitry of examples C01-C04 and/or some other example(s) herein, wherein the flexible adder tree circuitry further comprises: a set of registers, wherein individual registers of the set of registers are connected to one or more pSAEs of the set of pSAEs, and the individual registers are configured to store the respective accumulated pSums provided by the one or more pSAEs to which the individual registers are connected, and wherein a subset of registers from among the set of registers are to serve as tap points from which output points are to be extracted, and registers belonging to the subset of registers are dynamically reconfigured according to the ICIP factor indicated by a dataflow schedule.

Example X01 includes the system of examples A01-A15, B01-B12, C01-C05 and/or some other example(s) herein, wherein the system is a central processing unit (CPU), graphics processing unit (GPU), vision processing unit (VPU), tensor processing unit (TPU), Neural Compute Engine (NCE), Neural Network Processor (NNP), a Vision Processing Unit (VPU), or a hardware accelerator.

Example Z01 includes one or more computer readable media comprising instructions, wherein execution of the instructions by processor circuitry is to cause the processor circuitry to perform the method of any one of examples A01-A15, B01-B12, C01-C05 and/or some other example(s) herein.

Example Z02 includes a computer program comprising the instructions of example Z01 and/or some other example(s) herein. Example Z03a includes an Application Programming Interface defining functions, methods, variables, data structures, and/or protocols for the computer program of example Z02. Example Z03b includes an API or specification defining functions, methods, variables, data structures, protocols, etc., defining or involving use of any of examples A01-A15, B01-B12, C01-C05 and/or portions thereof, or otherwise related to any of examples A01-A15, B01-B12, C01-C05 and/or portions thereof. Example Z04 includes an apparatus comprising circuitry loaded with the instructions of example Z01 and/or some other example(s) herein. Example Z05 includes an apparatus comprising circuitry operable to run the instructions of example 701 and/or some other example(s) herein. Example Z06 includes an integrated circuit comprising one or more of the processor circuitry of example Z01 and the one or more computer readable media of example Z01 and/or some other example(s) herein. Example Z07 includes a computing system comprising the one or more computer readable media and the processor circuitry of example Z01 and/or some other example(s) herein. Example Z08 includes an apparatus comprising means for executing the instructions of example Z01 and/or some other example(s) herein. Example Z09 includes a signal generated as a result of executing the instructions of example Z01 and/or some other example(s) herein. Example Z10 includes a data unit generated as a result of executing the instructions of example Z01 and/or some other example(s) herein. Example Z11 includes the data unit of example Z10 and/or some other example(s) herein, wherein the data unit is a datagram, network packet, data frame, data segment, a Protocol Data Unit (PDU), a Service Data Unit (SDU), a message, or a database object. Example Z12 includes a signal encoded with the data unit of examples Z10 and/or Z11 and/or some other example(s) herein. Example Z13 includes an electromagnetic signal carrying the instructions of example Z01 and/or some other example(s) herein. Example 714 includes any of examples Z01-Z13 and/or one or more other example(s) herein, wherein the computing system and/or the processor circuitry comprises one or more of a System-in-Package (SiP), Multi-Chip Package (MCP), a System-on-Chips (SoC), a digital signal processors (DSP), a field-programmable gate arrays (FPGA), an Application Specific Integrated Circuits (ASIC), a programmable logic devices (PLD), a Central Processing Unit (CPU), a Graphics Processing Unit (GPU), or the computing system and/or the processor circuitry comprises two or more of SiPs, MCPs, SoCs, DSPs, FPGAs, ASICs, PLDs, CPUs, GPUs interconnected with one another. Example Z15 includes an apparatus comprising means for performing the method of any one of examples A01-A15, B01-B12, C01-C05 and/or some other example(s) herein.

Any of the above-described examples may be combined with any other example (or combination of examples), unless explicitly stated otherwise. Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

5. Terminology

In the preceding detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive the stream of packets (or the following parameters and templates or template values).

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof.

The term "measurement" at least in some embodiments refers to the observation and/or quantification of attributes of an object, event, or phenomenon.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "terminal" at least in some embodiments refers to point at which a conductor from a component, device, or network comes to an end. Additionally or alternatively, the term "terminal" at least in some embodiments refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "computer architecture" is a physical and logical design or arrangement of software and/or hardware elements in a computing system or platform including technology standards for interacts therebetween. A "network architecture" is a physical and logical design or arrangement of software and/or hardware elements in a network including communication protocols, interfaces, and media transmission.

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "artificial intelligence" or "AI" at least in some embodiments refers to any intelligence demonstrated by machines, in contrast to the natural intelligence displayed by humans and other animals. Additionally or alternatively, the term "artificial intelligence" or "AI" at least in some embodiments refers to the study of "intelligent agents" and/or any device that perceives its environment and takes actions that maximize its chance of successfully achieving a goal.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), echo state network (ESN), etc.), spiking NN (SNN), deep stacking network (DSN), Markov chain, perception NN, generative adversarial network (GAN), transformers, stochastic NNs (e.g., Bayesian Network (BN), Bayesian belief network (BBN), a Bayesian NN (BNN), Deep BNN (DBNN), Dynamic BN (DBN), probabilistic graphical model (PGM), Boltzmann machine, restricted Boltzmann machine (RBM), Hopfield network or Hopfield NN, convolutional deep belief network (CDBN), etc.), Linear Dynamical System (LDS), Switching LDS (SLDS), Optical NNs (ONNs), an NN for reinforcement learning (RL) and/or deep RL (DRL), and/or the like.

The term "classification" in the context of machine learning at least in some embodiments refers to an ML technique for determining the classes to which various data points belong. Here, the term "class" or "classes" at least in some embodiments refers to categories, and are sometimes called "targets" or "labels." Classification is used when the outputs are restricted to a limited set of quantifiable properties. Classification algorithms may describe an individual (data) instance whose category is to be predicted using a feature vector. As an example, when the instance includes a collection (corpus) of text, each feature in a feature vector may be the frequency that specific words appear in the corpus of text. In ML classification, labels are assigned to instances, and models are trained to correctly predict the pre-assigned labels of from the training examples. ML algorithms for classification may be referred to as a "classifier." Examples of classifiers include linear classifiers, k-nearest neighbor (kNN), decision trees, random forests, support vector machines (SVMs), Bayesian classifiers, convolutional neural networks (CNNs), among many others (note that some of these algorithms can be used for other ML tasks as well).

The term "epoch" at least in some embodiments refers to one cycle through a full training dataset. Additionally or alternatively, the term "epoch" at least in some embodiments refers to a full training pass over an entire training dataset such that each training example has been seen once; here, an epoch represents N/batch size training iterations, where N is the total number of examples.

The term "event", in probability theory, at least in some embodiments refers to a set of outcomes of an experiment (e.g., a subset of a sample space) to which a probability is assigned. Additionally or alternatively, the term "event" at least in some embodiments refers to a software message indicating that something has happened. Additionally or alternatively, the term "event" at least in some embodiments refers to an object in time, or an instantiation of a property in an object. Additionally or alternatively, the term "event" at least in some embodiments refers to a point in space at an instant in time (e.g., a location in spacetime). Additionally or alternatively, the term "event" at least in some embodiments refers to a notable occurrence at a particular point in time.

The term "feature" at least in some embodiments refers to an individual measureable property, quantifiable property, or characteristic of a phenomenon being observed. Additionally or alternatively, the term "feature" at least in some embodiments refers to an input variable used in making predictions. At least in some embodiments, features may be represented using numbers/numerals (e.g., integers), strings, variables, ordinals, real-values, categories, and/or the like. In some embodiments, the term "feature" may also be referred to as an "input channel".

The term "feature extraction" at least in some embodiments refers to a process of dimensionality reduction by which an initial set of raw data is reduced to more manageable groups for processing. Additionally or alternatively, the term "feature extraction" at least in some embodiments refers to retrieving intermediate feature representations calculated by an unsupervised model or a pretrained model for use in another model as an input. Feature extraction is sometimes used as a synonym of "feature engineering."

The term "feature map" at least in some embodiments refers to a function that takes feature vectors (or feature tensors) in one space and transforms them into feature vectors (or feature tensors) in another space. Additionally or alternatively, the term "feature map" at least in some embodiments refers to a function that maps a data vector (or tensor) to feature space. Additionally or alternatively, the term "feature map" at least in some embodiments refers to a function that applies the output of one filter applied to a previous layer. In some embodiments, the term "feature map" may also be referred to as an "activation map" or "output channel".

The term "feature vector" at least in some embodiments, in the context of ML, refers to a set of features and/or a list of feature values representing an example passed into a model. Additionally or alternatively, the term "feature vector" at least in some embodiments, in the context of ML, refers to a vector that includes a tuple of one or more features.

The term "hidden layer", in the context of ML and NNs, at least in some embodiments refers to an internal layer of neurons in an ANN that is not dedicated to input or output. The term "hidden unit" refers to a neuron in a hidden layer in an ANN.

The term "hyperparameter" at least in some embodiments refers to characteristics, properties, and/or parameters for an ML process that cannot be learnt during a training process. Hyperparameter are usually set before training takes place, and may be used in processes to help estimate model parameters. Examples of hyperparameters include model size (e.g., in terms of memory space, bytes, number of layers, etc.); training data shuffling (e.g., whether to do so and by how much); number of evaluation instances, iterations, epochs (e.g., a number of iterations or passes over the training data), or episodes; number of passes over training data; regularization; learning rate (e.g., the speed at which the algorithm reaches (converges to) optimal weights); learning rate decay (or weight decay); momentum; stride; padding; depth (e.g., number of input channels and/or number of output channels); number of hidden layers; size of individual hidden layers; weight initialization scheme; dropout and gradient clipping thresholds; the C value and sigma value for SVMs; the k in k-nearest neighbors; number of branches in a decision tree; number of clusters in a clustering algorithm; vector size; word vector size for NLP and NLU; and/or the like.

The term "inference engine" at least in some embodiments refers to a component of a computing system that applies logical rules to a knowledge base to deduce new information.

The term "intelligent agent" at least in some embodiments refers to an a software agent or other autonomous entity which acts, directing its activity towards achieving goals upon an environment using observation through sensors and consequent actuators (i.e. it is intelligent). Intelligent agents may also learn or use knowledge to achieve their goals.

The term "iteration" at least in some embodiments refers to the repetition of a process in order to generate a sequence of outcomes, wherein each repetition of the process is a single iteration, and the outcome of each iteration is the starting point of the next iteration. Additionally or alternatively, the term "iteration" at least in some embodiments refers to a single update of a model's weights during training.

The term "knowledge base" at least in some embodiments refers to any technology used to store complex structured and/or unstructured information used by a computing system.

The term "loss function" or "cost function" at least in some embodiments refers to an event or values of one or more variables onto a real number that represents some "cost" associated with the event. A value calculated by a loss function may be referred to as a "loss" or "error". Additionally or alternatively, the term "loss function" or "cost function" at least in some embodiments refers to a function used to determine the error or loss between the output of an algorithm and a target value. Additionally or alternatively, the term "loss function" or "cost function" at least in some embodiments refers to a function are used in optimization problems with the goal of minimizing a loss or error.

The term "mathematical model" at least in some embodiments refer to a system of postulates, data, and inferences presented as a mathematical description of an entity or state of affairs including governing equations, assumptions, and constraints.

The term "machine learning" or "ML" at least in some embodiments refers to the use of computer systems to optimize a performance criterion using example (training) data and/or past experience. ML involves using algorithms to perform specific task(s) without using explicit instructions to perform the specific task(s), and/or relying on patterns, predictions, and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions). ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm at least in some embodiments refers to different concepts than the term "ML model," these terms may be used interchangeably for the purposes of the present disclosure. Furthermore, the term "AI/ML application" or the like at least in some embodiments refers to an application that contains some AV/ML models and application-level descriptions. ML techniques generally fall into the following main types of learning problem categories: supervised learning, unsupervised learning, and reinforcement learning.

The term "matrix" at least in some embodiments refers to a rectangular array of numbers, symbols, or expressions, arranged in rows and columns, which may be used to represent an object or a property of such an object.

The terms "model parameter" and/or "parameter" in the context of ML, at least in some embodiments refer to values, characteristics, and/or properties that are learnt during training. Additionally or alternatively, "model parameter" and/or "parameter" in the context of ML, at least in some embodiments refer to a configuration variable that is internal to the model and whose value can be estimated from the given data. Model parameters are usually required by a model when making predictions, and their values define the skill of the model on a particular problem. Examples of such model parameters/parameters include weights (e.g., in an ANN); constraints; support vectors in a support vector machine (SVM); coefficients in a linear regression and/or logistic regression; word frequency, sentence length, noun or verb distribution per sentence, the number of specific character n-grams per word, lexical diversity, etc., for natural language processing (NLP) and/or natural language understanding (NLU); and/or the like.

The term "objective function" at least in some embodiments refers to a function to be maximized or minimized for a specific optimization problem. In some cases, an objective function is defined by its decision variables and an objective. The objective is the value, target, or goal to be optimized, such as maximizing profit or minimizing usage of a particular resource. The specific objective function chosen depends on the specific problem to be solved and the objectives to be optimized. Constraints may also be defined to restrict the values the decision variables can assume thereby influencing the objective value (output) that can be achieved. During an optimization process, an objective function's decision variables are often changed or manipulated within the bounds of the constraints to improve the objective function's values. In general, the difficulty in solving an objective function increases as the number of decision variables included in that objective function increases. The term "decision variable" refers to a variable that represents a decision to be made.

The term "optimization" at least in some embodiments refers to an act, process, or methodology of making something (e.g., a design, system, or decision) as fully perfect, functional, or effective as possible. Optimization usually includes mathematical procedures such as finding the maximum or minimum of a function. The term "optimal" at least in some embodiments refers to a most desirable or satisfactory end, outcome, or output. The term "optimum" at least in some embodiments refers to an amount or degree of something that is most favorable to some end. The term "optima" at least in some embodiments refers to a condition, degree, amount, or compromise that produces a best possible result. Additionally or alternatively, the term "optima" at least in some embodiments refers to a most favorable or advantageous outcome or result.

The term "probability" at least in some embodiments refers to a numerical description of how likely an event is to occur and/or how likely it is that a proposition is true. The term "probability distribution" at least in some embodiments refers to a mathematical function that gives the probabilities of occurrence of different possible outcomes for an experiment or event.

The term "probability distribution" at least in some embodiments refers to a function that gives the probabilities of occurrence of different possible outcomes for an experiment or event. Additionally or alternatively, the term "probability distribution" at least in some embodiments refers to a statistical function that describes all possible values and likelihoods that a random variable can take within a given range (e.g., a bound between minimum and maximum possible values). A probability distribution may have one or more factors or attributes such as, for example, a mean or average, mode, support, tail, head, median, variance, standard deviation, quantile, symmetry, skewness, kurtosis, etc. A probability distribution may be a description of a random phenomenon in terms of a sample space and the probabilities of events (subsets of the sample space). Example probability distributions include discrete distributions (e.g., Bernoulli distribution, discrete uniform, binomial, Dirac measure, Gauss-Kuzmin distribution, geometric, hypergeometric, negative binomial, negative hypergeometric, Poisson, Poisson binomial, Rademacher distribution, Yule-Simon distribution, zeta distribution, Zipf distribution, etc.), continuous distributions (e.g., Bates distribution, beta, continuous uniform, normal distribution, Gaussian distribution, bell curve, joint normal, gamma, chi-squared, non-central chi-squared, exponential, Cauchy, lognormal, logit-normal, F distribution, t distribution, Dirac delta function, Pareto distribution, Lomax distribution, Wishart distribution, Weibull distribution, Gumbel distribution, Irwin-Hall distribution, Gompertz distribution, inverse Gaussian distribution (or Wald distribution), Chernoff's distribution, Laplace distribution, Pólya-Gamma distribution, etc.), and/or joint distributions (e.g., Dirichlet distribution, Ewens's sampling formula, multinomial distribution, multivariate normal distribution, multivariate t-distribution, Wishart distribution, matrix normal distribution, matrix t distribution, etc.).

The term "probability density function" or "PDF" at least in some embodiments refers to a function whose value at any given sample (or point) in a sample space can be interpreted as providing a relative likelihood that the value of the random variable would be close to that sample. Additionally or alternatively, the term "probability density function" or "PDF" at least in some embodiments refers to a probability of a random variable falling within a particular range of values. Additionally or alternatively, the term "probability density function" or "PDF" at least in some embodiments refers to a value at two different samples can be used to infer, in any particular draw of the random variable, how much more likely it is that the random variable would be close to one sample compared to the other sample.

The term "precision" at least in some embodiments refers to the closeness of the two or more measurements to each other. The term "precision" may also be referred to as "positive predictive value".

The term "quantile" at least in some embodiments refers to a cut point(s) dividing a range of a probability distribution into continuous intervals with equal probabilities, or dividing the observations in a sample in the same way. The term "quantile function" at least in some embodiments refers to a function that is associated with a probability distribution of a random variable, and the specifies the value of the random variable such that the probability of the variable being less than or equal to that value equals the given probability. The term "quantile function" may also be referred to as a percentile function, percent-point function, or inverse cumulative distribution function.

The term "reinforcement learning" or "RL" at least in some embodiments refers to a goal-oriented learning technique based on interaction with an environment. In RL, an agent aims to optimize a long-term objective by interacting with the environment based on a trial and error process. Examples of RL algorithms include Markov decision process, Markov chain, Q-learning, multi-armed bandit learning, temporal difference learning, and deep RL.

The term "sample space" in probability theory (also referred to as a "sample description space" or "possibility space") of an experiment or random trial at least in some embodiments refers to a set of all possible outcomes or results of that experiment.

The term "search space", in the context of optimization, at least in some embodiments refers to an a domain of a function to be optimized. Additionally or alternatively, the term "search space", in the context of search algorithms, at least in some embodiments refers to a feasible region defining a set of all possible solutions. Additionally or alternatively, the term "search space" at least in some embodiments refers to a subset of all hypotheses that are consistent with the observed training examples. Additionally or alternatively, the term "search space" at least in some embodiments refers to a version space, which may be developed via machine learning.

The term "supervised learning" at least in some embodiments refers to an ML technique that aims to learn a function or generate an ML model that produces an output given a labeled data set. Supervised learning algorithms build models from a set of data that contains both the inputs and the desired outputs. For example, supervised learning involves learning a function or model that maps an input to an output based on example input-output pairs or some other form of labeled training data including a set of training examples. Each input-output pair includes an input object (e.g., a vector) and a desired output object or value (referred to as a "supervisory signal"). Supervised learning can be grouped into classification algorithms, regression algorithms, and instance-based algorithms.

The term "standard deviation" at least in some embodiments refers to a measure of the amount of variation or dispersion of a set of values. Additionally or alternatively, the term "standard deviation" at least in some embodiments refers to the square root of a variance of a random variable, a sample, a statistical population, a dataset, or a probability distribution.

The term "tensor" at least in some embodiments refers to an object or other data structure represented by an array of components that describe functions relevant to coordinates of a space. Additionally or alternatively, the term "tensor" at least in some embodiments refers to a generalization of vectors and matrices and/or may be understood to be a multidimensional array. Additionally or alternatively, the term "tensor" at least in some embodiments refers to an array of numbers arranged on a regular grid with a variable number of axes. At least in some embodiments, a tensor can be defined as a single point, a collection of isolated points, or a continuum of points in which elements of the tensor are functions of position, and the Tensor forms a "tensor field". At least in some embodiments, a vector may be considered as a one dimensional (1D) or first order tensor, and a matrix may be considered as a two dimensional (2D) or second order tensor. Tensor notation may be the same or similar as matrix notation with a capital letter representing the tensor and lowercase letters with subscript integers representing scalar values within the tensor.

The term "unsupervised learning" at least in some embodiments refers to an ML technique that aims to learn a function to describe a hidden structure from unlabeled data. Unsupervised learning algorithms build models from a set of data that contains only inputs and no desired output labels. Unsupervised learning algorithms are used to find structure in the data, like grouping or clustering of data points. Examples of unsupervised learning are K-means clustering, principal component analysis (PCA), and topic modeling, among many others. The term "semi-supervised learning at least in some embodiments refers to ML algorithms that develop ML models from incomplete training data, where a portion of the sample input does not include labels.

The term "vector" at least in some embodiments refers to a one-dimensional array data structure. Additionally or alternatively, the term "vector" at least in some embodiments refers to a tuple of one or more values called scalars.

The term "lateral" at least in some embodiments refers to directions or positions relative to an object spanning the width of a body of the object, relating to the sides of the object, and/or moving in a sideways direction with respect to the object.

The term "longitudinal" at least in some embodiments refers to directions or positions relative to an object spanning the length of a body of the object; relating to the top or bottom of the object, and/or moving in an upwards and/or downwards direction with respect to the object.

The term "linear" at least in some embodiments refers to directions or positions relative to an object following a straight line with respect to the object, and/or refers to a movement or force that occurs in a straight line rather than in a curve.

The term "lineal" at least in some embodiments refers to directions or positions relative to an object following along a given path with respect to the object, wherein the shape of the path is straight or not straight.

The term "normal" or "normal axis" at least in some embodiments refers to a line, ray, or vector that is perpendicular to a given object.

The term "curvature" at least in some embodiments refers to a rate of change of direction of a curve with respect to distance along the curve.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The invention claimed is:

1. An apparatus for processing a machine learning (ML) model, the apparatus comprising:
   an array of processing elements (PEs); and
   an adder tree coupled to the array of PEs, the adder tree comprising:
     a set of partial sum accumulation elements (pSAEs) arranged in different levels, wherein a first subset of pSAEs of the set of pSAEs is arranged in a first level, a pSAE in the first subset is connected to two or more PEs in the array and is configured to accumulate outputs of the two or more PEs, a second subset of one or more pSAEs of the number of pSAEs is arranged in a second level, and a pSAE in the second subset is connected to two or more pSAEs in the first subset and is configured to accumulate outputs of the two or more pSAEs in the first subset, and
     a set of registers, wherein each individual register of the number of registers is coupled with a respective pSAE of the set of pSAEs, and the individual register is configured to store an output of the respective pSAE,
     wherein a number of pSAEs in the set of pSAEs is equal to a number of registers in the set of registers, an output of the adder tree is to be read from one or more registers of the set of registers, the one or more registers are dynamically selected from the number of registers according to an input channel inner partition (ICIP) factor, and different registers are selected for different ICIP factors.

2. The apparatus of claim 1, further comprising:
   a compiler communicatively coupled with the array of PEs, wherein the compiler is configured to generate a dataflow schedule indicating the ICIP factor.

3. The apparatus of claim 2, wherein the dataflow schedule indicates the one or more registers from which the output of the adder tree is to be read.

4. The apparatus of claim 1, wherein the ICIP factor indicates a number of PEs in the array to be used for processing a set of input channels.

5. The apparatus of claim 1, wherein each PE in the array includes a corresponding set of configuration registers to store respective descriptors, and the respective descriptors are to configure the PEs in the array to output accumulated partial sums (pSums) to one or more pSAEs in the first level.

6. The apparatus of claim 1, further comprising a drain finite state machine (FSM), wherein the drain FSM has multiple nested conditions for extracting the output of the adder tree from the one or more registers.

7. The apparatus of claim 6, wherein execution of the drain FSM is to cause selected ones of the PEs in the array to output respective accumulated partial sums (pSums) to one or more pSAEs in the first level.

8. The apparatus of claim 1, further comprising:
   a Post Processing Engine configured to perform one or more post-processing operations on the output of the adder tree.

9. The apparatus of claim 1, wherein a PE of the array of PEs includes one or more multiply-and-accumulators and one or more register files.

10. The apparatus of claim 1, further comprising a one or more buffers configured to store the output of the adder tree.

11. The apparatus of claim 1, wherein the ICIP factor is indicated by a dataflow schedule.

12. The apparatus of claim 11, wherein the dataflow schedule indicates one or more PEs in the array from which respective accumulated partial sums (pSums) are to be extracted and transmitted to one or more registers in the first level.

13. One or more non-transitory computer-readable media (NTCRM) comprising instructions for operating a hardware accelerator, wherein the hardware accelerator comprises an array of processing elements (PEs) and an adder tree coupled to the array of PEs, the adder tree comprising a set of partial sum accumulation elements (pSAEs) and a set of registers, a number of pSAEs in the set of pSAEs equal to a number of registers in the set of registers, each individual register coupled with a respective pSAE in the set of pSAEs and configured to store an output of the respective pSAE, and wherein execution of the instructions by one or more processors is to cause the one or more processors to:
dynamically configure a depth of the adder tree for a layer of a neural network, the depth of the adder tree identifying a level in the adder tree, wherein a first level of the adder tree comprises pSAEs connected to the PEs in the array, and wherein a second level of the adder tree comprises one or more pSAEs connected to the pSAEs in the first level; and
operate a drain module to:
cause one or more PEs in the array to output one or more partial sums (pSums) to one or more pSAEs in the first level,
cause the one or more pSAEs in the first level to accumulate the one or more pSums, and
read the output of the adder tree from one or more registers of the set of registers, wherein the one or more registers are in the level identified by the depth of the adder tree.

14. The one or more NTCRM of claim 13, wherein execution of the instructions is to further cause the one or more processors to:
dynamically configure the depth of the adder tree by dynamically configuring the depth of the adder tree according to an input channel inner partition (ICIP) factor.

15. The one or more NTCRM of claim 14, wherein the ICIP factor is a number of PEs in the array, among which a set of input channels are to be processed.

16. The one or more NTCRM of claim 15, wherein execution of the instructions is to further cause the one or more processors to:
operate a compiler to determine the ICIP factor.

17. The one or more NTCRM of claim 13, wherein execution of the instructions is to further cause the one or more processors to:
generate one or more control signals that are to cause the one or more PEs to output the one or more pSums.

18. The one or more NTCRM of claim 17, wherein a PE in the array includes a corresponding set of configuration registers to store respective descriptors, the respective descriptors are to configure the one or more PEs to output the one or more pSums to the one or more pSAEs in the first level.

19. The one or more NTCRM of claim 13, wherein the drain module comprises a finite state machine (FSM), and the FSM has multiple nested conditions for extracting the one or more pSums from the one or more PEs.

20. The one or more NTCRM of claim 13, wherein the drain module comprises a finite state machine (FSM), and the FSM includes multiple nested conditions for extracting the output of the adder tree from the level.

21. The one or more NTCRM of claim 13, wherein execution of the instructions is to further cause the one or more processors to: perform one or more post-processing operations on the output of the adder tree.

22. The one or more NTCRM of claim 13, wherein execution of the instructions is to further cause the one or more processors to generate a dataflow, and the dataflow schedule comprises information indicating the one or more PEs and the depth of the adder tree.

23. Accelerator circuitry for machine learning, the accelerator circuitry comprising:
memory circuitry;
processor circuitry coupled to the memory circuitry, wherein the processor circuitry comprises an array of processing elements (PEs); and
flexible adder tree circuitry communicatively coupled to the processor circuitry, the flexible adder tree circuitry including a set of partial sum accumulation elements (pSAEs) and a set of registers, wherein:
the set of pSAEs is arranged in a first level, which includes pSAEs configured to accumulate outputs of the PEs in the array, and a second level, which includes a pSAE configured to accumulate outputs of at least two pSAEs in the first level,
a number of pSAEs in the set of pSAEs equals a number of registers in the set of registers,
each individual register is coupled with a respective pSAE in the set of pSAEs and configured to store an output of the respective pSAE, and
the flexible adder tree circuitry is configured to dynamically configure a level of the adder tree, the level of the adder tree comprising one or more registers in the set of registers from which an output of the adder tree is extracted based on a input channel inner partition (ICIP) factor.

24. The accelerator circuitry of claim 23, wherein the ICIP factor indicates partition of a set of input channels among the PEs in the array and is indicated by a dataflow schedule generated by a compiler.

25. The accelerator circuitry of claim 24, wherein the dataflow schedule indicates one or more PEs in the spatial array from which one or more outputs of the array to be extracted and one or more pSAEs from which the output of the adder tree to be extracted.

26. The apparatus of claim 1, wherein:
when the ICIP factor has a first value, the output of the adder tree is read from one or more registers in the first level,
when the ICIP factor has a second value, the output of the adder tree is read from one or more registers in the second level, and
the second value is greater than the first value.

27. The one or more NTCRM of claim 14, wherein:
when the ICIP factor has a first value, the output of the adder tree is read from one or more registers in the first level,
when the ICIP factor has a second value, the output of the adder tree is read from one or more registers in the second level, and
the second value is greater than the first value.

28. The accelerator circuitry of claim 23, wherein:
when the ICIP factor has a first value, the output of the adder tree is read from one or more registers in the first level, when the ICIP factor has a second value, the output of the adder tree is read from one or more registers in the second level, and the second value is greater than the first value.

29. The apparatus of claim 1, wherein a PE includes a register file to store data computed by the PE, and the register file is coupled with a pSAE in the first level of the adder tree.

30. The one or more NTCRM of claim 13, wherein a PE includes a register file to store data computed by the PE, and the register file is coupled with a pSAE in the first level of the adder tree.

31. The accelerator circuitry of claim 23, wherein a PE includes a register file to store data computed by the PE, and the register file is coupled with a pSAE in the first level of the adder tree.

* * * * *